US012400102B2

(12) United States Patent
Lavin et al.

(10) Patent No.: US 12,400,102 B2
(45) Date of Patent: Aug. 26, 2025

(54) AUTONOMOUS, WORLD-BUILDING, LIFELONG LEARNING AGENTS AND COMPUTING ENGINES FOR GENERAL-PURPOSE INTELLIGENCE

(71) Applicant: Pasteur Labs, Inc., Brooklyn, NY (US)

(72) Inventors: Alexander Lavin, Brooklyn, NY (US); Janusz Marecki, London (GB)

(*) Notice: Subject to any disclaimer, the term of this patent is extended or adjusted under 35 U.S.C. 154(b) by 0 days.

(21) Appl. No.: 18/819,333

(22) Filed: Aug. 29, 2024

(65) Prior Publication Data

US 2025/0068882 A1 Feb. 27, 2025

Related U.S. Application Data

(63) Continuation of application No. PCT/US2023/017633, filed on Apr. 5, 2023.

(60) Provisional application No. 63/362,466, filed on Apr. 5, 2022.

(51) Int. Cl.
*G06N 3/00* (2023.01)
*G06N 3/006* (2023.01)
*G06N 3/04* (2023.01)
*G06N 3/092* (2023.01)

(52) U.S. Cl.
CPC .......... *G06N 3/006* (2013.01); *G06N 3/0418* (2013.01); *G06N 3/092* (2023.01)

(58) Field of Classification Search
CPC ....... G06N 3/006; G06N 3/0418; G06N 3/092
See application file for complete search history.

(56) References Cited

U.S. PATENT DOCUMENTS

| 9,015,093 | B1 | 4/2015 | Commons |
| 10,800,040 | B1 | 10/2020 | Beckman et al. |
| 2018/0348716 | A1 | 12/2018 | Perez et al. |
| 2019/0073564 | A1 | 3/2019 | Saliou |
| 2020/0160034 | A1 | 5/2020 | Choi et al. |
| 2021/0117786 | A1 | 4/2021 | Schwarz et al. |
| 2022/0067520 | A1* | 3/2022 | Dalli ............ G06N 20/00 |

FOREIGN PATENT DOCUMENTS

WO WO-2023196435 A1 10/2023

OTHER PUBLICATIONS

George et al ("Cortical Microcircuits from a Generative Vision Model" 2018) (Year: 2018).*

(Continued)

*Primary Examiner* — Lut Wong
(74) *Attorney, Agent, or Firm* — Blueshift IP, LLC; Cynthia M. Gilbert

(57) ABSTRACT

Described are systems for determining domain observations of an environment. Systems may include: a domain engine module, an active sensing module, a fractal network module, and an execution agent module. Modules may be configured to perform methods for determining domain observations of the environment. Methods may include generating or receiving domain observations, generating or receiving sim actions, generating fractal networks associated with the domain observations or the sim actions, generating observation sequences from the fractal networks, and comparing the observation sequences to the domain observations.

24 Claims, 55 Drawing Sheets

(56) References Cited

OTHER PUBLICATIONS

Erhard Bieberich ("Recurrent fractal neural networks: a strategy for the exchange of local and global information processing in the brain" 2002) (Year: 2002).*
Liu, Bing, et al. Self-Initiated Open World Learning for Autonomous AI Agents. arXi:2110.11385 (pp. 1-7) (2022).
Parisi, German, et al. Continual Lifelong Learning with Neural Networks. arXiv 113:54-71 (2019).
PCT/US2023/017633 International Search Report and Written Opinion dated Jun. 23, 2023.

* cited by examiner

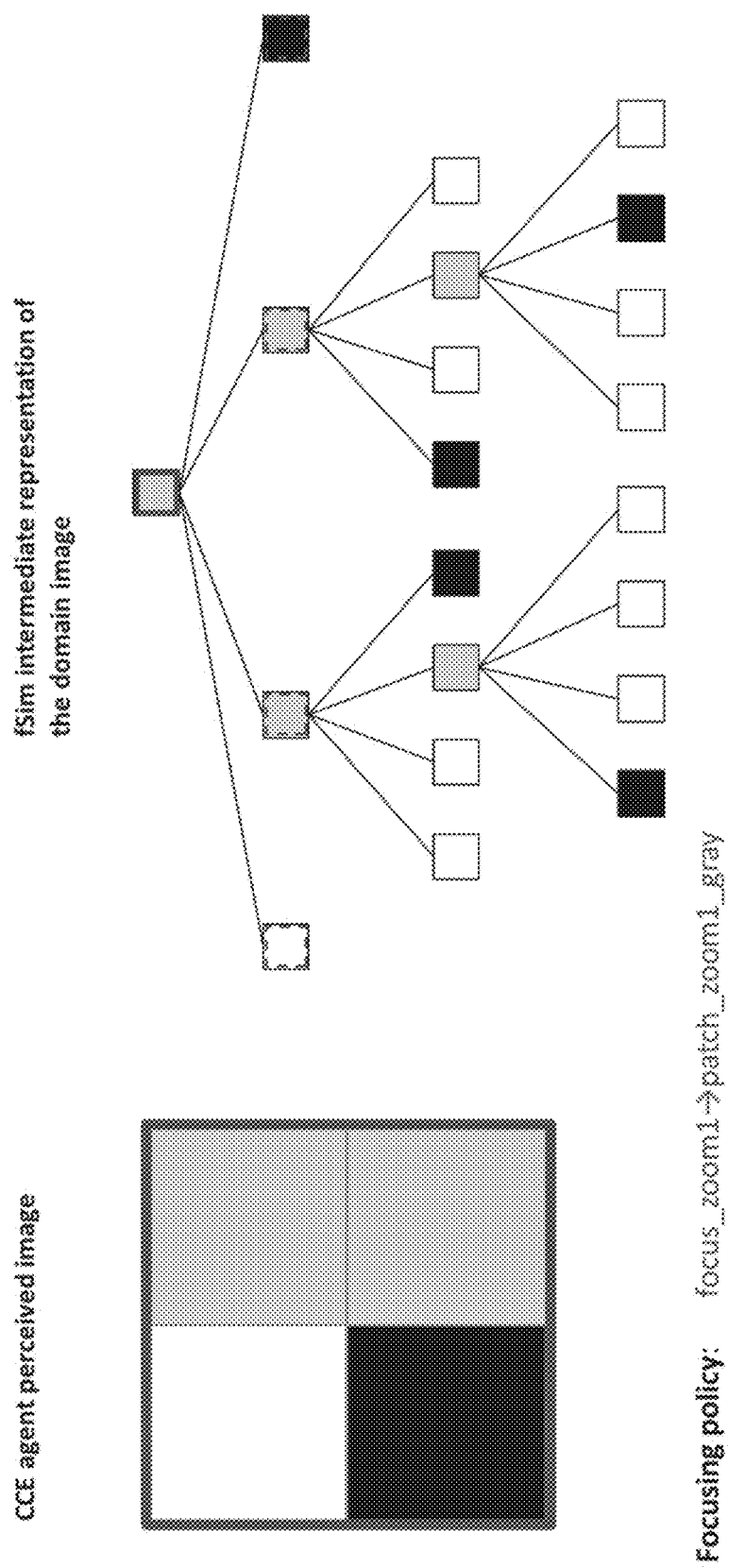

focusing policy: focus_zoom1→patch_zoom1_gray→focus_zoom1_dir2→patch_zoom2_gray

Algorithm 1 ENTER($dst^1$)

---

Input: The identifier $dst^1$ of a *destination* unit to be entered into $f$Net $r_1$ 1:  $r \leftarrow 1$
2:  while true do
3:     $src \leftarrow A(r)$
4:     $dst \leftarrow dst^r$
5:     $A(r) \leftarrow dst$
6:     $ActivationTime(u^r_{dst}) \leftarrow \text{TIME}()$
7:     if $src \neq null$ then
8:         $dst^{r+1} \leftarrow \text{PARSE}(r, src, dst)$
9:         if $dst^{r+1} \neq null$ then
10:            $r \leftarrow r + 1$
11:            continue
12:         end if
13:     end if
14:     break
15: end while
16: ALERT-LIKELY-UNITS()
17: PREDICT-ATTENTION-MOVES()

Algorithm 2 PARSE($r, src, dst$)

Input: The identifiers $src, dst$ of units $u^r_{src}, u^r_{dst}$ involved in the attention move in region $r$

Output: The identifier of a unit that the attention in region $r + 1$ will move to next (or $null$ if no such attention move will take place)

1: if EnterMode = Real and $w(h^r_{src \to dst}) = 0$ then
2:     $l(h^r_{src \to dst}) \leftarrow$ LENGTH($h^r_{src \to dst}$)
3: end if
4: if $w(h^r_{src \to dst}) \neq 0$ then
5:     $s[u^r_{src}]^{out}_{last} \leftarrow dst$
6:     $s[u^r_{src}]^{out}_{next} \leftarrow dst$
7: end if
8: if EnterMode = Real and $src \neq s[u^r_{dst}]^{in}_{last}$ then
9:     $w(h^r_{src \to dst}) \leftarrow w(h^r_{src \to dst}) + 1$
10:     if $(w(h^r_{src \to dst}) \geq \tau(r)$ or $src = dst)$ and $W(h^r_{src \to dst}) = 0$ then
11:         $W(h^r_{src \to dst}) \leftarrow 1$
12:         if $r < R_{max}$ then
13:             Allocate $u^{r+1}_k$ and form $v^{r+1}_{k|src \to dst}$
14:         end if
15:     end if
16: end if
17: $src' \leftarrow s[u^r_{dst}]^{in}_{last}$
18: if $W(h^r_{src \to dst}) = 1$ then
19:     return $k$ if $v^{r+1}_{k|src \to dst}$ exists
20: else if $src \neq src'$ and $src' \neq null$ then
21:     $s[u^r_{src'}]^{out}_{last} \leftarrow dst$
22:     $s[u^r_{src'}]^{out}_{next} \leftarrow dst$
23:     return $k$ if $v^{r+1}_{k|src' \to dst}$ exists
24: end if
25: return $null$

FIG. 24B

Algorithm 3 LENGTH($h^r_{src \to dst}$)

Input: The newly formed horizontal connection $h^r_{src \to dst}$
Output: The computed length of $h^r_{src \to dst}$ 1: if $r = 1$ then
2:     return 1
3: end if
4: $length \leftarrow 0$
5: while True do
6:     $left \leftarrow j$ from an existing $v^r_{src[i \to j]}$
7:     $center \leftarrow i$ from an existing $v^r_{dst[i \to j]}$
8:     $right \leftarrow j$ from an existing $v^r_{dst[i \to j]}$
9:     $length \leftarrow length + l(h^{r-1}_{center \to right})$
10:     if $left = center$ then
11:         return $length$
12:     end if
13:     if $w(h^{r-1}_{left \to center}) > 0$ then
14:         return $length + l(h^{r-1}_{left \to center})$
15:     end if
16:     if $r - 1 = 1$ then
17:         return $length + 1$
18:     end if
19:     $r \leftarrow r - 1$
20:     $src \leftarrow left$
21:     $dst \leftarrow center$
22: end while

FIG. 24C

Algorithm 4 ALERT-LIKELY-UNITS()

Output: Updates the $s[u_k^r]_{likely}^{in}$ and $s[u_k^r]_{last}^{in}$ switches 1:   $s[u_k^r]_{likely}^{in} \leftarrow false$ for all $f$Net units
2:   for $r \leftarrow 1, 2, ..., R_{Max}$ such that $A(r) \neq null$ do
3:       for all $dst$ such that $W(h_{A(r) \to dst}^r) = 1$ do
4:          $residual \leftarrow l(h_{A(r) \to dst}^r)$
5:          for $r' \leftarrow r, r-1, ..., 1$ do      ▷ Note the 1based region numbering
6:             break if $s[u_{dst}^{r'}]_{likely}^{in} = true$      ▷ For improved efficiency
7:             $s[u_{dst}^{r'}]_{likely}^{in} \leftarrow true$
8:             $s[u_{dst}^{r'}]_{last}^{in} \leftarrow A(r')$
9:             break if $r' = 1$
10:            $*, c \leftarrow i, j$ from an existing $v_{A(r')|i \to j}^{r'}$
11:            $d, e \leftarrow i, j$ from an existing $v_{dst|i \to j}^{r'}$
12:            $residual \leftarrow residual - l(h_{d \to e}^{r'-1})$
13:            if $c = A(r'-1)$ and $w(h_{c \to d}^{r'-1}) > 0$ and $residual > 0$ then
14:               $dst \leftarrow d$
15:            else
16:               break
17:            end if
18:          end for
19:       end for
20: end for

FIG. 24D

Algorithm 5 PREDICT-ATTENTION-MOVES()

Output: Updates the $s[u_k^r]_{next}^{out}$ switches

1: $p' \leftarrow null$
2: for $r \leftarrow R, R-1, ..., 1$ do  ▷ Note the 1based region numbering
3:    if $A(r) \neq null$ then
4:       $p \leftarrow s[u_{A(r)}^r]_{last}^{out}$
5:       $p \leftarrow p'$ if $p' \neq null$
6:       $s[u_{A(r)}^r]_{next}^{out} \leftarrow p$
7:       if $r > 1$ and $p \neq null$ then
8:          $i', j' \leftarrow i, j$ from an existing $v_{p|i \to j}^r$
9:          $p' \leftarrow null$
10:         if $i' = A(r-1)$ then
11:            $p' \leftarrow j'$
12:         else if $w(h_{A(r-1) \to i'}^{r-1}) > 0$ then
13:            $p' \leftarrow i'$
14:            $s[u_{j'}^{r-1}]_{next}^{out} \leftarrow j'$
15:         end if
16:       end if
17:    end if
18: end for

FIG. 24E

Algorithm 6 SELECTIVE-ACTION-POLICY-SEARCH()

Input: $f$Net state $A(r), r = 1, 2, ..., R$
Output: Utilities $Q(a)$ of executing admissible actions $a$ 1: Backup ← $f$Net state & switches
2: EnterMode ← Imaginary
3: $Q(a) \leftarrow -\infty$ for all actions $a$
4: for all $(a^{(1)}, a^{(2)}, ..., a^{(T'-1)}) \in \Pi^{T'-1}$ do
5:     for $t \leftarrow 1, 2, ..., T^\infty$ do
6:        $a^{(t)} \leftarrow s[u^1_{A(1)}]^{out}_{next}$ if $t \geq T'$
7:        ENTER($a^{(t)}$)
8:        $o^{(t)} \leftarrow s[u^1_{A(1)}]^{out}_{next}$
9:        ENTER($o^{(t)}$)
10:     end for
11:     $q \leftarrow \sum_{t=1,...,T^\infty} (reward[a^{(t)}] + reward[o^{(t)}]) \cdot \delta^t$
12:     $q \leftarrow q +$ CFR()
13:     $Q(a) \leftarrow \max\{Q(a), q\}$
14:     $f$Net state & switches ← Backup
15: end for

FIG. 24F

Algorithm 7 SELECTIVE-OPTION-POLICY-SEARCH()

Input: $f$Net state $A(r), r = 1, 2, ..., R$
Output: Utilities $Q(a)$ of executing admissible actions $a$ 1: $Q(a) \leftarrow -\infty$ for all actions $a$
2: for $r \leftarrow 1, 2, ..., R$ such that $A(r) \neq null$ do
3:     for all $k$ such that $w(h^r_{A(r) \to k}) > 0$ do
4:        if FEASIBLE($\Phi^r_k, [A(r')]^r_{r'=1}$) then
5:           $\Phi \leftarrow$ UNPACK($\Phi^r_k, [A(r')]^r_{r'=1}, l(h^r_{A(r) \to k})$)
6:           $q \leftarrow \sum_{(k,t) \in \Phi} reward[u^t_k]$
7:           Backup ← $f$Net state & switches
8:           $q \leftarrow q +$ ROLLOUT-AFTER($\Phi^r_k, l(h^r_{A(r) \to k})$)
9:           $q \leftarrow q +$ CFR()
10:           $f$Net state & switches ← Backup
11:           $a \leftarrow k$
12:           for $r' \leftarrow r, r-1, ..., 2$ do
13:              $src, dst \leftarrow i, j$ from an existing $v^{r'}_{a|i \to j}$
14:              $a \leftarrow dst$ if $A(r'-1) = src$, else $a \leftarrow src$
15:           end for
16:           $Q(a) \leftarrow \max\{Q(a), q\}$
17:        end if
18:     end for
19: end for

FIG. 24G

Algorithm 8 FEASIBLE($\Phi_k^r$, A)

Input: Option $\Phi_k^r$ and an $f$Net state A
Output: True if the option is feasible and False otherwise 1: if $r = 1$ then
2:     return ($motor[u_k^1]$ =True or A[1] $= k$ or $s[u_{\mathbf{A}[1]}^1]_{next}^{out} = k$)
3: else
4:     $src, dst \leftarrow i, j$ from an existing $v_{k|i \to j}^r$
5:     return False if A$[r-1] \neq src$ and $w(h_{\mathbf{A}[r-1] \to src}^{r-1}) = 0$
6:     return False if A$[r-1] \neq src$ and FEASIBLE($\Phi_{src}^{r-1}$, A) = False
7:     return True if $s[u_{src}^{r-1}]_{next}^{out} = dst$
8:     $\mathbf{A}' \leftarrow clone(\mathbf{A}); k' \leftarrow src$
9:     for $r' = r-1, r-2, ..., 1$ do
10:         $\mathbf{A}'[r'] \leftarrow k'$
11:         $k' \leftarrow j$ from an existing $v_{k'|i \to j}^{r'}$
12:     end for
13:     return FEASIBLE($\Phi_{dst}^{r-1}$, $\mathbf{A}'$)
14: end if

FIG. 24H

Algorithm 9 UNPACK($\Phi_k^r$, A, $t$)

Input: Option $\Phi_k^r$, $f$Net state A and expected completion time $t$ of the option
Output: Set of region 1 units indexed by the unpacking time 1: if $r = 1$ then
2:     return $\{(k, t)\}$
3: end if
4: $src, dst \leftarrow i, j$ from an existing $v_{k|i \to j}^r$
5: if A$[r-1] = src$ then
6:     return UNPACK($\Phi_{dst}^{r-1}$, A, $t$)
7: else
8:     $\mathbf{A}' \leftarrow clone(\mathbf{A}); k' \leftarrow src$
9:     for $r' = r-1, r-2, ..., 1$ do
10:         $\mathbf{A}'[r'] \leftarrow k'$
11:         $k' \leftarrow j$ from an existing $v_{k'|i \to j}^{r'}$
12:     end for
13:     return UNPACK($\Phi_{src}^{r-1}$, A, $t - l(h_{src \to dst}^{r-1})$) $\cup$ UNPACK($\Phi_{dst}^{r-1}$, $\mathbf{A}'$, $t$)
14: end if

FIG. 24I

Algorithm 10 ROLLOUT-AFTER($\Phi_k^r, l$)

Input: Option $\Phi_k^r$ and a relative time $l$ when the option is completed
Output: Sum of rewards for the rollout after the option is completed 1: $dst \leftarrow k$
2: for $r' = r, r+1, ..., R$ do
3:     $src \leftarrow A(r')$
4:     $A(r') \leftarrow dst$
5:     if $v_{k'|src \rightarrow dst}^{r'+1}$ exists then
6:         $dst \leftarrow k'$
7:     else
8:         break
9:     end if
10: end for
11: $dst \leftarrow k$
12: for $r' = r, r-1, ..., 1$ do
13:     $A(r') \leftarrow dst$
14:     $dst \leftarrow j$ from an existing $v_{dst|i \rightarrow j}^{r'}$
15: end for
16: PREDICT-ATTENTION-MOVES()
17: for $t \leftarrow 1, 2, ..., T^\infty$ do
18:     $a^{(t)} \leftarrow s[u_{A(1)}^1]_{next}^{out}$
19:     ENTER($a^{(t)}$)
20:     $o^{(t)} \leftarrow s[u_{A(1)}^1]_{next}^{out}$
21:     ENTER($o^{(t)}$)
22: end for
23: return $\sum_{t=1,...,T^\infty} (reward[a^{(t)}] + reward[o^{(t)}]) \cdot \delta^{l+t}$

FIG. 24J

Algorithm 11 EXHAUSTIVE-OPTIONS-LIST()

Input: *f*Net state $A(r), r = 1, 2, ..., R$
Output: Exhaustive list of applicable options $\Phi_k^r$ and their completion times
Auxiliary: list $L_r$ of tuples $(k, t, b)$ where $k$ is the option unit id within region $r$; $t$ is the option completion time and $b \in \{true, false\}$ is a temporary value that determines whether the candidate option could still be used to *parse* an attended-to unit in some region above $r$.

1: $L_1 \leftarrow \{(s[u_{A(1)}^1]_{next}^{out}, 1, true)\} \cup \{(k, 1, true) \text{ s.t. } motor[u_k^1] = true\}$
2: for $r = 1, 2, ..., R$ do
3:     if $L_r \neq \emptyset$ then
4:         for all $(k, t, b) \in L_r$ do
5:             $b' \leftarrow b$
6:             if $A(r) \neq null$ and $b = true$ and $W(h_{A(r) \to k}^r) = 1$ then
7:                 $k' \leftarrow k'$ from an existing $v_{k'|A(r) \to k}^{r+1}$
8:                 $L_{r+1} \leftarrow L_{r+1} \cup \{(k', t, true)\}$
9:                 $b' \leftarrow false$
10:            end if
11:            if $A(r) = null$ or $w(h_{A(r) \to k}^r) = 0$ then
12:                 $b' \leftarrow false$
13:            end if
14:            for all $j$ s.t. $W(h_{k \to j}^r) = 1$ do
15:                 $k' \leftarrow k'$ from an existing $v_{k'|k \to j}^{r+1}$
16:                 $L_{r+1} \leftarrow L_{r+1} \cup \{(k', t + l(h_{k \to j}^r), b')\}$
17:            end for
18:         end for
19:     end if
20: end for
21: return $\{(\Phi_k^r, t) \text{ for all } (k, t, b) \in L_r, r = 1, 2, ..., R\}$

FIG. 24K

Algorithm 12 Synchronous-Non-Focusing-Agent($F_{max}$)

Input: The maximum number $F_{max}$ of domain engine frames

1: for $F_{counter} \leftarrow 1, 2, ..., F_{max}$ do
2:     $actions \leftarrow$ AdmissibleDomainActions()
3:     $\{Q(a)\}_{a \in actions} \leftarrow$ CalculateActionUtilities($actions$)
4:     $a^* \leftarrow \arg\max_{a \in actions}\{Q(a)\}$
5:     if Random($[0, 1]$) $< \epsilon$ then $a^* \leftarrow$ Random($actions$) end if
6:     $(obs, reward) \leftarrow$ ExecuteDomainAction($a^*$)
7:     $f$Nets.ENTER($a^*$)
8:     $f$Nets.ENTER($obs$)
9:     if $reward \neq 0$ then $f$Nets.ENTER(discrete($reward$)) end if
10: end for

FIG. 24L

Algorithm 13 CalculateActionUtitlies($actions$)

Input: The set $actions$ of currently admissible actions
Output: $f$Nets aggregated utilities $Q(a)$ of executing actions $a \in actions$ 1: for $f$Net$_k \in f$Nets do
2:     $\{Q^k(a)\}_{a \in actions} \leftarrow f$Net$_k$.SELECTIVE-ACTION-POLICY()
3:     —or—
4:     $\{Q^k(a)\}_{a \in actions} \leftarrow f$Net$_k$.SELECTIVE-OPTION-POLICY()
5:     —or—
6:     $\{Q^k(a)\}_{a \in actions} \leftarrow f$Net$_k$.EXHAUSTIVE-OPTION-POLICY()
7: end for
8: for $a \in actions$ do
9:     $Q(a) \leftarrow \max_k\{Q^k(a) : Q^k(a) \geq 0\} + \min_k\{Q^k(a) : Q^k(a) \leq 0\}$
10: end for
11: return $\{Q(a)\}_{a \in actions}$

FIG. 24M

Algorithm 14 Synchronous-Focusing-Agent($F_{max}$, $S_{max}$)

Input: The maximum number $F_{max}$ of domain engine frames; The maximum number $S_{max}$ of focusing actions per each domain frame.

1: $F_{counter} \leftarrow 1$
2: $S_{counter} \leftarrow 0$
3: while $F_{counter} < F_{max}$ do
4:     $actions \leftarrow$ AdmissibleDomainActions()
5:     $actions \leftarrow actions +$ AdmissibleFocusingActions() if $S_{counter} < S_{max}$
6:     $oracles \leftarrow$ PerceivableOracleObservations()
7:     $\{Q(a)\}_{a \in actions} \leftarrow$ CalculateActionUtilities($actions$)
8:     $a^* \leftarrow \arg\max_{a \in actions}\{Q(a)\}$
9:     if Random($[0,1]$) $< \epsilon$ then $a^* \leftarrow$ Random($actions$) end if
10:     $f$Nets.ENTER($a^*$)
11:     if $a^*$ is a focusing action then
12:         $S_{counter} \leftarrow S_{counter} + 1$
13:         $obs \leftarrow$ ExecuteFocusingAction($a^*$)
14:         $f$Nets.ENTER($obs$)
15:     else
16:         $S_{counter} \leftarrow 0$
17:         $F_{counter} \leftarrow F_{counter} + 1$
18:         ($oracles_{modified}$, $reward$) $\leftarrow$ ExecuteDomainAction($a^*$)
19:         if $reward \neq 0$ then $f$Nets.ENTER(discrete($reward$)) end if
20:         if $|oracles_{modified}| > 0$ then
21:             ($actions, oracles$) $\leftarrow$ ExtractFrom($oracles_{modified}$)
22:             $\{Q(a)\}_{a \in actions} \leftarrow$ CalculateActionUtilities($actions$)
23:             $a^* \leftarrow \arg\max_{a \in actions}\{Q(a)\}$
24:             $obs \leftarrow$ ExecuteFocusingAction($a^*$)
25:             $f$Nets.ENTER($a^*$)
26:             $f$Nets.ENTER($obs$)
27:         else
28:             goto line 17
29:         end if
30:     end if
31: end while

FIG. 24N

Algorithm 15 Asynchronous-Focusing-Agent($F_{max}, S_{max}$)

Input: The maximum number $F_{max}$ of domain engine frames; The maximum number $S_{max}$ of focusing actions per each domain frame.

1:   $a^*_{current} \leftarrow 0$
2:   $S_{counter} \leftarrow 0$
3:   $F_{counter} \leftarrow 1$
4:   while $F_{counter} < F_{max}$ do
5:       $actions \leftarrow$ AdmissibleDomainActions() + AdmissibleFocusingActions()
6:       $oracles \leftarrow$ PerceivableOracleObservations()
7:       $\{Q(a)\}_{a \in actions} \leftarrow$ CalculateActionUtilities($actions$)
8:       $a^* \leftarrow \arg\max_{a \in actions}\{Q(a)\}$
9:       if Random($[0, 1]$) $< \epsilon$ then $a^* \leftarrow$ Random($actions$) end if
10:      $q_{max} \leftarrow \max_{a \in actions}\{Q(a)\}$
11:      $q_{min} \leftarrow \min_{a \in actions}\{Q(a)\}$
12:      if $a^*_{current} = 0$ and ($q_{max} > 0$ or $q_{min} < 0$ or $a^*$ is Random) then
13:          $f$Nets.ENTER($a^*$)
14:          if $a^*$ is a focusing action then
15:             $obs \leftarrow$ ExecuteFocusingAction($a^*$)
16:             $f$Nets.ENTER($obs$)
17:          else
18:             $a^*_{current} \leftarrow a^*$
19:          end if
20:      end if
21:
22:      $S_{counter} \leftarrow S_{counter} + 1$
23:      if $a^*_{current} \neq 0$ or $S_{counter} > S_{max}$ then
24:          $S_{counter} \leftarrow 0$
25:          $F_{counter} \leftarrow F_{counter} + 1$
26:          ($oracles_{modified}$, $reward$) $\leftarrow$ ExecuteDomainAction($a^*_{current}$)
27:          if $reward \neq 0$ then $f$Nets.ENTER(discrete($reward$)) end if
28:          if $|oracles_{modified}| > 0$ then
29:             ($actions, oracles$) $\leftarrow$ ExtractFrom($oracles_{modified}$)
30:             $\{Q(a)\}_{a \in actions} \leftarrow$ CalculateActionUtilities($actions$)
31:             $a^* \leftarrow \arg\max_{a \in actions}\{Q(a)\}$
32:             $obs \leftarrow$ ExecuteFocusingAction($a^*$)
33:             $f$Nets.ENTER($a^*$)
34:             $f$Nets.ENTER($obs$)
35:             $a^*_{current} \leftarrow 0$
36:          end if
37:      end if
38: end while

FIG. 24O

Algorithm 16 REWARD($\Phi_k^r$, A)

Input: Option $\Phi_k^r$ and the starting $f$Net state A
Cached: The discounted residual $reward[r, i, j]$ for executing option $\Phi_j^r$ in an $f$Net where the most recently activated unit (across the entire $f$Net) is $u_i^r$. (Discount factor = $\delta$ for every time step.)
Output: Discounted residual reward for executing $\Phi_k^r$ from $f$Net state A

1: $rew \leftarrow 0$
2: for $r' \leftarrow r, r-1, ..., 2$ do
3: $\quad src, dst \leftarrow i, j$ from an existing $v_{k|i \to j}^{r'}$
4: $\quad$ if $\mathbf{A}[r'-1] == src$ then
5: $\quad\quad k \leftarrow dst$
6: $\quad$ else
7: $\quad\quad rew \leftarrow rew \cdot \delta^{l(h_{src \to dst}^{r'-1})} + reward[r'-1, src, dst]$
8: $\quad\quad k \leftarrow src$
9: $\quad$ end if
10: end for
11: return $rew + reward[u_k^1]$

FIG. 24P

AUTONOMOUS, WORLD-BUILDING, LIFELONG LEARNING AGENTS AND COMPUTING ENGINES FOR GENERAL-PURPOSE INTELLIGENCE

CROSS REFERENCE TO RELATED APPLICATIONS

This application a continuation application of International Patent Application No. PCT/US2023/017633, filed Apr. 5, 2023, which claims the benefit of U.S. Provisional Application No. 63/362,466, filed Apr. 5, 2022, each of which is hereby incorporated by reference in its entirety.

BACKGROUND

Cortical Computing Engine (CCE) is a new connectionist artificial general intelligence (AGI) framework. CCE improves over artificial neural networks (ANN) by correcting for their insufficiencies in comparison with a biological brain and known properties of intelligence; CCE improves on desirable properties of machine intelligence such as common-sense reasoning, causality, generalization, and data efficiency, and in so doing, it succeeds in circumventing critical deficiencies for ANN. What sets CCE apart is that: (i) CCE grows its parametric model, versus assumes a fixed number of parameters; (ii) CCE employs local, Hebbian-type learning, and thus can work with non-differentiable models and software frameworks; (iii) CCE learns a continuous-time model of the world, versus a model that is batched into discrete sequences—that is, a continuum versus a time series, respectively; and (iv) CCE is an integrated, naturally parallelizable cellular automata-type algorithm, versus a collection of heterogeneous, pre-defined modules. CCE has already demonstrated critical cognitive abilities for AGI, maintaining desirable properties such as processing multi-modal data inputs concurrently with spatio-temporal representations at multiple scales, generalizability and flexibility to adapt and learn over time, autonomy (including underspecified domains and unsupervised problems), interpretability that behooves both inspection and introspection, and performance in myriad goal-oriented and explore-exploit settings.

SUMMARY

In one aspect, disclosed herein are systems for determining domain observations of an environment.

In some embodiments, systems may include a domain engine module configured to generate a first set of domain observations from the environment.

In some embodiments, systems may include an active sensing module configured to (i) receive the first set of domain observations, (ii) generate a second set of domain observations from the first set of domain observations, and (iii) generate a first set of sim actions.

In some embodiments, systems may include a fractal network module configured to (i) receive the second set of domain observations, (ii) receive the first set of sim actions, (iii) generate one or more fractal networks associated with the second set of domain observations and/or the first set of sim actions, (iv) generate an observation sequence from the one or more fractal networks, and (v) compare the observation sequence to the first set of domain observations.

In some embodiments, systems may include an execution agent module configured to (i) generate a second set of sim actions based on the observation sequence and (ii) transmit the second set of sim actions to the active sensing module.

In some embodiments, the second set of sim actions causes the active sensing module and/or the domain engine to generate another set of domain observations and/or another set of sim actions.

In some embodiments, the domain engine module generates the first set of domain observations at one or more rates or upon one or more events.

In some embodiments, the first set of domain observations comprises one or more temporal observations, spatial observations, or spatio-temporal observations.

In some embodiments, the first set of domain observations comprises one or more visual observations, textual observations, auditory observations, vector observations, or scalar observations.

In some embodiments, the second set of domain observations comprises a transformation of the first set of domain observations.

In some embodiments, the active sensing module includes one or more active sensing modules, each active sensing module comprising: a focusing head module configured to focus on or select a first part of each domain observation; a data architecture module configured to generate nodes associated with the first part of each domain observation; and a perception module configured to generate perceived observations associated with a second part of each domain observation, wherein the second part is nearby the first part of each domain observation.

In some embodiments, a number of the one or more active sensing modules dynamically changes in real-time based at least on receiving a new type of domain observation.

In some embodiments, the fractal network module includes one or more fractal networks, each fractal network comprising a compute unit configured to store one or more placeholder values associated with operations of each fractal network.

In some embodiments, a number of the one or more fractal networks dynamically changes in real-time based at least on receiving a new type of domain observation.

In some embodiments, each of the one or more fractal networks grows independently from another fractal network to optimize a capture of the observation sequence.

In some embodiments, each of the one more fractal networks iteratively learns using the first set of domain observations, the second set of domain observations, the first set of sim actions, or the second set of sim actions.

In some embodiments, each of the one or more fractal networks is iteratively trained to reach a confidence level associated with determining a relationship between each domain observation of the first set of domain observations and the observation sequence.

In some embodiments, each of the one or more fractal networks is configured as an elastic architecture with one or more regions arranged in a linear manner or a nonlinear manner.

In some embodiments, each of the one or more fractal networks is configured to change a position of the one or more regions in the elastic architecture to another position of the one more regions in the elastic architecture.

In some embodiments, a compute unit of one region is dynamically connected to compute units of other regions during operation of the fractal network module using one or more horizontal electrical connections or one or more vertical electrical connections.

In some embodiments, each compute unit of the one or more regions is configured with one or more placeholders associated with arithmetic operations or logic operations.

In some embodiments, the execution agent comprises a synchronous non-focusing agent.

In some embodiments, the execution agent comprises a synchronous focusing agent.

In some embodiments, the execution agent comprises an asynchronous focusing agent.

In some embodiments, the execution agent utilizes a counterfactual control to instruct the fractal network module to determine future sim actions or future observations.

In some embodiments, the environment comprises a computational domain or a cyber-physical domain.

In some embodiments, the transformation comprises a reduced resolution or an amplified resolution of the first set of domain observations.

In some embodiments, the second set of domain observations occurred at a same time as the first set of domain observations.

In some embodiments, the data architecture module comprises a quad-tree structure, an oct-tree structure, a kd-tree structure, or any combination thereof.

Additional aspects and advantages of the present disclosure will become readily apparent from the following detailed description, wherein only illustrative embodiments of the present disclosure are shown and described. As will be realized, the present disclosure is capable of other and different embodiments, and its several details are capable of modifications in various obvious respects, all without departing from the present disclosure. Accordingly, the drawings and description are to be regarded as illustrative in nature and not as restrictive.

INCORPORATION BY REFERENCE

All publications, patents, and patent applications mentioned in this specification are hereby incorporated by reference to the same extent as if each individual publication, patent, or patent application was specifically and individually indicated to be incorporated by reference. To the extent publications and patents or patent applications incorporated by reference contradict the present disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings of which:

FIGS. 20A-20D illustrate a non-limiting example of a focusing simulator in a spatial modality;

FIG. 23B is a continuation of FIG. 23A. For example, FIG. 23A illustrates the first portion of FIGS. 23A-23B, and FIG. 23B illustrates the second portion of FIGS. 23A-23B; and FIGS. 24A-24P illustrate non-limiting examples of algorithms, e.g., Algorithms 1-16.

DETAILED DESCRIPTION

Figure 1:
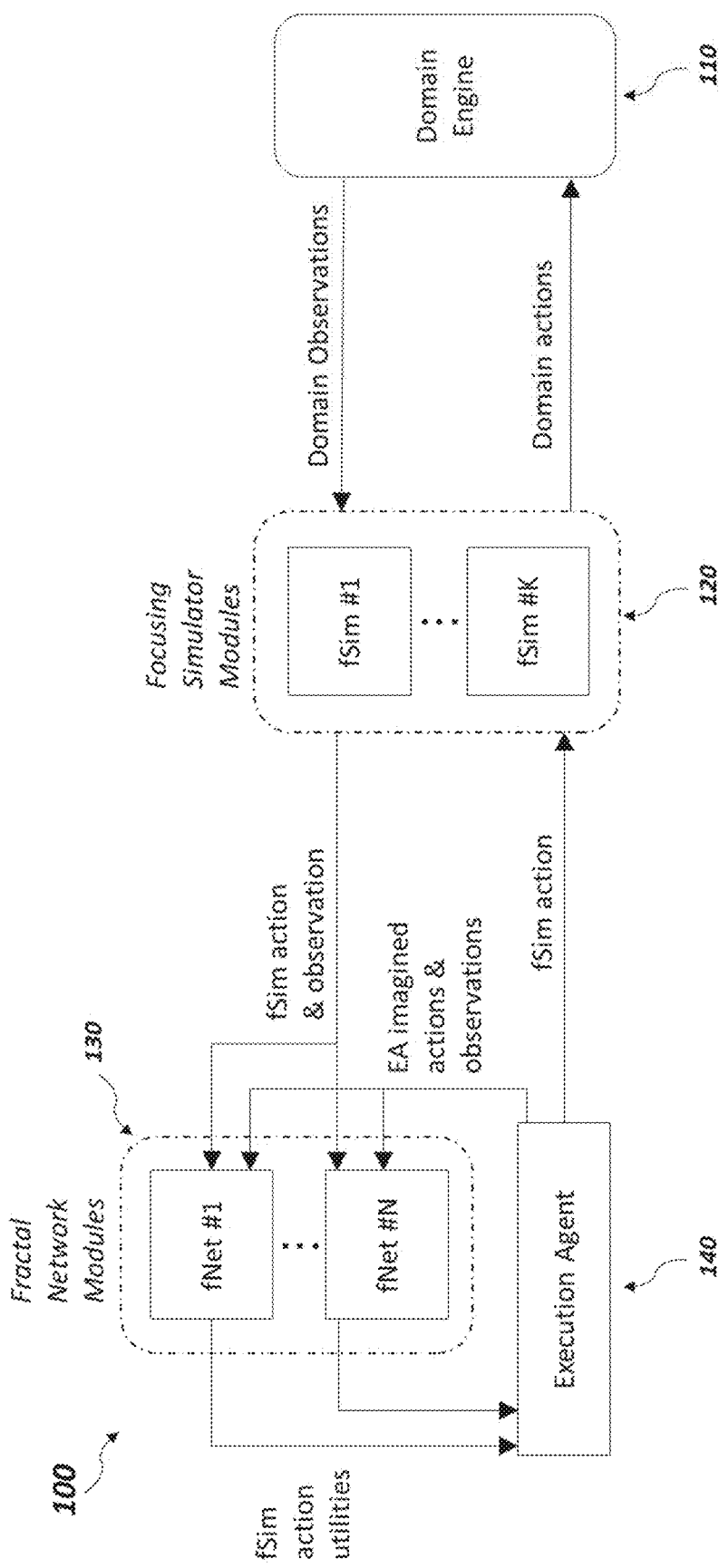
FIG. 1 illustrates a non-limiting example of a cortical computing engine (CCE) system, described herein.

While various embodiments of the present disclosure have been shown and described herein, such embodiments are provided by way of example only. Numerous variations, changes, or substitutions may occur without departing from the present disclosure. It should be understood that various alternatives to the embodiments of the present disclosure described herein may be employed.

Described are systems for determining domain observations of an environment. Systems may include: a domain engine module, an active sensing module, a fractal network module, and an execution agent module. Modules may be configured to perform methods for determining domain observations of an environment. Methods may include generating or receiving domain observations, generating or receiving sim actions, generating fractal networks associated with the domain observations or the sim actions, generating observation sequences from the fractal networks, and comparing the observation sequences to the domain observations. In some cases, the environment comprises a computational domain or cyber-physical domain.

1.0 Motivation

Following a period of initial excitement (mid-1970s) and later subdued interest, recent years (2010s) have again seen a rise of interest in artificial neural networks (ANN). As a subclass of gradient based, supervised machine learning methods, ANNs have been known for decades to be trainable for examples using an application of the differentiation chain rule to fit the labelled examples to a given parametric model. What has recently made ANNs attractive was that they have benefited greatly from the abundance of labelled training data as well as the development of the semi- and fully-dedicated hardware to accelerate the aforementioned differentiation process. And the replacement of a standard sigmoid activation function with a half-linear rectifier unit has allowed for easier gradient propagation through the network, allowing for training deeper ANN architectures end-to-end. These fundamental advances in training ANNs have then conspired towards a more efficient training of approximate dynamic programming reinforcement learning agents that use ANNs to approximate their underlying state spaces. Of the modern methods that employ this principle, the policy-gradient methods such as the Asynchronous Advantageous Actor-Critic (A3C) or the value-gradient methods such as the Deep Q-Learning® (DQN) have gained most traction, demonstrating their soundness on domains ranging from Atari® 2600 games to the ancient game of Go.

Despite the remarkable success in applying the ANN-equipped, approximate dynamic programming (ADP) algorithms to a range of video games, it starts to appear that their applicability to solving arbitrary problems out of the box—as necessitated by AGI—is questionable. For example, even an individual, visual processing CNN module that often accompanies ANN-based agents can easily be fooled by changes in a scene hue or saturation, rotations or even single pixel alterations. And while this obviously is disappointing, it is also potentially risky and detrimental to the rate of progress at which the scientific community pursues the AGI: As more and more compute and human resources are pooled together and devoted to solely one approach (to make an ever incremental advance in our quest for AGI), alternative approaches unequivocally suffer from the deprivation of these resources.

To better illustrate that risk and motivate the urgent need for a shift in resource allocation to benefit the alternative approaches to AGI, in the following, listed are at least 10 limitations of ANN-based ADP algorithms, that are believed to jointly conspire towards rendering the ANN-based approaches towards AGI rather impractical.

1.1 Problem: Task Ignorant Model Architecture.

The analysis of ANN limitations—in terms of their applicability to AGI-begins with a focus on the arguably first thing that comes to mind when talking about ANNs: the network architecture. Of late, great efforts have been devoted towards dissecting the AGI problem and proposing fancy architectures (for isolated AGI sub-problems, e.g., vision, control, etc.) that excel at given benchmark problems with the overall consensus being that there is no "one-shoe fits all" design when it comes to architecture design. In fact, there has been an outstanding dilemma as to whether to employ rather general-purpose architectures (e.g., fully connected ResNets wherein the trained network itself can choose an optimal subset of connections or layers to use) that unfortunately lead to slow convergence, or, problem-specific architectures (e.g., ConvNets or RNNs that employ reusable receptive fields over a chosen number of layers, optimal for a given problem at hand) that are much easier to train. Because it is likely that a future AGI agent will tackle new tasks that it has not seen before (e.g., tasks that are much different from the tasks in the tiny set of tasks the agent has seen during training) it is unfortunately also likely that the agent architecture will not be optimal for said new task. That is, even if the agent was allowed to retrain itself (adjust its ANN weights) at evaluation time, it is almost certain that its pre-existing, problem agnostic architecture would not be a best fit to the new problem at hand.

In essence, because the ANN model architecture (as well as the initial values of its parameters) can be chosen and fixed prior to seeing the training data, said network architecture will rarely be optimal for a given problem at hand. This is in direct contrast to an approach that we propose that starts with an FPGA-type, blank compute fabric and actually grows its network of relevant connections, towards an optimal encoding of the data that the algorithm is presented with. Remarkably, the brain cortex appears to be employing a somewhat similar learning principle: The number of cortical connections of a newborn is not fixed, but instead undergoes a rapid growth, until a baby is around 3 years old.

1.2 Problem: Task Interference Through Model Inflexibility.

The expectation of researchers that choose to pursue an ANN-based roadmap to AGI is that an agent trained on a sufficiently large number of diverse tasks will then be able to generalize to essentially cover all the remaining tasks that the agent can encounter. However, if it turns out that the agent does encounter new tasks that it struggles to solve, or if desirable to adapt to changes of non-stationary domains, the agent can be retrained. That is, the ANN controlling the agent would be presented the new training data and the learning rate would be increased accordingly. And while this may indeed allow the agent to learn how to handle the new task, the agent would run the risk of forgetting how to handle the old tasks, as the optimized ANN that used to encode how to handle old tasks would now have to share its memory with the encoding of how to handle the new task. In essence, the new agent knowledge that has been encoded in the ANN, would interfere with the old knowledge, impacting the agent overall performance. For example, an agent may first be trained to gain a skill to drive a manual-transmission car in the US (where the stick is operated with the right hand), and later (re) trained to gain a skill to drive a manual-transmission can in the UK (where the stick is operated with the left hand). These two learned skills may then start critically interfering with each, resulting in a non-zero probability of the agent wanting to simultaneously use both hands to operate the stick.

As an alternative strategy for the agent to handle the new task without forgetting how to handle the old tasks, the agent could be instructed to freeze its old ANN and glue it with an ANN constructed for the new task at hand. (Note, that such gluing requires adding not only the parameters of a new ANN but also potentially inter-ANN parameters, from the neurons of the old ANN to the neurons of the new ANN, in hopes of reusing the already optimized filters of the old ANN during training of the new ANN.) However, given the exponential increase of the ANN number of parameters with each new task to be learned and the vast number of novel real-world problems that an AGI agent could potentially encounter, such expansionist strategy is unlikely to be scalable. (The strategy would also be in conflict with learning at a meta-level, as an AGI agent should itself be capable of discovering if and when to expand its network to handle a new task properly.)

These two critical limitations of ANN-based AGI agents: interfering or inefficient learning of novel tasks after the agent has been deployed, are a direct result of the inflexibility of ANN models. That is, being monolithic black-box of a fixed size, an ANN may not be slightly extended to handle novel tasks in a stable and scalable fashion. Granted, multiple ANNs can be composed together to form a bigger ANN, yet they may not be extended in a lightweight fashion, to handle only the unique features of a new task at hand. (A good analogy here is with the object oriented programming languages wherein new classes can be created both using composition of already existing classes as well as using lightweight extension/inheritance from existing classes. The latter approach is especially efficient as it results in a new sub-class that shares the common properties of the super-class to which it applies its differentiating set of features or patches.)

What is postulated here is that a modern connectionist approach to AGI should assume an elastic rather than inflexible network architecture and thus have the ability to slightly expand it when desired (e.g., increment the number of network layers or assigned to it compute units/neurons) as well as to contract it whenever possible (to release the rarely used compute units/neurons for later reuse). In a sense, a compute fabric (e.g., a substrate) of a modern AGI approach should act similarly to an FPGA or a biological brain cortex wherein the corresponding programmable logic blocks or cortical microcolumns respectively have the ability to be assigned and reassigned to the continuously expanding and contracting model. An AGI system such designed should continuously recycle the unused parts of its compute fabric to later use them to produce patches to its existing model, to account for the new tasks/changes in the old tasks that its existing models fails to properly address.

1.3 Problem: Unidirectional Pass Through the Model.

What further impairs ANN extendability is the fact that the major information flow through an ANN is diametrically different from the information flow through a brain cortex. That is, whereas in the ANN the information first enters the input layer, then flows unidirectionally through the network (with possibly recurrent cycles) until it reaches the output layer at the other extreme of the network, the information in the brain cortex flows bidirectionally; it starts and terminates in the very same input/output layer at the one and only extreme end of the network (the other extreme end is unspecified/open).

Specifically, in a brain cortex, the raw sensory information enters the bottom layer in the cortical hierarchy of layers, gets processed and integrated in the underlying layer compute units (groupings of neurons referred to as minicolumns) and sent to a higher layer for further processing, if desired. This operation is then repeated in higher layers in the hierarchy until the information reaches some desired high-enough layer, e.g., in the prefrontal cortex where abstract information integration and higher level planning occur. The information flow responsible for the execution of plans then descends the cortical hierarchy of layers and gradually becomes less abstract, in that the information leaving the cortex is a stream of low-level motor commands that trigger the corresponding actuators.

There are two direct implications of such open-ended, bidirectional information flow strategy employed by the brain cortex that are of critical importance for continually learning AGI agents. Firstly, because the information flow does not have to always pass-through all the prespecified layers in the hierarchy (unlike in an ANN), but only to ascend to- and then descend from a desired, task specific level, a continually learning agent does not have to worry about its network being too shallow or too deep for a variety of tasks that it will have encountered. And secondly, the agent can always stack extra layers on top of its existing network, towards potentially increasing the agent performance, or even remove some layers from the top of the network towards reducing the network memory footprint while impairing the agent performance only gradually.

Towards building a continually learning AGI agent, the major information flow strategy in a new algorithm for AGI ought to follow the above-described information flow strategy in the brain cortex. It should likewise be bidirectional and start and terminate in the same network I/O layer at the bottom of the hierarchy of layers. As such, the agent could likewise expand or contract its network, towards maximizing the agent performance simultaneously on a variety of tasks, while maintaining a desired memory footprint.

1.4 Problem: Bounded Temporal Credit Assignment Window.

Of particular importance for AGI agents is to be able to make decisions in context of its observations from potentially arbitrary past. This is especially problematic for ANN-based agents as ANNs have been known for a long time now to suffer from the temporal credit assignment problem. And the problem is relevant to not only feed-forward ANNs but unfortunately also recurrent ANNs that come equipped with memory cells meant to overcome it.

It is straightforward to understand why the feed-forward ANNs may not remember the observations from the arbitrary past. The network output is conditioned solely on the network input which itself is of only limited size, prescribed by a given network architecture. Consequently, only a fixed number of observations can make it into the network input layer, resulting in the underlying temporal window to either have a fixed temporal span or have ad-hoc temporal gaps. And although the size of this temporal window can in theory grow exponentially with the network depth (as demonstrated in the Google® WaveNet ANN architecture), in practice, the amount of memory that such ANN architectures prescribe to encode particular temporal dependencies is fixed and likely greatly inadequate for an arbitrary temporal credit assignment problem at hand.

The reason why recurrent ANNs may be unable to remember the relevant information from the past is more subtle. Recall that a recurrent ANN is likewise trainable using an application of the derivative-chaining rule, and as such, it too requires input vectors of a given fixed size. What is happening is that a recurrent ANN during training may be unrolled through T time steps, forming a feed-forward network of T modules of shared weights fed with consecutive T chunks of the input vector data, corresponding to T consecutive time steps. And what the network then learns is essentially how to best optimize its parameter space given the independent training examples of which each spans no more than T consecutive time steps. The result of such learning strategy is that, if there is some temporal correlation between two observations separated by more than T time steps, these observations will not jointly be part of any training example. And consequently, there will be no reason (or opportunity) for the optimization process to encode said correlation in the parameter space of a trained model. (While this problem can sometimes be alleviated by initializing the RNN neurons with a result of its pre-processing of a few more initial data-points of the underlying time series, this strategy could in practice work for only very short temporal dependencies, due to the problem of vanishing gradients over time.) For example, if an ANN is trained to predict the outside temperature in London in one hour intervals and T=24 then the model will potentially learn that there is a day-and-night temperature cycle but will have no opportunity to learn that the temperatures generally tend to be higher in the summer versus in the winter.

The immediate consequence of the ANN's general inability to learn to always remember the relevant information from the past is that the ANN-based AGI agents such as A3C/DQN are often (relatively) memoryless. The notion of what is relevant for them is predicated by what was relevant during the narrow temporal windows during agent training. And consequently, the agents may fail to condition the expected utility of their actions on all the relevant observations from the past. To see the consequence of this, consider an A3C/DQN agent playing, e.g., the "Montezuma's Revenge®" game. Herein, the agent often finds itself in a room wherein the optimal policy is to either go one way (if the agent does not have the key) or another (if the agent has the key). Yet, an agent whose policy is conditioned only on few recent observations (down-sampled to a resolution that no longer permits the agent to see if it has said key) can only follow a policy that is ignorant of the agent possession of the key. Likewise, a recurrent ANN-based agent would first be trained on a curriculum of toy level, short-duration "collect the key then open the door" tasks to improve the chances that its network registers the events when the agents collects the keys.

It is conjectured, that the brain approach to remedy to the temporal credit assignment problems may consist of circumventing the problem of fixed temporal windows by not having to rely on back-propagation, but instead employing a temporally delayed version of a localized Hebbian-learning rule.

1.5 Problem: Bottom-Up Learning of Final Representations.

It is somewhat surprising that one of the most notable features of ANNs: the compressed representations of domain signals that they find, are actually neither biologically accurate nor attractive enough for AGI agents. That is, the ANN learned representations are final (versus refine-able over the course of an agent life), hard to transfer to new domains (as they are anchored to specific, fine-grained sensory signals from an existing domain) and non-robust (and hence easily to fool), warranting an entirely different approach.

To illustrate the biological inaccuracy of the current ANN representation learning it is worth noting that a biological brain may not possibly be employing the bottom-up strategy of first learning the low-level, fine-grained representations, then use them to learn higher-level representations etc. because the brain simply does not perceive the fine-grained signals at all times. That is, the raw signals (visual, auditory, somatosensory) first pass through the dedicated signal aggregators and amplifiers (e.g., eye fixations on parts of the visible light spectrum or the amplification of the frequency bands on the cochlea) and as such, the vast majority of the information that the brain receives from the body sensors are actually in quite coarse resolution. And as long as this coarse resolution information is sufficient for the agent to achieving its objectives, no further signal amplifications/refinements are warranted. For example, even though the spots on a car windshield are visible at all times, they are for most of the time imperceptible to a trained driver who rarely chooses to amplify the visual signal at such short focal lengths.

Only once the signals perceived at the coarse resolution are no longer sufficient to achieve a given agent objective, the agent will make an effort to perceive signals at finer resolution: To this end, the agent will issue respective commands to its sensory signal amplification mechanisms to explore and magnify the chosen parts of the sensory spectrum in hopes of encountering snippets of higher-resolution signals that will have provided it with useful information for a given task at hand. It other words, the agent will build its internal representations of the environment incrementally, in a top-down fashion (as opposed to ANNs that build their representations in a bottom-up fashion, anchored at the bottom to high-resolution raw sensory signals), starting from blurry, low-resolutions signal approximations and gradually refining them with more detail, if desired. Consequently, domain objects that appear to be in uniform resolution, will actually end up being represented internally in the agent brain with variable resolution, depending on the required sensory complexity of the tasks that they have been involved with.

A direct opposite to the ANN representation learning strategy, the above-described brain strategy overcomes the issues with the refine-ability, transferability and exploitability that plague ANN learned representations. To begin with, notice how the ANN learned representations are non-refinable. That is, once an ANN learning concludes, the network parameters are final (optimized for a given task and a given resolution at which the task provides input signals to an ANN). Consequently, if this resolution at which the task signals are entered to the network later changes, the network will likely no longer perform as intended. For example, an image classification ANN would not be able to work out-of-the-box if the resolution at which the images are presented to it is doubled. (This is in direct opposition to, e.g., the family of pseudo-Hilbert curves that allow for a progressive refinement of signal representation and are not derailed when the signal resolution increases.) And because of this non refine-ability of ANN representations, the network will likely be retrained, which unfortunately may no longer be possible if an AGI agent is already deployed in the field.

The transfer of learned representations, equally important for AGI agents, has also been problematic for ANN-based agents. Partially responsible for this is that it is much harder to transfer across the domains the high-resolution object representations versus their coarse-grained approximations. For example, in the Atari 2600 learning environment, it is harder to transfer the high-resolution car sprites from the Enduro game to the Packman game where car sprites are gone and replaced with high-resolution sprites of creatures. If however these two distinct objects are represented using refinable resolution representation (as we conjecture may be the case in the brain cortex), the transfer may actually succeed. For example, an agent that learned to avoid bumping into cars in Enduro, represented in low-resolution as moving white blobs, may perform reasonably well when attempting to avoid being eaten by creatures in Pacman, also represented in low-resolution as moving white blobs.

Last but not least, the fact that the ANN learned representations include fine-grained signal filters in the lowest layers of the network exposes the network to adversarial attacks that are often imperceptible to a human observer. A cleverly designed attack exploits the amplification of the errors of ANN filter activations with the information propagating up the network: It involves the almost imperceptible (involving as little at just one pixel!), targeted perturbation of the fine-grained input signal that results in the lowest layer network filters to mis-categorize their input which in turn fools the higher-layer filters and so on. This often results in a stunning error, for example, where a pair of images that for a human observer appear to be identical (remember that a human observer perceives these images in low-resolution unless she chooses to magnify some parts of it) are recognized with close to 100 percent confidence to belong to entirely different categories. In contrast, because the human visual system first perceives the entire scene with low-resolution and only later chooses (if at all) to recursively magnify parts of it, it may not easily be fooled by the imperceptible input signal perturbations.

In summary, a viable representation learning system of an AGI agent ought to produce representations that are continually refinable with improving signal resolution, easily transferable to new domains and resilient to adversarial attacks. And while the bottom-up process of learning final ANN representations has led to many breakthroughs in machine learning, it has failed at producing representations that satisfy these three critical requirements of AGI agents. What is needed to remedy this situation is an approach for learning representations that, at least in principle, is similar to how we humans accomplish that task.

1.6 Problem: Episodic Learning.

Of the existing learning paradigms that ANNs embrace that are particularly unrealistic for either biological or AGI agents, episodic learning is especially notable. Proposed to facilitate agent learning, through the decomposition of a given agent domain into smaller, self-contained domains, episodic learning introduces two critical limitations for future AGI agents.

The first of these limitations is straightforward to understand: Because it is ultimately a role of the human task designers to decide how to distill from an agent domain its smaller chunks referred to as episodes, the partitioning itself is unavoidably ad-hoc. As such, there is risk that the isolated episodes will not contain all the relevant information that an agent desires, to be able to learn all the skills required for its success in the greater domain. For example, if in some episodes an agent encounters a seemingly useless object of type A (e.g., carbon dioxide) whereas in other episodes the agent encounters another seemingly useless object, of type B (e.g., hydrogen), then the agent will not have an opportunity to learn to combine these two objects to produce a potentially useful object of type C (methane, in our example). A continually learning AGI agent may in contrast have a greater chance of encountering over the course of its life both of these seemingly useless objects (A and B) and experiment with combining them, to reveal that they are in fact critical components to manufacture a useful object of type C.

The second limitation for AGI agents that episodic learning entails results in the underlying learning process to appear non-stationary. To understand the reason for that, it is important to first recall that the agent world is meant to always be reset prior to the beginning of each episode. This (arguably unrealistic) experiment design choice is deliberate and very convenient for ANN-based agents, as they no longer have to remember what happened in past episodes. (Note, that ANNs have been known to perform poorly in long-term memory tasks outside of their training domain, as explained earlier.) However, from the perspective of a continually learning agent, if the world state (e.g., that includes the agent made changes in said world) is silently reset in-between the episodes, the entire learning domain appears non-stationary and inherently non learnable. For example, in a Starcraft video game, a continually learning agent may remember that it has already harvested all the crystals from s given part of the world, and without being explicitly told that the episode has been restarted, never choose to send a harvester to that part of the world again.

In essence, although it often facilitates an ANN-based agent training, the ad-hoc human distillation of the agent domain into much shorter, seemingly self-contained episodes appears to be an artifact of non-AGI research. Not only does episodic learning potentially deprive the agents from skills whose learning requires exposure to a continuous set of episodes, but it also introduces fake domain non-stationarity that a continuous learning AGI agent would struggle to model. As such, research in building AGI agents should not employ the notion of episodes, neither at training nor testing time.

1.7 Problem: Data-Driven Learning on how to Reason.

A successful AGI agent ought to be able to not only recognize the input signal patterns and act on them reactively, using the responses retrieved from its already trained ANN, but also engage in proactive reasoning via planning for the potential futures as well as retrospective analysis of the counter-factuals from the past. And while in the brain there likely are dedicated processes responsible for such strategic planning or counterfactual reasoning, none of these processes are explicitly encoded in the parameters of an ANN.

Indeed, the only way for an ANN to approximate such reasoning (and perhaps only within a narrow scope of a given training domain) is to have this reasoning be inferable from the data the ANN is trained on. Exotic ANN architectures have thus been proposed to facilitate such implicit reasoning, with a somewhat similar overarching theme: They provide the ANN with external memory and a controller (e.g., a recurrent ANN) and allow the latter to tinker with the contents of the former, to achieve a desired objective on a given training task. Trained end-to-end, the distilled controller network can then be interpreted as engaging in some sort of reasoning on the contents of the external memory. And what is hoped for is that this implicit, narrow domain reasoning will later generalize to other domains, eventually covering the entire space of reasoning processes if only a sufficient number of training tasks is involved.

This implicit ANN reasoning strategy being sound notwithstanding, it is arguably not scalable for future AGI agents, as they would potentially have to be trained in advance on a prohibitively large number of rare reasoning tasks to know how to handle them in the future. For example, an agent may reason on such uncommon tasks as how to disentangle a pantyhose from the spokes of a bike. Tasks such as this will likely never be encountered by an average human, let alone be added in sufficient scale and variety to a training set of an ANN agent.

A much more efficient and scalable strategy (conjectured to be employed by the brain) is to equip the agent brain with the explicit, general purpose reasoning mechanisms such as counterfactual replay and preplay, and postpone the encoding of the actual reasoning processes until required by a task. In essence, given a task at hand, a scalable AGI reasoning system should employ its temporary memory to run and encode the results of its available "what-if" replay and preplay tests applied on said task. And only the relevant results of these tests should later be copied to the agent permanently memory, subsequently expanding the agent knowledge base with the additional "recipes" that the agent can now readily (without conscious reasoning) apply to said task in the future.

1.8 Problem: Unrealistic Agent Objectives.

A common objective of an ANN-based AGI agent is to maximize the total sum of discounted, expected rewards collected over the course of some episode during agent training. As such, an agent that follows such strategy is simply myopic, for the following reason: Although in theory the Q-value layer of a trained A3C/DQN does integrate all the rewards that the agent will collect when following the currently learned policy, in practice this is not the case. In infinite horizon planning problems, because the value of each Q-value layer neuron may need to be bounded (to allow for the gradients back-propagated through the network to be bounded), each subsequent reward that an agent expects to collect is discounted by a fixed $\gamma<1$ (with the discount effect exponentially compounding for subsequent actions, to produce a converging and hence bounded, geometric series of rewards) Consequently, the A3C/DQN agent undervalues the rewards expected to be encountered in distant future by a rather ad-hoc factor, with often disastrous impact on the agent performance. For example, if in the "Montezuma's Revenge®" game the agent is lured with a tiny, positive, immediate reward for entering a room that after a sufficiently long delay becomes a trap (which will cost the agent a huge reward penalty), the agent will likely re-enter said room on the next occasion (because said long delay will have resulted in such severe discounting of the huge penalty, that it will be outweigh by said tiny, positive, immediate reward). In essence, though mathematically convenient, the ad-hoc discounting of the later in time events is simply not something that humans or AGI agents should resort to. (Humans indeed do discount the rewards from situations that are less likely to occur, but that does not automatically correspond to situations that occur later in time.)

The summation of the rewards that an agent expects to receive is yet another impractical objective of an ANN-based AGI agent. For one, it is simply impractical for agents to attempt to plan their actions by taking into account all the rewards that will be collected over the entire course of their lifetimes: Not only would that require them to reason about an exponential-in-planning-horizon number of plausible future reward trajectories, but also result in unbounded sums of rewards, for infinite planning horizons. And while the latter problem may be somewhat mitigated by employing a discount factor (which would lead to agent myopia, as just discussed) or employing an average-reward objective function (which in turn would produce far-sighted agents), the former problem will still persist, especially for long planning trajectories of real-world planning problems.

The above-discussed objective of the current ANN-based AGI agents therefore appears to be, its mathematical convenience notwithstanding, rather impractical and biologically inaccurate. Specifically, an average biological actor is primarily interested in aversively avoiding most painful or life-threatening experiences, while simultaneously opportunistically pursuing most pleasurable experiences over the entire duration of an agent life. And it certainly does not employ and additive reward aggregation: For example, for an average human, the reward for eating an apple on a given day does not simply stack up with more and more apples eaten, but is rather a function of the unique activations of the taste pleasure receptors and the deactivations of the hunger pain receptors. In essence, the ignorance of the number of times a given reward is encountered on a given trajectory naturally leads a biological agent to attribute a disproportionately greater importance to rare, yet more extreme rewards on said trajectory. That is, unlike a typical A3C/DQN agent that adds all the rewards it encounters and hence dilutes the rewards from rare but often crucial events with a plethora of minor rewards (e.g., incremental costs for agent movements), a biological agent effectively avoids this undesired dilution. And the perceived inability of a biological agent to properly differentiate the utility of reward trajectories that contain a different number of activations of the same reward stimulus can largely be mitigated by making a reasonable assumption that in real-world biological systems, such repeated activations of the same stimuli have a higher chance to trigger an activation of some other (stronger) stimulus. (For example, the repeated activation of a sugar taste receptor has a higher chance to trigger the activation of a stomach pain receptor.) The result of this is that the agent only implicitly prefers trajectories with a greater number of similar, positive rewards (or avoids trajectories with similar, negative rewards), as it is the agent model that implies that such repetitive rewards are likely to be followed by other (stronger) types of rewards.

1.9 Problem: Back-Propagation of Reward Signals.

The use of ANNs as function approximation components of reinforcement learning algorithms, as in a value network of DQN or in a critic network of A3C, introduces an additional set of problems. To understand these problems recall that DQN/A3C still belong to the class of supervised-learning algorithms trainable using back-propagation. That is, they still require the supervision signal, computed in their case as the difference between the network prediction of the discounted expected reward of an agent executing an action and a more accurate prediction of said value, calculated using an observed immediate re-ward(s) for executing said action. As such, they are directly exposed to a new set of problems, of which the following two are most pronounced.

Firstly, in the absence of immediate rewards provided to the agent by the simulator, the agent does not learn anything: That is, the supervision signal is zero and so is the corresponding gradient back-propagated through the layers of the agent network. For example, in a maze domain wherein the agent is only rewarded once it finds its way out of the maze, barring the use of any intrinsic motivation auxiliary rewards, the agent will not have encountered any reward for prolonged periods of time and hence would not have learned anything (not updated the parameters of its ANN). And while this may be a tolerable problem for an agent having a comfort of living indefinitely in a simulated training domain, the problem would certainly become unacceptable for AGI agents operating in real-world environments. What is essentially advocated for here, is that an AGI agent should employ other (than backpropagation of expected reward signals) forms of learning to efficiently learn to act in a given sparse-reward domain. In other words, agent learning of the underlying world model should occur even in the absence of any particular reward signals, with the role of the perceived reward limited to modulate the learning process, to bias the statistics of the underlying learning process towards more meaningful events.

Secondly, the inclusion of agent rewards in the gradients back-propagated through the network has a severe impact on the later transferability of the agent knowledge to a new domain. Specifically, the gradient that carries the partial reward signals will at some point unavoidably start infusing the filter parameters with said rewards coming from a given training task at hand. And while this is the right thing to do towards optimizing the agent performance on that very task, it will result in the network filter parameters being permanently attuned to the training task at hand. That is, some input patterns (of potentially critical importance for future tasks) that were meaningless for the agent performance on the old task, will end up being filtered-out by network. Consequently, future attempts to transfer the knowledge of the original network (e.g., bottom layer convolutional filters) and reuse it in a new network built for a new set of tasks may simply fail. For example, an agent trained to drive a car will likely have optimized its parameter space in such a way that it infers the rewards of its actions based on what it perceives on the road and in its surroundings, but not on what is on the sky. As such, if this agent were to be transferred to a new domain wherein it is asked to predict the chance of rain based on what is currently sees, it would likely filter out all the relevant visual cues (e.g., color and shapes of the clouds) plainly visible on the sky.

It is therefore conjectured, that a successful AGI agent would possess the ability to learn in sparse-reward or even zero-reward domains, as well as restrain itself from encoding the domain rewards in its model, in a way that inhibits future transfer of agent knowledge to new domains. This, it is conjectured, could be accomplished only using an approach that may not resort to the backpropagation of the reward signals.

1.10 Problem: Shallow Deep Reinforcement Learning.

A rather inconspicuous misconception that characterizes the A3C/DQN deep reinforcement learning family of algorithms is that they in fact use only shallow reinforcement learning, albeit sitting on top of deep signal processing ANN architecture. And this somewhat misleading terminology would not be much of an issue if not for the limitations that the shallow reinforcement learning (RL) component of A3C/DQN implies. Described herein are some of them that are of particular concern for AGI agents.

Firstly, a shallow RL agent explicitly builds a joint plan: An atomic, non-decomposable plan that, although it may implicitly involve multiple sub-tasks, prescribes a carefully chosen (joint) action executed at each and every time step to have a direct contribution to the fulfillment of the plan. And since the plan is not explicitly decomposable, a (model-based) shallow RL agent who aims to accomplish a given task has to often plan up-front for a prohibitively large number of intermediate steps. That is, it may plan for all the steps of the auxiliary sub-tasks that will have been interspersed in-between the actions of the agent primary task at hand. For example, an agent who schedules its work meetings during a day may additionally plan up-front for such arguably unrelated sub-tasks as which restrooms to use and what salad dressing to choose at lunch time. An arguably more efficient strategy would be to: (i) First explicitly discover and simultaneously keep track of multiple disjoint trajectories of actionable events and then (ii) Multitask between them (akin a CPU multitasking between concurrent processes), towards constructing relatively short, individual plans for each separate trajectory. This is essentially what is conjectured that a brain cortex does, and what is proposed in this document.

Another limitation of shallow RL agents has to do with their inability to (i) automatically discover and form plans of a varying degree of abstraction (to operate on more manageable planning spaces and facilitate plan transfer to new domains), as well as to (ii) seamlessly switch between these plan abstractions, to maximize the agent performance on a given domain. To wit, as already mentioned, some form of plan abstraction is readily available to a biological agent who already perceives the world observations in variable resolutions (because of the aforementioned selective signal amplifiers). And once the agent manages to distill the trajectories of its coarse-grained observations (of potentially different modalities) they may indeed constitute solid foundations for abstract plan formation. These coarse-resolution, abstract plans could then be supplemented (at the agent whim) with more fine-grained plans, formed from higher resolution agent observations, allowing the agent planning mechanism to effectively switch back and forth (or even fuse) between plan trajectories of varying level of abstraction. For example, an agent playing the capture the flag video game may form an abstract (from low resolution observations) plan on how to navigate the underlying environments to find a flag or home base. The very same agent may also automatically discover a more specific (from high resolution observations) concurrent plan on how to look at the subtle, small features of the other player characters in the game, to distinguish its teammates from the players of the opponent team. Not only will these plans be relatively short and less complex, but they will also be much easier to transfer to slightly different domains with either different map layouts of different opponent types.

Such automated discovery of plan decompositions and plan abstractions however is not at the core of shallow RL agents, and as such, the plans that these agents form typically have short horizons, transfer poorly across the domains and are hard to interpret.

In conclusion, the AI community has witnessed since the early 2010s a resurgence of interest in artificial neural networks, mainly thanks to the abundance of labelled data and compute power that make training the ANNs practical. Notable progress has since been achieved, with ANNs applied to tasks ranging from speech and image recognition to playing complex games such as Go or Starcraft, positioning ANNs as viable candidate AGI algorithms. And while the fact that ANN are very data-hungry has been known for some time, only in recent years have the researchers identified other shortcomings of ANNs, in context of different ANN roadmaps to AGI. This section has highlighted the top-10 of these shortcomings. The remainder of this document describes how to remedy them all, using the Cortical Computing Engine approach to AGI.

2.0 Cortical Computing Engine 2.1 Background.

Cortical Computing Engine (CCE) is an improvement over Artificial Neural Networks, Capsule Networks, Hierarchical Temporal Memory, Piaget's Schemas and Constructivist Theory, and Generalized Value Functions.

2.2 Glossary.

Symbols used in the description of CCE are properly introduced in subsequent sections. For convenience, some or all symbols are described here.

$r_i$: Region i of the f Net.

R: Identifier of the top region of the f Net.

$R_{max}$: Practical limit of the f Net regions that can be allocated.

L(r): The current number of allocated compute units in region r.

A(r): The index of the currently attended-to unit in region r.

$u_k^r$: Compute unit indexed k in region r.

$h_{i \to j}^r$: Horizontal connection from $u_i^r$ to unit uf in region r.

$l(h_{i \to j}^r)$: Length of $h_{i \to j}^r$, a positive integer.

$w(h_{i \to j}^r)$: Weight of $h_{i \to j}^r$, a positive integer.

$W(h_{i \to j}^r)$: Strength of $h_{i \to j}^r$, either 0 or 1.

$v_{k|i \to j}^r$: Vertical connection of unit r in region r associated with $h_{i \to j}^{r-1}$.

$\tau_i^r$: Learning threshold of $u_i^r$; When $w(h_{i \to j}^r)$ first exceeds it, $W(h_{i \to j}^r)$ becomes 1 and $v_{k|i \to j}^{r+1}$ is formed to some newly allocated $u_k^{r+1}$.

$s[u_k^r]_{last}^{out}$, $s[u_k^r]_{next}^{out}$, $s[u_k^r]_{last}^{in}$, $s[u_k^r]_{likely}^{in}$: Switches of $u_k^r$.

reward[$u_k^1$]: Agent reward for receiving f Sim observation/action associated with the activation of $u_k^1$.

motor[$u_k^1$]: True if the agent can voluntarily activate this unit, or False otherwise.

a: f Sim action corresponding to some f Net unit in $r_1$.

o: f Sim observation corresponding to some f Net unit in $r_1$.

$\Phi_k^r$: f Net option (sequence of f Sim actions and/or observations) corresponding to f Net unit $u_k^r$.

$\in_f$: The amount of wall clock time required by an f Sim for performing a focusing command.

2.3 System Overview.

The Cortical Computing Engine (CCE) consists of: (i) Fractal Network (f Net) modules, (ii) Focusing Simulator (f Sim) modules and (iii) an Execution Agent (EA), as shown in FIG. 1. The high-level information flow in CCE is as follows: A Domain Engine constantly generates domain observations (at some maximum temporal and spatial resolution that the Domain Engine is capable of generating) given the domain action(s) that it is currently receiving at its input. Domain observations may in general be multi-modal, hence there is a separate Focusing Simulator Module associated with each Domain Engine modality. For example, a Domain Engine generating visual and auditory domain observations would send them to the visual-f Sim and auditory-f Sim respectively. Each f Sim can further be subdivided, to handle independent aspects of a given modality, described elsewhere herein.

The main role of a Focusing Simulator Module is to selectively reduce the resolution of domain observations of a given modality. That is, each f Sim has a focusing head (controllable via f Sim actions) that amplifies the resolution of a chosen subset of the spectrum of the observation modality while down-sampling the observations outside of this subset. (The procedure can be applied recursively, for the smaller subsets of spectrum subsets, etc.) Such down-sampled domain observations are then clustered into discrete f Sim observations, and together with their corresponding f Sim actions, passed along to the Fractal Network Modules. For example, an auditory-fSim focusing head could focus on only a narrow audio frequency band (and only therein perceive audio frequencies in high-resolution) while down-sampling the auditory frequencies from outside of this band. And because the information required to describe the auditory signals in these narrow-high-resolution and wide-low-resolution bands would be significantly reduced, auditory-f Sim could discretize them more efficiently, into a format acceptable by Fractal Network modules. (It is worth noting that the set of f Sim modules could be expanded at CCE execution time if the Domain Engine started providing new types of domain observations.)

Fractal Network modules act independently. They each receive the same sequence of discrete f Sim actions and observations and independently grow their underlying networks to best capture the aforementioned sequence. What differentiates f Net modules is how quickly they learn the underlying sequence and how aggressively they attempt to compress it. For example, a fast-f Net may be designated to learn the underlying sequence in a single exposure, yet offer very little sequence compression and allow for very limited sequence generalization, while a slow-f Net may be designated to provide much better compression and generalization, albeit only after being exposed to the underlying sequence multiple times. A good CCE design strategy is therefore to assume a diverse set f Net modules (although the composition of this set does not have to be fixed and can be changed as desired at CCE run time). From the incoming sequence of f Sim actions and observations an f Net then continually learns, refines and updates its internal world model, used by the Execution Agent to constantly predict the effects and utilities of f Sim actions.

The Execution Agent is responsible for reconciling the f Sim observations and f Sim action utilities, predicted independently by each f Net, and determining an f Sim action that best achieves a given objective (e.g., the sum of future domain rewards produced by the Domain Engine). Alternatively, if at a given time none of the f Sim actions lead to a desired objective changes to the incoming f Sim observations are registered, the Execution Agent itself may instruct the f Nets to imagine various plausible (or counterfactual) future f Sim actions and f Sim observations. This in turn may lead CCE to execute preemptive action plans, to best prepare CCE for these imagined, plausible future outcomes.

Finally, an f Sim action sent by the Execution Agent to the f Sim modules can either be to control the focusing head of some f Sim module or to directly execute some domain action. In the former case, the change in the position of a focusing head of an f Sim will trigger a new f Sim observation sent to the f Net modules whereas in the latter case, the domain action will be executed by the Domain Engine until a new f Sim observation is registered by the focusing head of some f Sim. Note the asynchronous execution of the Domain Engine and CCE: Some domain observation changes may be imperceptible by the CCE f Sim modules (given the current positions of f Sim focusing heads) and hence not trigger any response from CCE. Likewise, the Execution Agent actions that move f Sim focusing heads are performed asynchronously from the Domain Engine process that generates new domain observations.

3.0 Fractal Network

This section describes the architecture of Fractal Network Modules and their core functions, called by the CCE Execution Agent when performing cognitive tasks.

3.1 Architecture.

The description of the Fractal Network architecture starts with the overview of a Fractal Network Module and then provides the details on the micro-architecture of compute units that Fractal Network Module are constructed from.

3.1.1 f Net Module.

Figure 2:
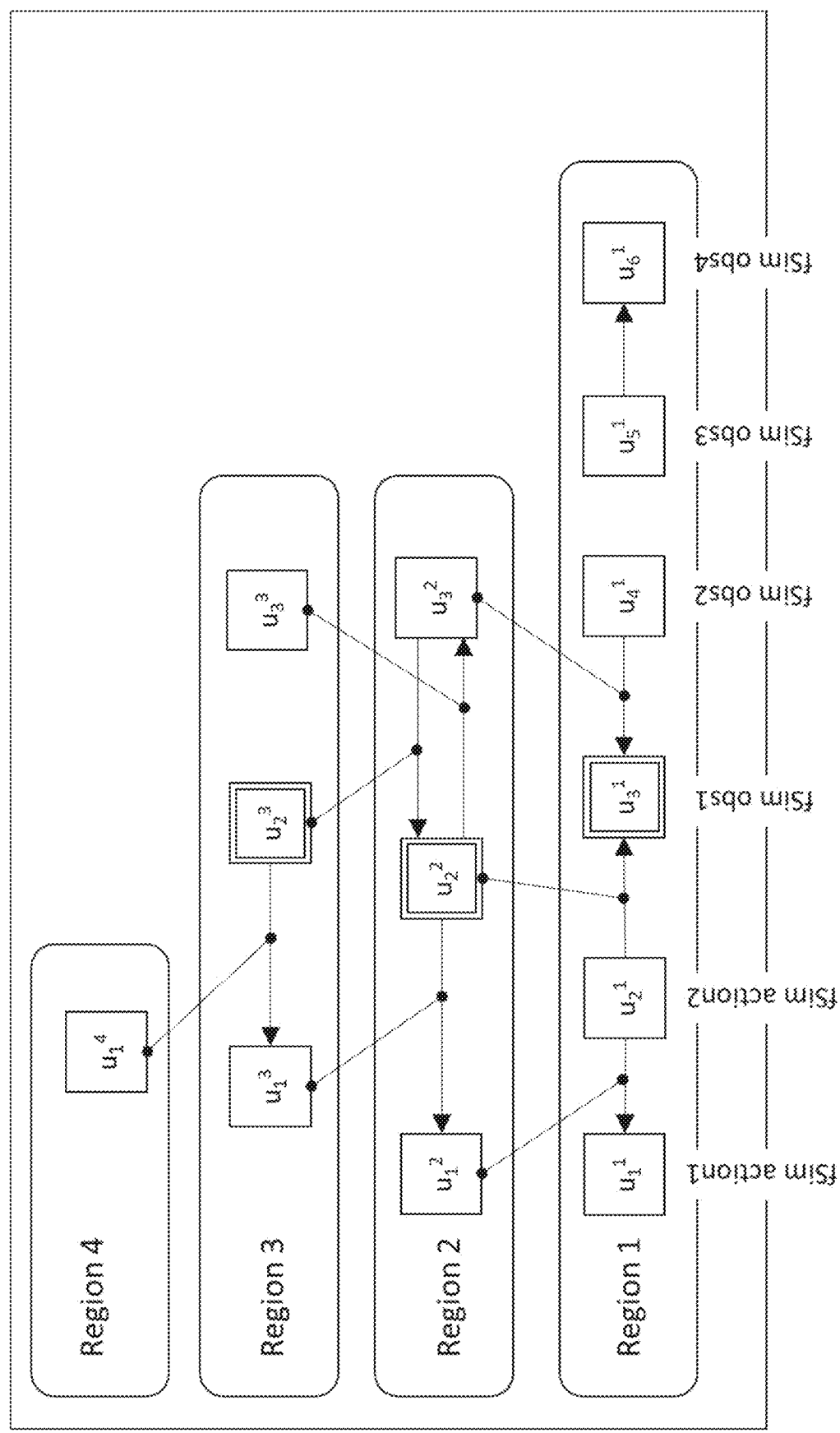
FIG. 2 illustrates a non-limiting example of a fractal network module, described herein.

In contrast to Artificial Neural Networks (ANNs) where the network architecture is fixed, Fractal Network modules exhibit architecture elasticity. An example Fractal Network module is depicted in FIG. 2. An f Net consists of a set of regions (aqua colored boxes): $r_1, r_2, \ldots, r_R$ stacked on top of each other in a linear hierarchy, where $r_1$ is the f Net bottom region and $r_R$ is the network current top region. Unlike in an ANN where the input and output regions are separate, in an f Net, region $r_1$ is responsible for both the input and output from an f Net module. Furthermore, an f Net has a flexible number of regions in that it starts with just $r_1$ and later adds new regions on top of the existing ones, or removes regions from the top, if desired. For example, the f Net in FIG. 2 consist of regions $r_1, r_2, r_3$ and the current top region $r_4$.

The f Net regions themselves likewise exhibit elasticity. Each region r consists of a set of identical compute units $u_1^r$, $u_2^r, \ldots, u_{L(r)}^r$ where $L(r)$ is the current limit of units in region r. Units are added to regions dynamically and can be pruned from regions when no longer desired. (A pruned unit releases the system memory it once held.) For example, regions $r_1$, $r_2$, $r_3$ and $r_4$ in FIG. 2 consist of L(1)=6, L(2)=3, 1 (3)=3, and L(4)=1 units respectively. Finally, each region r has a dedicated attention pointer A(r) that can take values from {null, 1, 2, . . . , L(r)} where A(r)=null means that no unit in region r is currently attended-to. For example, the current attention pointers of the f Net in FIG. 2 are A(1)=3, A(2)=2, A(3)=2, marked by red boxes inside the units they refer to, and A(4)=null.

The connectivity between f Net compute units is likewise elastic. Compute units of region r (white colored boxes with a black outline) can be connected to each other using directed horizontal links (black arrows) wherein each such horizontal connection can furthermore have an associated vertical connection to a dedicated compute unit in region r+1 (black lines with black circles at both ends). That is, each unit in region r+1 can have exactly one vertical connection, to some horizontal connection in region r directly below region r+1. Notice in FIG. 2 how some ordered unit pairs do have a dedicated directional horizontal connection (e.g., from $u_2^1$ to $u_3^1$) whereas some ordered unit pairs may not have dedicated horizontal connection (e.g., from $u_3^1$ to $u_2^1$). Also, notice that some horizontal connections do have an associated vertical connection (e.g., a horizontal connection from unit $u_2^1$ to unit $u_3^1$ is associated with a vertical connection to unit $u_2^2$) whereas some other horizontal connections (e.g., from unit $u_5^1$ to unit $u_6^1$, marked as a thin black arrow) may not have an associated vertical connection. Finally, units in the bottom region $r_1$ have a fixed, one-to-one mapping to the available actions and observations of f Sim modules. For example, unit $u_4^1$ in FIG. 2 uniquely maps to f Sim observation 2.

The horizontal and vertical connections between f Net compute units are initially absent from f Net modules. Only once CCE is running, f Nets start incrementally growing their horizontal and vertical connections (or later pruning them, if desired, for memory optimization purposes). This is in stark contrast to the uniform micro-architecture within the underlying compute units, which remains fixed through the entire CCE run time, as described herein.

3.1.2 f Net Compute Units.

Figure 3:
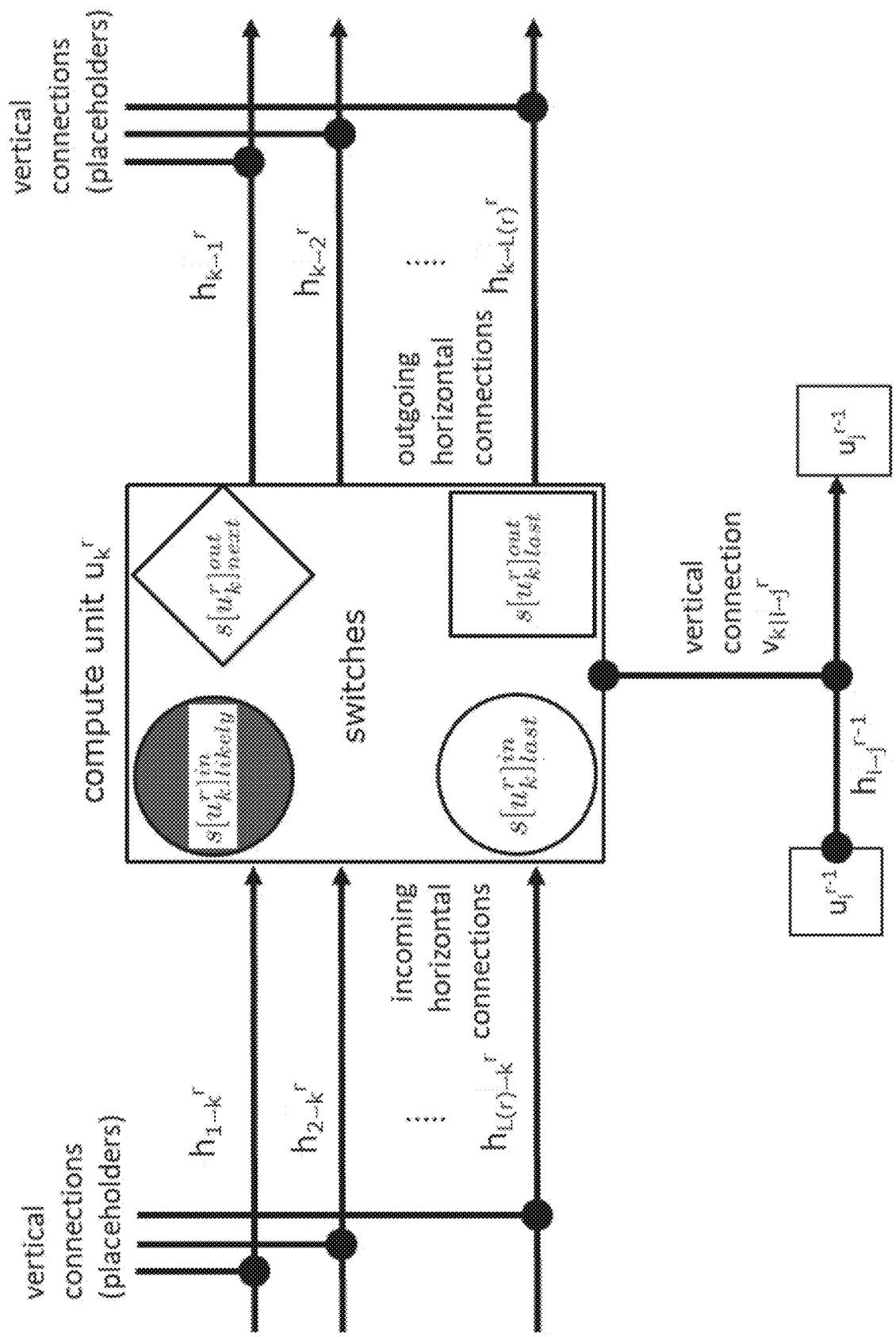
FIG. 3 illustrates a non-limiting example of a f Net compute unit, described herein.

The micro-architecture of f Net compute units is fixed and consists of internal switches and external connections, as illustrated in FIG. 3. In contrast to ANN neurons that are assigned to ANN layers at compile time, f Net compute units are allocated to f Net regions dynamically, at runtime: When a horizontal connection $h_{i \to j}^{r-1}$ from an already allocated unit $u_i^{r-1}$ to some other already allocated unit $u_j^{r-1}$ in region r−1 becomes sufficiently strong, it forms its unique vertical connection, anchored at some newly allocated unit $u_k^r$ in region r. This newly formed vertical connection, denoted $v_{k|i \to j}^r$, immediately becomes the one and only vertical connection that can enter unit $u_k^r$. Once formed, $v_{k|i \to j}^r$ is permanent (unless recycled by the garbage collector described later) and its weight is irrelevant (as opposed to ANN weights connecting neurons across ANN layers).

In addition to this sole vertical connection, compute unit $u_k^r$ maintains a set of incoming horizontal connections $\{h_{i \to k}^r\}_{i=1,2,\ldots,L(r)}$ and a set of outgoing horizontal connections $\{h_{k \to j}^r\}_{j=1,2,\ldots,L(r)}$. Crucially, none of the horizontal connections of the newly allocated unit $u_k^r$ have vertical connections associated with them yet (only the vertical connection placeholders are present, as depicted in FIG. 3). Over time though, some of these horizontal connections (either incoming or outgoing) may themselves become strong enough and form their own corresponding vertical connections, anchored to some newly allocated units from region r+1. Specifically, once formed, a horizontal connection $h_{i \to k}^r$ is permanent (unless recycled by the garbage collector described later) and has a certain weight $w(h_{i \to j}^r)$ (an integer, initially 0, that can only increase over time); A newly formed horizontal connection is initially weak, denoted as $W(h_{i \to k}^r)=0$, but once its $w(h_{i \to k}^r)$ exceeds a certain threshold T ($u_i^r$), the connection becomes permanently strong, denoted as $W(h_{i \to k}^r)=1$. Additionally, each horizontal connection has a certain length $l(h_{i \to k}^r)$ (also a small positive integer that stays constant), explained later.

As illustrated in FIG. 3: f Net Compute Unit, drawn with all its theoretically possible connections and switches: For practical exposition purposes, it is assumed in the following that if an f Net horizontal connection has a weight of 0 then it is simply not drawn in FIG. 3. Additionally, if a horizontal connection has a positive weight but is not yet strong, it is drawn using dotted arrows, and a number above this arrow is the weight of the connection. Likewise, if a vertical connection is not yet formed, it is not drawn in FIG. 3. Moreover, in the presence of multiple sequences internally represented in an f Net, different colors are used when possible, for representing the internal connections of different sequences. Finally, units are sometimes drawn in a simplified form, using only the unit identifier k within its region r, instead of the full descriptor $u_k^r$. Also, for the clarity of visualisation, the values of switches are sometimes omitted, and the binary value of the $s[u_k^r]_{likely}^{in}$ switch is represented as a filled red circle (when $s[u_k^r]_{likely}^{in}=1$) or an empty white circle (when $s[u_k^r]_{likely}^{in}=0$).

In a stark contrast to ANN neurons, that each have just one value place-holder (for storing the temporary result of a sole differentiable arithmetic operation that they are performing), f Net compute units have multiple value placeholders, used by the suite of f Net compute unit micro-programs (involving both arithmetic as well as logical operations) embedded in f Net compute units. These value placeholders, hereinafter referred to as switches, are described herein.

$s[u_k^r]_{last}^{out}$: The value of this switch is the identifier of a region r unit that was attended last to immediately after unit $u_k^r$ was last attended to. For example, consider the f Net from FIG. 2 where $u_2^3$ has been the last attended-to unit in region 3 (e.g., A(3)=2). If, immediately after attending-to $u_2^3$, unit $u_1^3$ becomes the new attended-to unit in region 3, then the switch $s[u_2^3]_{last}^{out}$ will be (re)set to the new value of A(3)=1. The value of the switch $s[u_k^r]_{last}^{out}$ is persistent and constant; It can only change if $u_k^r$ is again attended-to (at some point in the future) and if $s[u_k^r]_{last}^{out}$ is later altered.

$s[u_k^r]_{next}^{out}$: The value of this switch is the identifier of a region r unit that is predicted to be attended-to next, immediately after $u_k^r$ is attended-to. For example, in region 1 in FIG. 2 the switch value $s[u_k^r]_{next}^{out}=1$ would mean that unit $u_2^1$ is currently predicting that after it is attended-to (at some point in the future), the next unit in region 1 to be attended-to will be unit $u_1^1$. The value of the switch $s[u_k^r]_{last}^{out}$ is persistent and constant until explicitly altered, either when an f Net is instructed to update its predictions or when the corresponding $s[u_k^r]_{last}^{out}$ changes. A consequence of that is that $s[u_k^r]_{next}^{out}$ may not necessary be equal to $s[u_k^r]_{last}^{out}$, as illustrated later.

$s[u_k^r]_{likely}^{in}$: The binary values of these switches allow the underlying f Net to compress the internal representations of its input sequences. Specifically, at any given time, f Net units are either likely to be attended-to next (e.g., plausible, but not necessary the most likely), denoted as $s[u_k^r]_{likely}^{in}=1$, or unlikely to be attended-to next, denoted as $s[u_k^r]_{likely}^{in}=0$. (Intuitively, the attention shift along a strong horizontal connection $h_{i \to j}^r$ makes the subsequent activation of $u_j^r$ likely, along with the units underneath $u_j^r$ that will be attended-to next.) f Net then compresses the representations of its sequences by selectively increasing the weights of horizontal connections $h'_{A(r) \to k}{}^r$ only when the upcoming attention shift from $u_{A(r)}{}^r$ to $u_k^r$ is unlikely. This in turn results in rarer vertical connection formations and consequently fewer unit allocations for representing the underlying input sequence. The details of this process, together with a method for determining the values of $s[u_k^r]_{likely}{}^{in}$, is provided in Section 3.2.2.

$s[u_k^r]_{last}{}^{in}$: The value of this switch is the identifier i of unit $u_i^r$ that was attended-to in region r when $s[u_k^r]_{likely}{}^{in}=1$ the last time. (Intuitively, $s[u_k^r]_{last}{}^{in}$ is a trace of $s[u_k^r]_{likely}{}^{in}$, e.g., $s[u_k^r]_{last}{}^{in}$ preemptively records the identifier i of the most recently attended-to predecessor unit of $u_k^r$, to allow for the sequence . . . , $u_i^r$, $u_k^r$, . . . to be resumed, if interrupted after $u_i^r$.) For example (in FIG. 2) when $u_2^2$ is attended-to, it preemptively records its identifier 2 in the switches $s[u_1^2]_{last}{}^{in}$, $s[u_3^2]_{last}{}^{in}$ of units $u_1^2$ and $u_3^2$ respectively, because $u_2^2$ has been the last unit attended-to in region 2 and both $W(h_{2 \to 1}{}^2)=1$ and $W(h_{2 \to 3}{}^2)=1$. Similarly, in region 3, unit $u_2^3$ preemptively records its identifier 2 in $s[u_1^3]_{last}{}^{in}$ since $W(h_{2 \to 1}{}^3)=1$. Most importantly, the values of switches $s[u_k^r]_{last}{}^{in}$ are persistent and constant (until reset when the attention in region r shifts), allowing the underlying f Net to simultaneously track multiple (interruptible) sequences of events, as explained later.

Each region 1 unit $u_k^1$ has furthermore associated with it a real value reward$[u_k^1]$ that represents the reward that the CCE agent receives for causing (or allowing for) the activation of unit $u_k^1$. For example, if $u_k^1$ corresponds to some pleasure/pain receptor, reward$[u_k^1]$ would convey the intensity of that positive/negative stimuli, as perceived by the CCE agent. The value of reward$[u_k^1]$ is typically fixed for a given domain, though CCE does allow these values to dynamically change, if desired, without derailing the underlying agent. Finally, each region 1 unit $u_k^1$ has a binary variable motor$[u_k^1]$ that reflects whether unit $u_k^1$ may or may not be voluntarily activated by the agent. (All the units in region r>1 have motor$[u_k^r]$=false.)

The role of the f Net compute unit switches is to help f Net to continually learn and control its world model, as described in Sections 3.2 and 3.3. Briefly: The $s[u_k^r]_{likely}{}^{in}$ switches are required for sequence learning and sequence compression functions; The $s[u_k^1]_{in\,last}$ switches are required for sequence disentangling, preemption and resumption functions; The $s[u_k^r]_{last}{}^{out}$ switches are required for maintaining and updating a persistent f Net model in non-stationary domains; They are also required when updating the $s[u_k^r]_{next}{}^{out}$ switches, which in turn guide the f Net search for policies. It is shown in Section 5 how the underlying CCE Execution Agent employs this f Net functionality to perform a range of cognitive tasks.

3.2 Learning the Model.

At a high level, the main role of an f Net is to efficiently learn its world model: A compressed yet explainable encoding of input sequences of f Sim actions and observations, with the following description.

Efficiency of learning. Efficiency of learning is viewed as the ability to: (i) Learn the model of f Net input sequences from very sparse domain data; (ii) Continually expand this learned model (at test time), to capture the ever increasing complexity of real-world domains (rather than having to re-learn the model from scratch), and (iii) Rapidly update the learned model (at test time), to quickly adapt to domain non-stationarity. What allows f Net to have these desired features is that f Net connectomes (unlike ANN connectomes) continually grow (at test time) and consist of only the connections and compute units that were actually used for the tasks at hand. Furthermore, f Net compute units (unlike ANN neurons) are equipped with the above-described switches, a type of a persistent memory that facilitates one-shot model updates (at test time).

Compressed encoding. Compressed encoding is viewed as the f Net ability to encode all its input sequences using as small memory footprint as possible. The measure of compression ratio here is the inverse of the number of compute units that f Net has allocated to encode its input sequences. The compression itself may or may not be lossless, measured as the accuracy of sequence continuation prediction and the accuracy of sequence recall. CCE therefore maintains a suite of f Net Modules, ranging from f Nets that learn fast and provide lossless compression, yet have big memory footprint (and require constant memory recycling), to f Nets that learn slower and provide lossy compression, yet have much smaller memory footprint and generalize better.

Explainable encoding. Explainable encoding is viewed as the ability of f Net internal (latent) sequence representations to be amenable to human inspection and verification. This is achieved through a combination of: (i) Discrete connectome encoding, e.g., discrete horizontal connection weights $w(h_{i \to k}{}^r)$ and their corresponding binary $W(h_{i \to k}{}^r)$ and vertical connections $v_{k|i \to j}{}^r$ (ii) Discrete encoding of unit switch values; (iii) Continuous (vs. batched) encoding of the (sequential) input data, allowing for the preservation of the temporal and/or causal structure of said data; (iv) Attentive processing of the in-focus parts of domain observations (via f Sim modules), allowing for an interpret-able decomposition of said observations, and finally, (v) Model-based calculation of the action and option utilities $s[u_k^r]$ used for CCE reinforcement learning.

Figure 4:
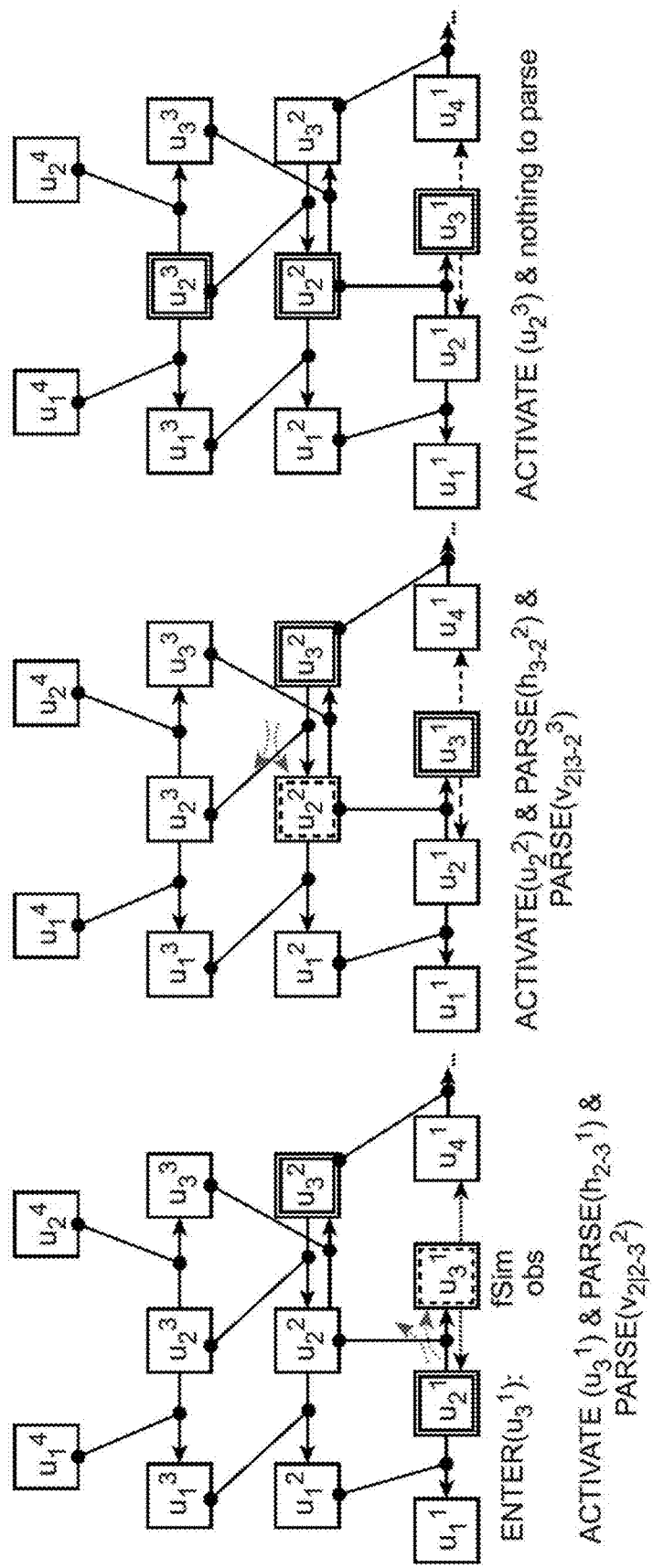
FIG. 4 illustrates a non-limiting example of f Net upward information flow after a new f Sim observation, corresponding to unit $u_3^1$, is entered into the network, described herein.

As illustrated in FIG. 4: f Net upward information flow after a new f Sim observation (corresponding to unit $u_3^1$) is entered into the network. Solid pointed arrows are the strong horizontal connections. Dotted pointed arrows are the weak horizontal connections (that do not have the corresponding vertical connections); Solid lines with dots at the ends are the vertical connections; Red, dashed arrows are temporary and indicate the current information flow within the f Net.

3.2.1 Information Flow.

Figure 5:
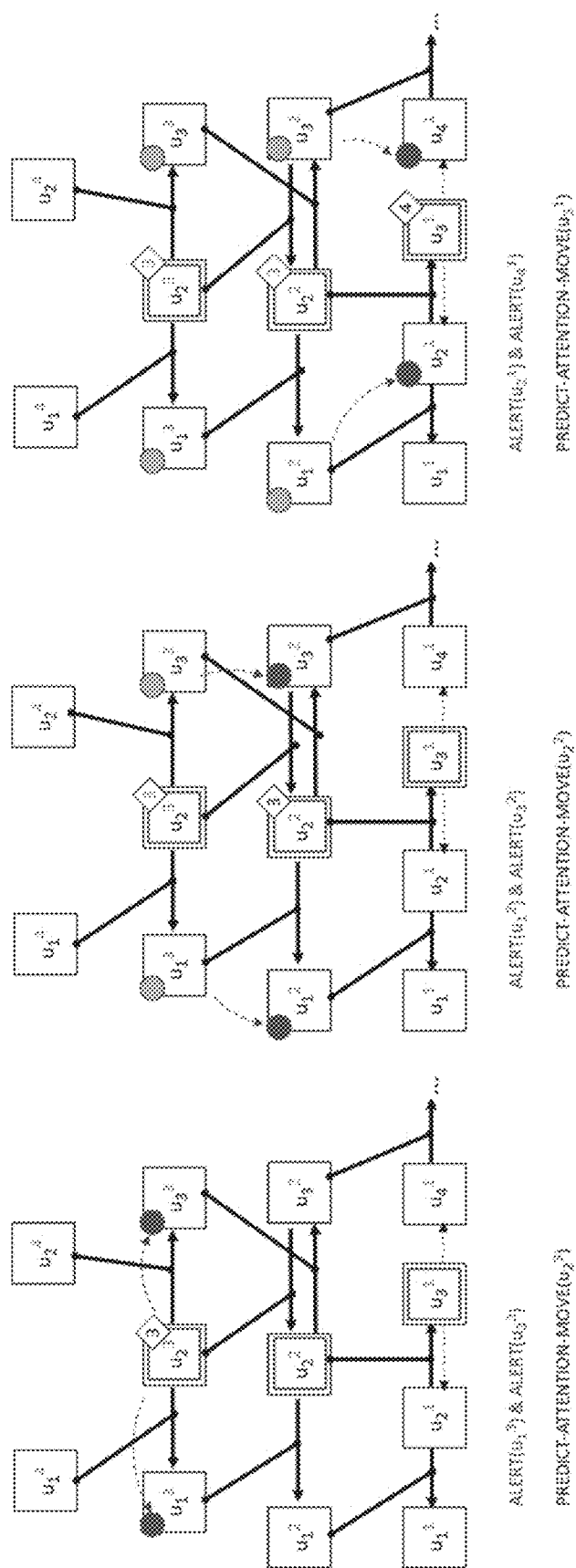
FIG. 5 illustrates a non-limiting example of f Net downward information flow after a new observation is entered into the network.

Prior to an in-depth explanation on how f Net performs sequence learning, compression, disentangling and prediction, provided in FIGS. 4 and 5 is a schematic on how the information flows during f Net model learning. At a glance, the f Net model learning algorithm employs four functions: ENTER( ) (see Algorithm 1, FIG. 24A), PARSE( ) (see Algorithm 2, FIG. 24B), ALERT( ) (see Algorithm 4, FIG. 24D) and PREDICT( ) (see Algorithm 5, FIG. 24E), explained in greater detail in the subsequent sections. When an f Sim observation, that corresponds to unit $u_3^1$ is entered into the f Net, unit $u_3^1$ is automatically activated. Now, since there exist a strong horizontal connection (solid black arrow) from the previously attended-to unit to $u_3^1$, this horizontal connection, as well as its corresponding vertical connection (black line with dots at both ends) are PARSED (refer to the left schematic in FIG. 4 where the temporary dashed red arrows illustrate the upward information flow). The information then flows to region 2 where $u_2^2$ is activated. Herein, the horizontal connection $h_{3 \to 2}{}^2$ and its corresponding vertical connection $v_{2|3 \to 2}{}^3$ are, likewise, both parsed (refer to the middle schematic in FIG. 4). Finally, the information flows to region 3 where $u_2^3$ is activated. Because there are no incoming horizontal connections to $u_2^3$, there is no horizontal connection to parse, as can be seen in the right schematic in FIG. 4.

Refer now to FIG. 5, that illustrates the information flows down the f Net, to prepare the f Net for the arrival of some next f Sim observation. To this end, the f Net ALERTS the units that are likely to be activated next (after a new element is entered in the future). At a high level, this is accomplished as follows: Each currently activated unit broadcasts ALERT messages to the units that it has a direct horizontal connection to; These alerted units then pass the alerts to units underneath them, recursively, until the alerts reach units in region 1. For example, in FIG. 5, unit $u_2^3$ first alerts units $u_1^3, u_3^3$; these alerted units then alert units $u_1^2, u_3^2$ (that are likely to be activated immediately after $u_2^2$) which in turn alert units $u_2^1, u_4^1$ (that are likely to be activated immediately after $u_2^2$). Simultaneously, the f Net PREDICTS-ATTENTION-MOVES from the currently activated units $u_2^3, u_2^2$ and $u_3^1$, using Algorithm 5 (see FIG. 24E) described elsewhere herein.

3.2.2 Sequence Learning and Compression.

Sequence learning is considered here to be the ability to predict the continuation of a sequence, having observed some prefix (context) of a sequence. One way to achieve that is to employ n-grams or skip CTS, but such approach is inefficient, due to the necessity to encode all possible 2-grams, 3-grams etc. Another way to achieve that is to use auto-regressive models, such as ANN encoder-decoder architectures. Such approach can be highly compressed, yet is data inefficient and only works in stationary domains (when the sequences are sampled from the same distribution).

A better way to achieve data-efficient, compressed sequence learning is to employ hierarchical sequence encoding, such as, e.g., the byte-pair compression/sequitur algorithm. At a conceptual level, f Net operates similarly to byte-pair compression, in that it allocates its compute units (recursively) only to the most common sequences of unit activations from regions below, which in turn correspond to the most common sub-sequences of unit activation from region below etc. What differentiates f Net sequence compression from the byte-pair compression is that: (i) f Net performs the sequence compression online, that is, without having access to the training data-set beforehand; (ii) f Net operates in a never-ending fashion, that is, without a hard-limit on the length, or the complexity of the patterns that it encodes; (iii) It emphasizes the recency bias in its internal sequence encoding, thus allowing for a near-perfect sequence recall in non-stationary domains, and finally, (iv) It allows for a much improved sequence compression, by simultaneously disentangling the seemingly unrelated sub-sequences that make up the input sequence of elements. That is, CCE takes into consideration a critical observation, that an AGI agent is, arguably, constantly exposed to heterogeneous/unrelated sequences of elements (e.g., when getting distracted or multitasking between its concurrently pursued goals). As such the CCE f Nets can seamlessly disentangle the unrelated sub-sequences of its input elements.

Described herein, it is first shown how the f Nets learn and compress the individual sequences, using a fractal-like, deep latent structure of compute units. Next, it is shown how f Nets internally represent the intersecting sequences, by reusing the parts of the previously learned sequences. Finally, in Section 3.2.3 it is shown how f Nets prepare themselves for sequences interruption and resumption, towards achieving the desired sequences disentangling capability.

To begin the description of the sequence learning and compression algorithm, recall the f Net compute unit learning threshold $\tau(u_i^r)$. Formally, $\tau(u_i^r)$ prescribes at what weight level a horizontal connection $h_{i \to j}^r$ becomes strong (e.g., $W(h_{i \to j}^r)=1$) and forms a corresponding vertical connection $v_{k|i \to j}^{r+1}$ to some newly allocated unit $u_k^{r+1}$ In the simplest case of $r$ ($u_i^r$)=1 (concerning fast-f Net modules), a horizontal connection $h_{i \to j}^r$ becomes strong once $w(h_{i \to j}^r) \geq \tau(u_i^r)=1$. Such fast-f Nets learn their incoming sequences in a single exposure, yet they quickly gobble up the system memory and often require the memory garbage collector (described in Section 3.5) to reclaim this memory. In other cases (concerning slow-f Net modules), the learning thresholds can, e.g., be defined as: $\tau(u_k^r)=K+N*(R-r)$ or $\tau(u_k^r)=K+N*\Sigma_{1 \leq j \leq L(r)}\text{sgn}(w(h_{i \to j}^r))$ for some small integers K, N. In the former case, the higher region units have smaller learning thresholds than the lower region units, facilitating the formation of strong horizontal connections in higher region units first, effectively blocking the formation of the strong horizontal connections in lower region units. Similar situation occurs in the latter case, wherein the units that have more non-zero outgoing horizontal connections (and tend to reside in lower regions) have bigger thresholds than the units that have fewer non-zero outgoing horizontal connections (and tend to reside in higher regions). The learning thresholds such defined therefore allow the slow-f Nets to compress their internal sequence representations, as shown next.

Figure 6:
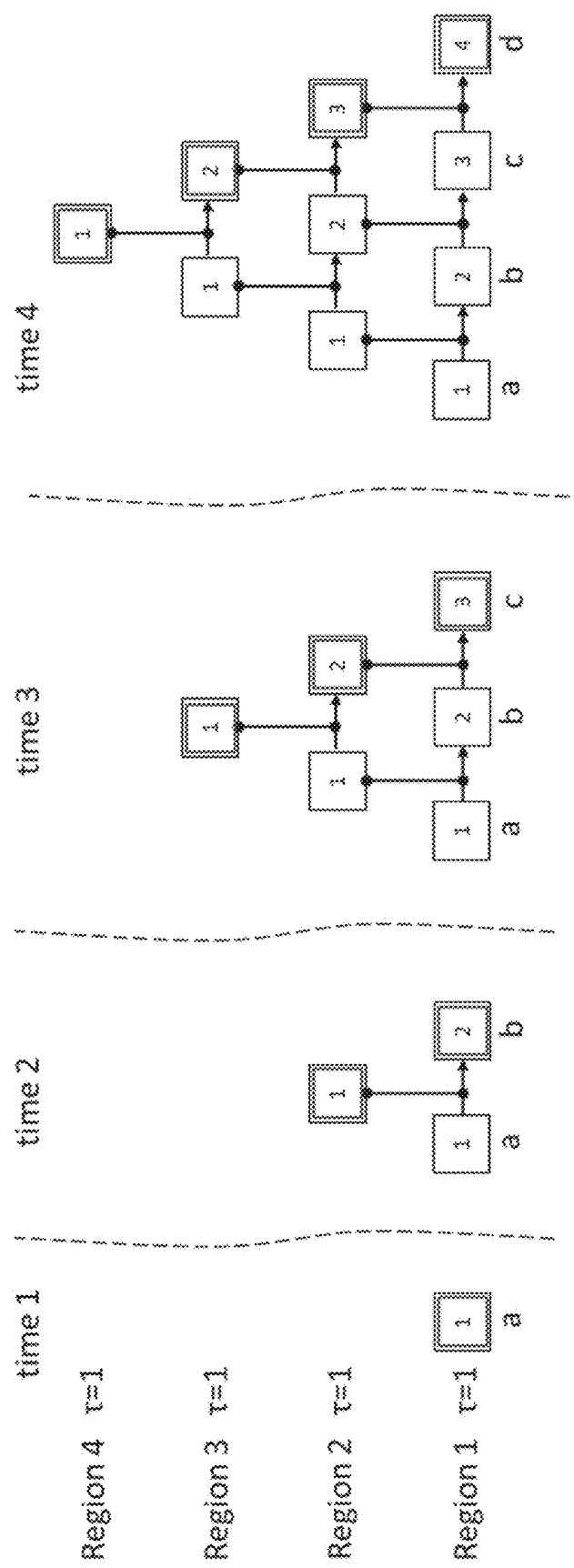
FIG. 6 illustrates a non-limiting example of learning a sequence, e.g., abcd, by a fast-f Net wherein learning rate $r(u_k^r)=1$ for all f Net units.

For the first illustrative example of a sequence learning and compression process refer to FIG. 6. The f Net in FIG. 6 has $\tau_k^r := \tau = 1$ for all the units, and is therefore referred to as a fast-f Net. In the example, the f Net receives at its input a sequence of 4 elements: abcd. Shown are the all the horizontal connections (that immediately become strong since $\tau=1$) and their corresponding vertical connections that link the horizontal connections with their corresponding compute units in regions directly above the horizontal connections. (Each compute unit within a region has a dedicated identifier, reflecting an order in which the compute units have been allocated.) Also shown (refer to the red boxes) are the compute units in f Net regions that the f Net is currently attending to. For example, in time 1 when the element a arrives, unit $u_1^1$ becomes the one and only unit that f Net attends to. Then, at time 2 when the element b arrives at f Net input region 1, the f Net switches its region 1 attention from A(1)=1 to A(2)=2. Since $\tau=1$, the newly formed horizontal connection $h_{1 \to 2}^1$ immediately becomes strong and a vertical connection $v_{1|1 \to 2}^2$ is formed to link $h_{1 \to 2}^1$ with some newly allocated compute unit $u_1^2$. Simultaneously, f Net starts to also attend to unit $u_1^2$ in region 2. This process then continues until in time 4 all the elements of the input sequence abcd have been entered, its internal representation has been fully established and the f Net is simultaneously attending to A(4)=1, A(3)=2, A(2)=3, A(1)=4. In total, 6 units have been allocated to represent the sequence (ignoring the units in region 1 that are always established, to represent all possible f Sim observations), spanning 4 network regions. As can be seen, another pass of the sequence abcd (after f Net attention is reset) will not alter this internal representation, since all the horizontal connections used when processing this subsequent pass are already strong.

Figure 7A:
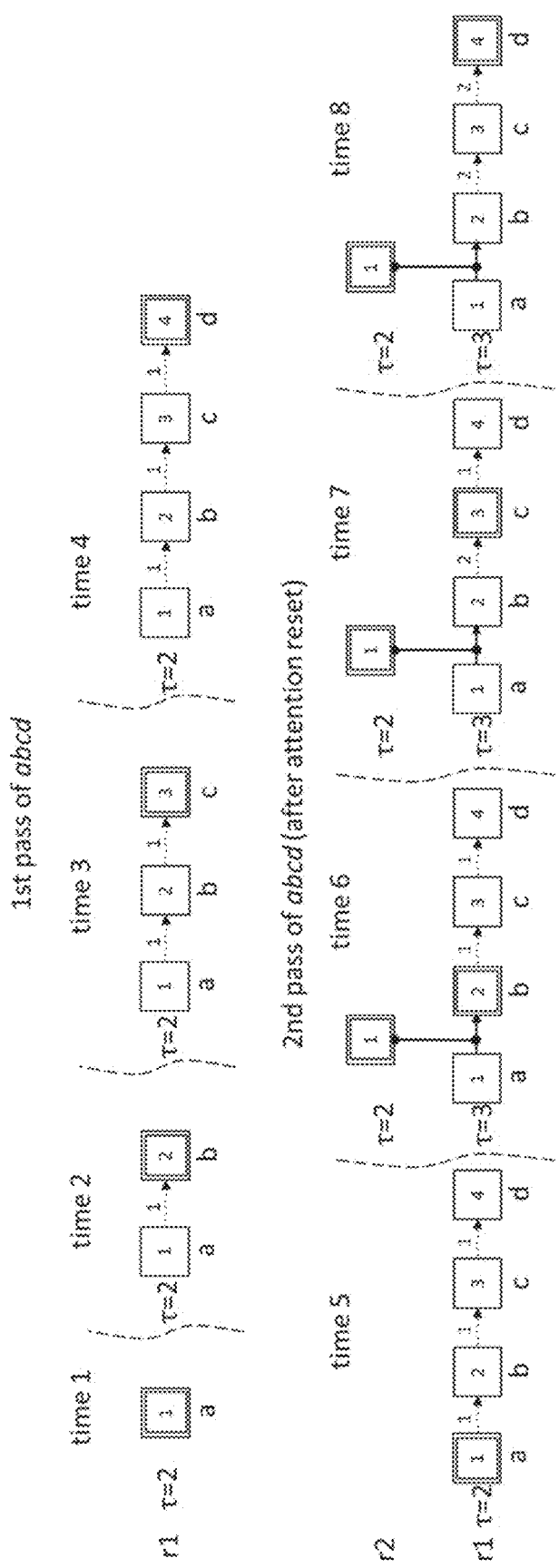
FIGS. 7A-7C illustrate a non-limiting example of learning a sequence, e.g., abcd, by a slow-f Net.
Figure 7B:
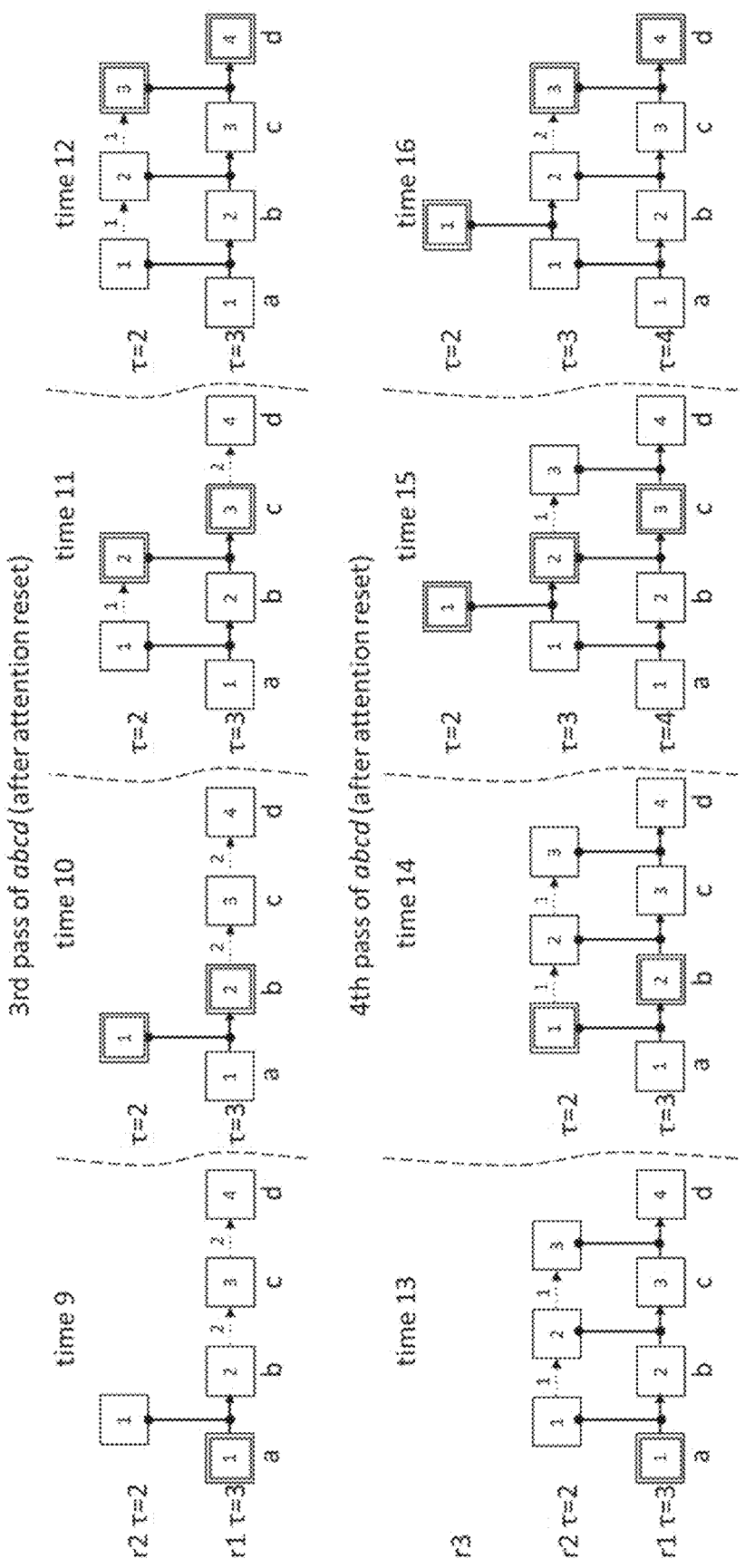
Figure 7C:
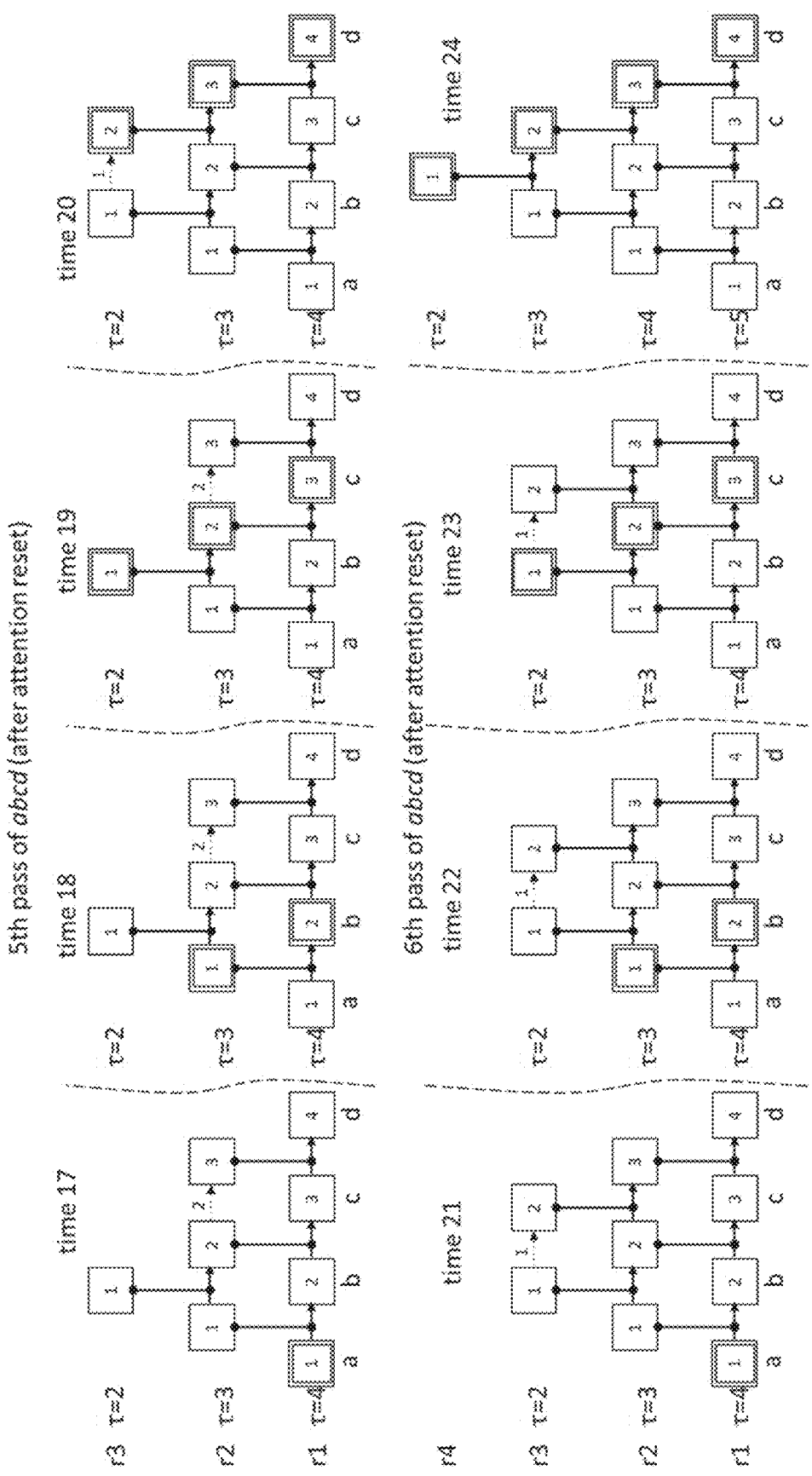

For the second illustrative example of a sequence learning and compression process refer to FIGS. 7A-7C. Here, $\tau u_k^r = 2+R-r$, so it is a slow-f Net. And as can be seen, it learns to represent sequence abcd much slower (in 6 passes versus a just one pass) than the fast-f Net as it requires a repeated activation of the units of a horizontal connection to form a corresponding vertical connection from this horizontal connection, to some newly allocated unit in region above. (Notice, how the horizontal connections are initially weak, represented using the dotted arrows with their corresponding connection weights. Also notice how the t values are bigger for lower regions, essentially making it harder for lower region horizontal connections to become strong, than for higher regions. Finally, notice how these t values are incremented once the network grows to higher regions, e.g., R is increased.) As can be seen in FIGS. 7A-7C, the learned internal representation of sequence abcd is identical for both the slow-f Net as well as the fast-f Net in FIG. 6, e.g., no sequence compression has been achieved by the slow-f Net. This however is just a special case, as in the more general case when the frequency of the input elements varies, slow-f Nets start compressing their input sequences, as shown herein.

Figure 8A:
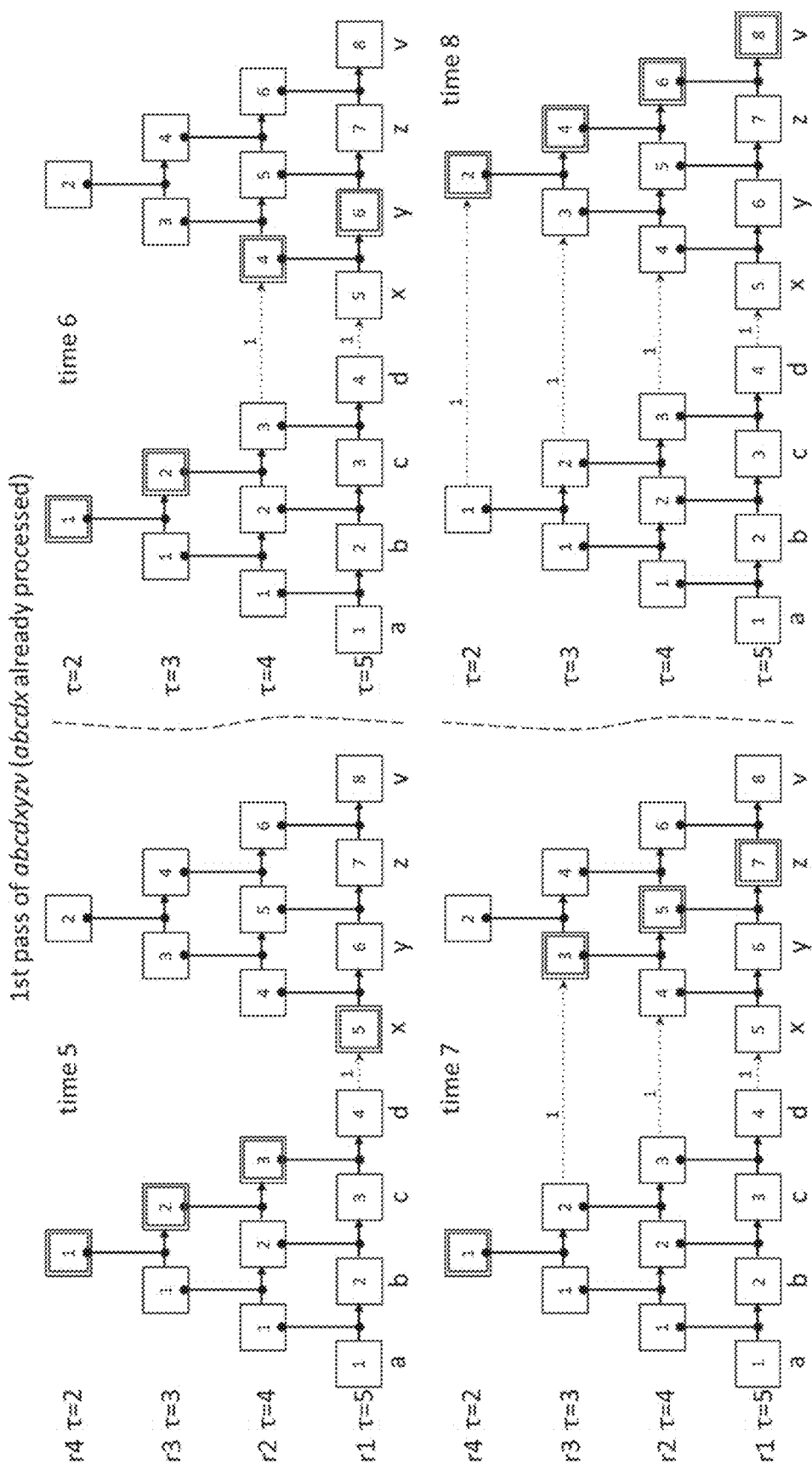
FIGS. 8A-8B illustrate a non-limiting example of learning a sequence, e.g., abcdxyzv, by a slow-f Net (sub-sequences abcd and xyzy have earlier been learned independently)
Figure 8B:
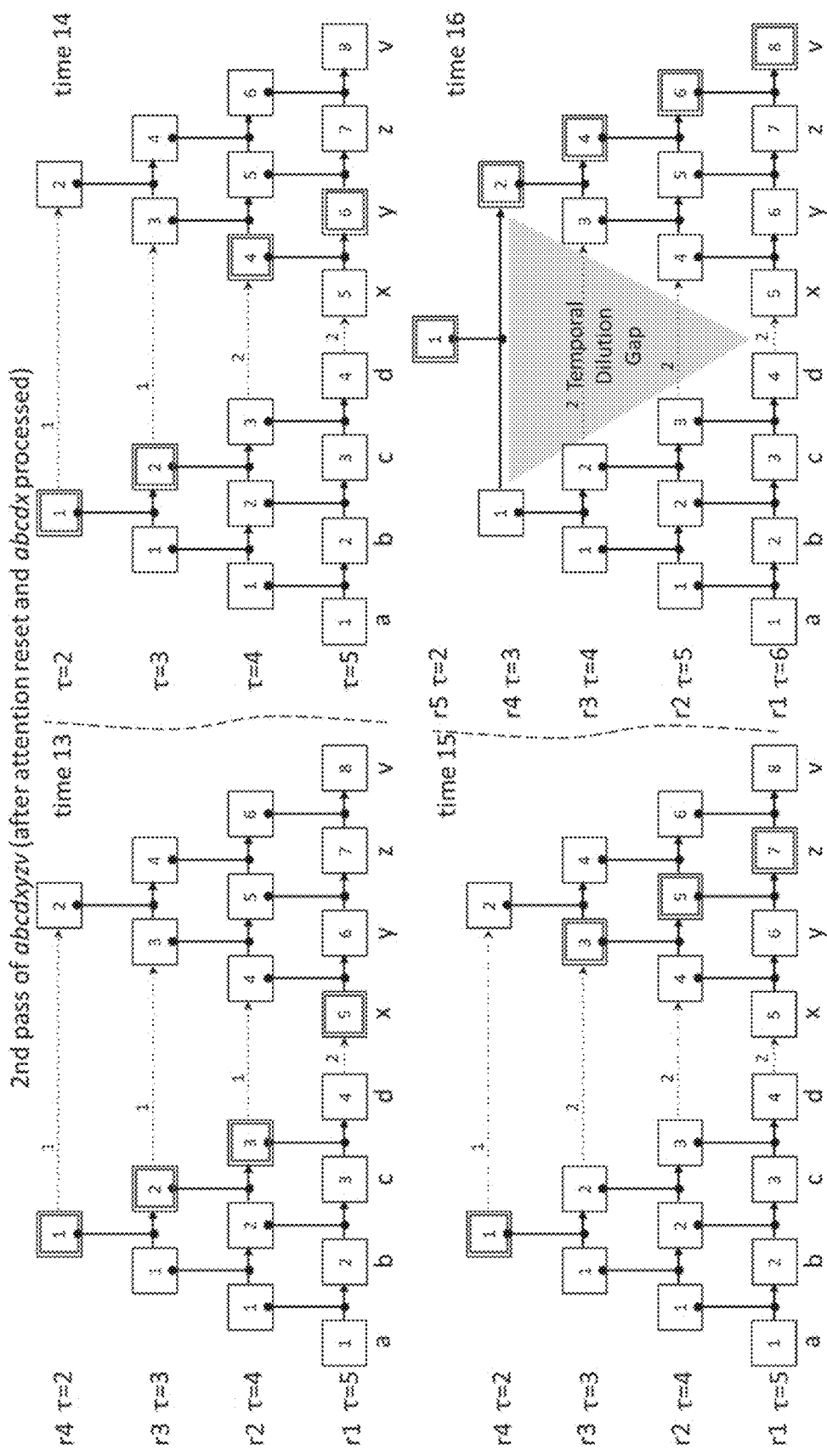

For yet another illustrative example of a sequence learning and compression process refer to FIGS. 8A-8B where the same slow-f Net is used as in FIGS. 7A-7C. It is assumed, that this f Net has previously been exposed to a training corpus that consisted of sequences abcd and xyzy (sampled independently, after f Net attention resets) and has fully learned the internal representation of these sequences. The example demonstrates what happens when this f Net is now exposed to a new training corpus that consists of a sequence abcdxyzy. During the 1st pass, after symbols abcd are processed at time 4, the network state (the red attention boxes) is identical to the network state at time 24 from FIG. 7C. Then at time 5 symbol x arrives, as shown in FIG. 8A, resulting is increasing the weight of $h_{4 \to 5}^1$ to 1 and setting $A(1)=5$. The learning process then continues as shown, until at time 16 (2nd pass of abcdxyzv) the network finally forms a new strong horizontal connection $h_{1 \to 2}^4$, and links it to a newly allocated $u_1^5$ using a newly formed vertical connection $v_{1|1 \to 2}^5$. Observe, that this is actually the final internal representation of abcdxyzy, that is, learning of this sequence has effectively concluded. This is because the next time the f Net is in state $A(4)=1, A(3)=2, A(2)=3, A(1)=4$, it will have set the internal switches $s[u_2^4]_{likely}^{in}=1$, $s[u_3^3]_{likely}^{in}=1$, $s[u_4^2]_{likely}^{in}=1$ and $s[u_5^1]_{likely}^{in}=1$ (the details of this process are explained shortly), as given the existence of the strong connection $h_{1 \to 2}^4$, units $u_2^4, u_3^3, u_4^2$ and $u_5^1$ are now likely to be attended to next, in their respective regions. As a result, the weights of their corresponding horizontal connections $h_{1 \to 2}^4, h_{2 \to 3}^3, h_{3 \to 4}^2$ and $h_{4 \to 5}^1$ will never again increase, and hence no new compute units will be allocated-Such parts of the f Net connectome will hereafter be referred to as Temporal Dilution Gaps, or GAPs for brevity. Notice, how the learning process essentially resulted in adding just one compute unit $u_1^5$ as opposed to adding 16 new compute units if it was a fast-f Net (previously trained on sequences abcd and xyzv) that was exposed to new sequences abcdxyzy (94 percent reduction in new unit allocations).

Figure 9A:
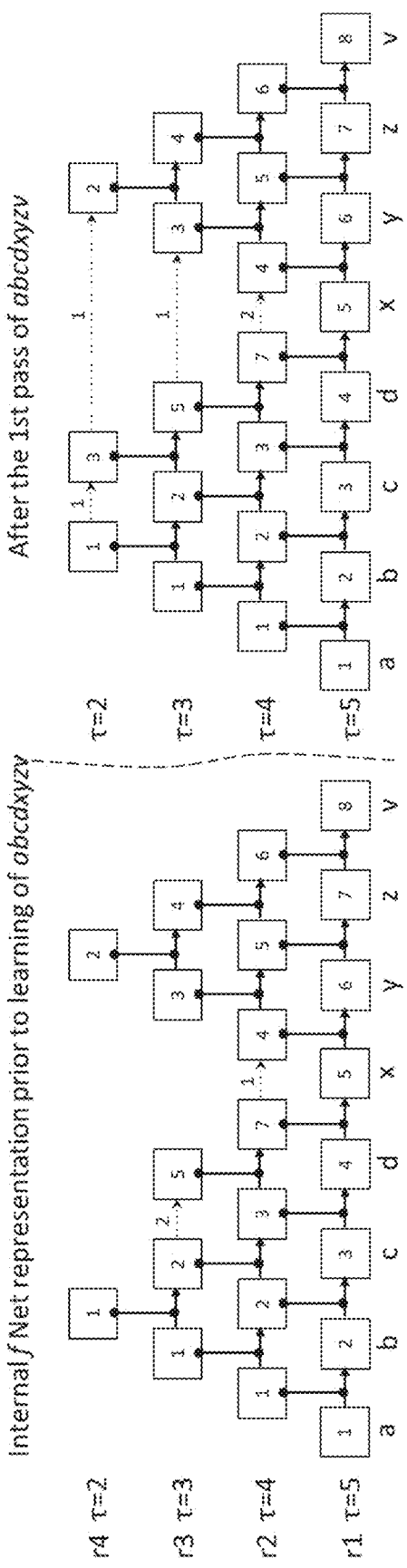
FIGS. 9A-9C illustrate a non-limiting example of learning a sequence, e.g., abcdxyzy, by a slow-f Net (sub-sequences abcd and xyzv have earlier been learned concurrently)
Figure 9B:
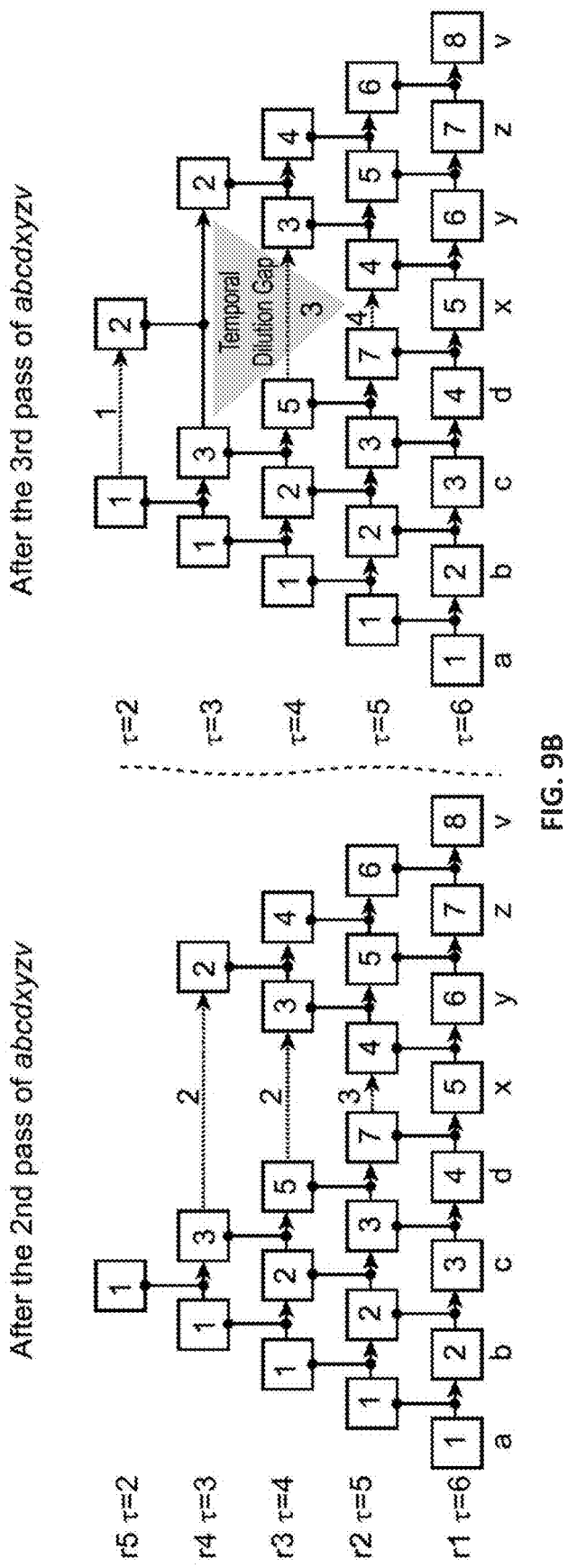
Figure 9C:
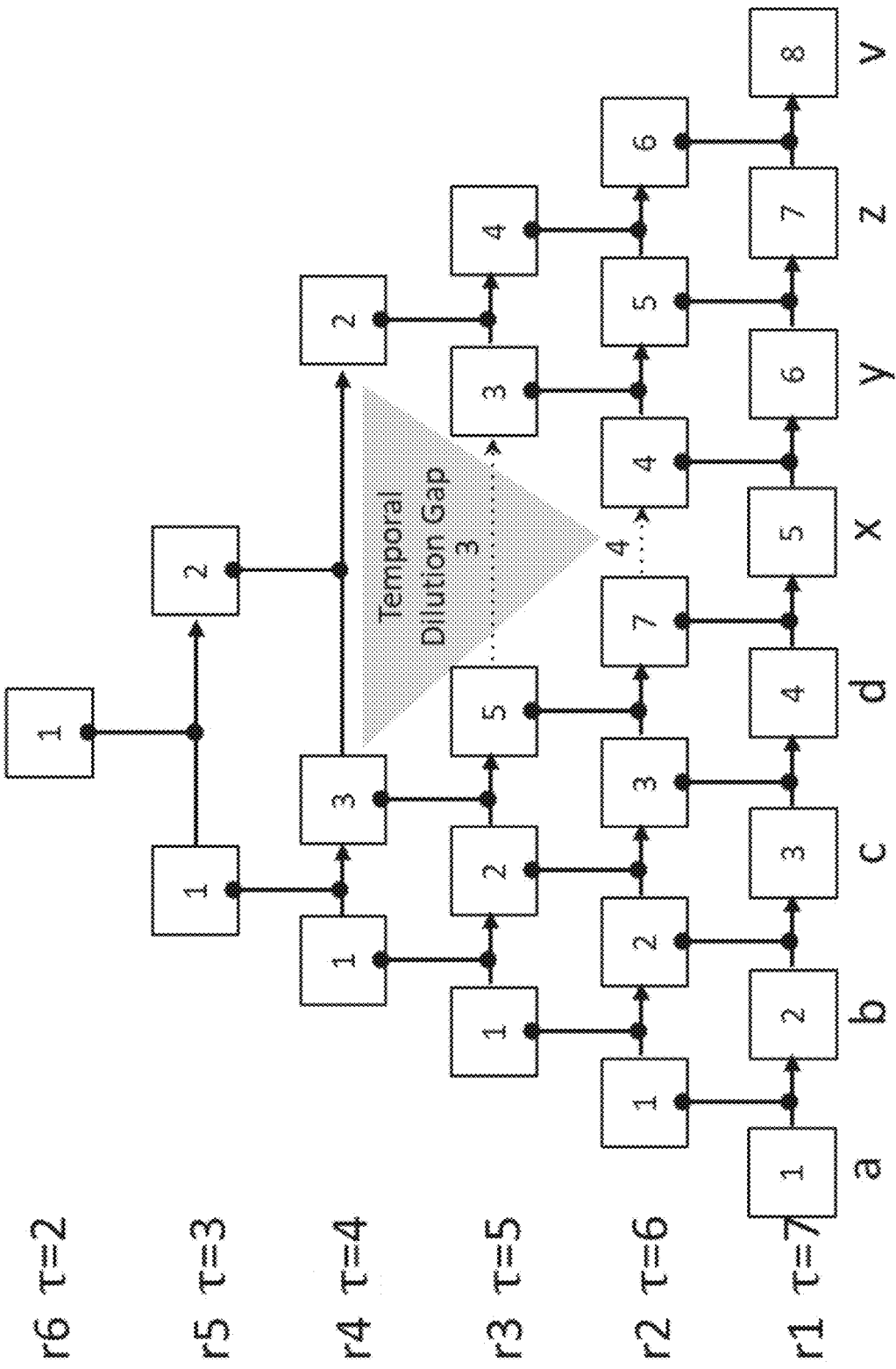

The example in FIGS. 8A-8B is somewhat idealistic in that the underlying f Net is assumed to have first learned (separately) an internal model of sequences abcd and xyzy, and only after that has been exposed to sequences abcdxyzv. In a more realistic scenario, an f Net would be learning the representation of its sequences concurrently, and there would certainly be parts of (seemingly unrelated) sequences that would follow each other (in a dataset) and be internally encoded and learned. For example, the top-left illustration in FIG. 9A shows a more realistic internal representation of an f Net that is about to start learning the abcdxyzy sequences. Here, the internal representations of abcd and xyzv have both already been learned, but in addition to that, the f Net also fully learned a representation of sub-sequences dx, cdx. The f Net has also observed twice bed followed by cdx and once dx followed by xy, denoted as $w(h_{2 \to 5}^3)=2$ and $w(h_{7 \to 3}^2)=1$ respectively. Notice in FIGS. 9A-9C, that despite the f Net internal representation being somewhat obfuscated by the internal representations of some unrelated sub-sequences, the f Net still manages to compress its internal representation of abcdxyzy (notice the temporal dilution gap formed) after 4 passes of abcdxyzv. The learning concludes with just 6 newly allocated units (as opposed to 16 in case of a fast-f Net).

Figure 10:
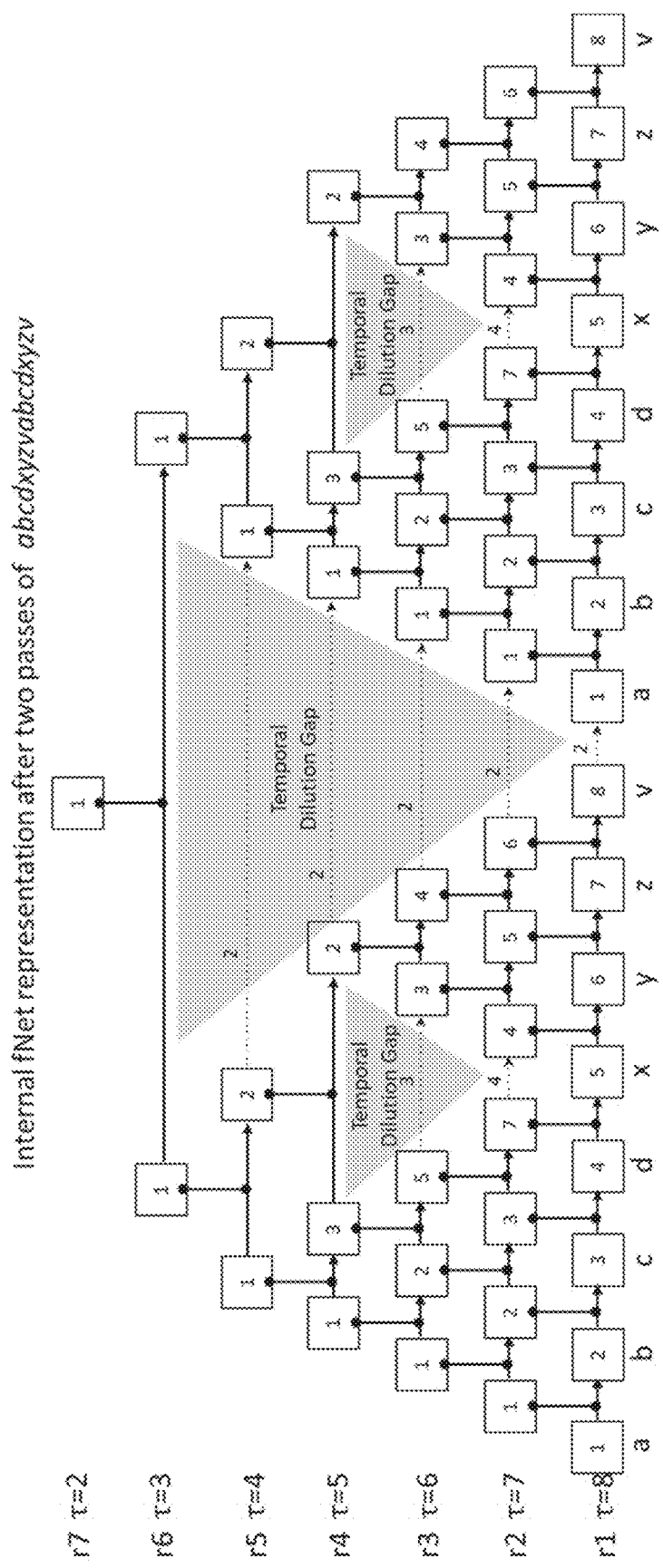
FIG. 10 illustrates a non-limiting example of learning a sequence, e.g., abcdxyzvabcdxyzy, by a slow-f Net (subsequence abcdxyzy has been learned earlier; units are duplicated for visualization purposes only)
Figure 11:
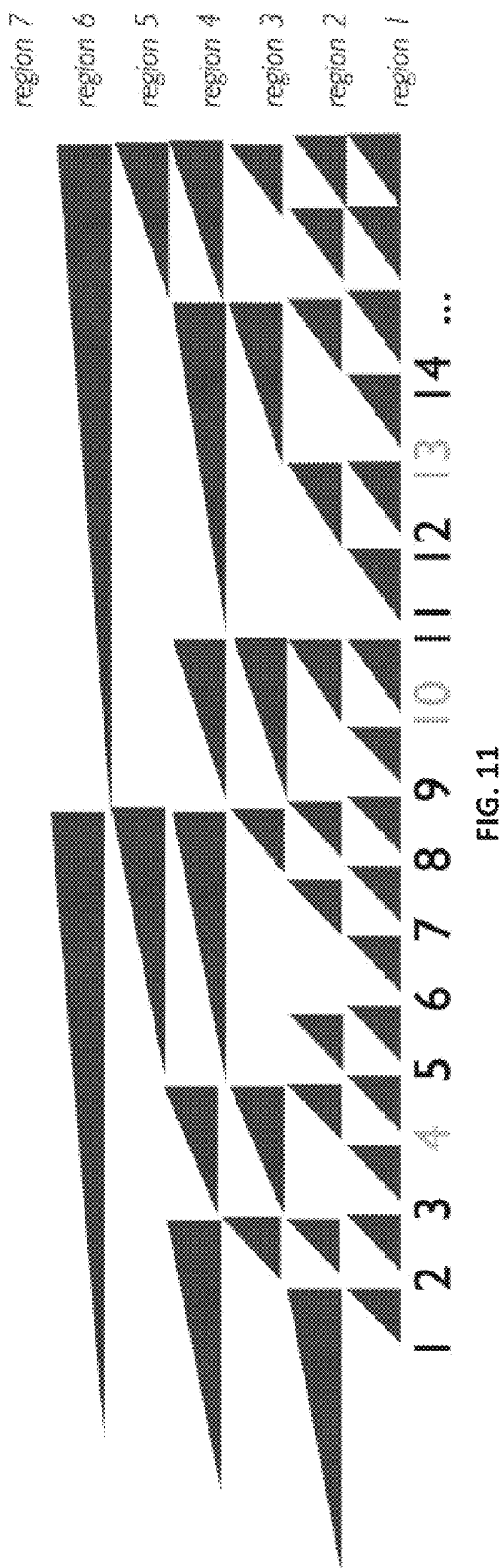
FIG. 11 illustrates a non-limiting example of an abstracted visualization of fractal-like f Net sequence encoding. In some cases, temporal span increases exponentially with the linear increase of the number of f Net regions.

Having learned abcdxyzy, if the f Net is now exposed twice to abcdxyzv-abcdxyzv it will compress this longer sequence, as shown in FIG. 10 (notice the emergence of the fractal-like temporal dilution gaps) More generally, slow-f Nets learning continually in real world environments will typically have their internal sequence representations resemble a fractal of temporal dilution gaps, as conceptually illustrated in FIG. 11.

Figure 12:
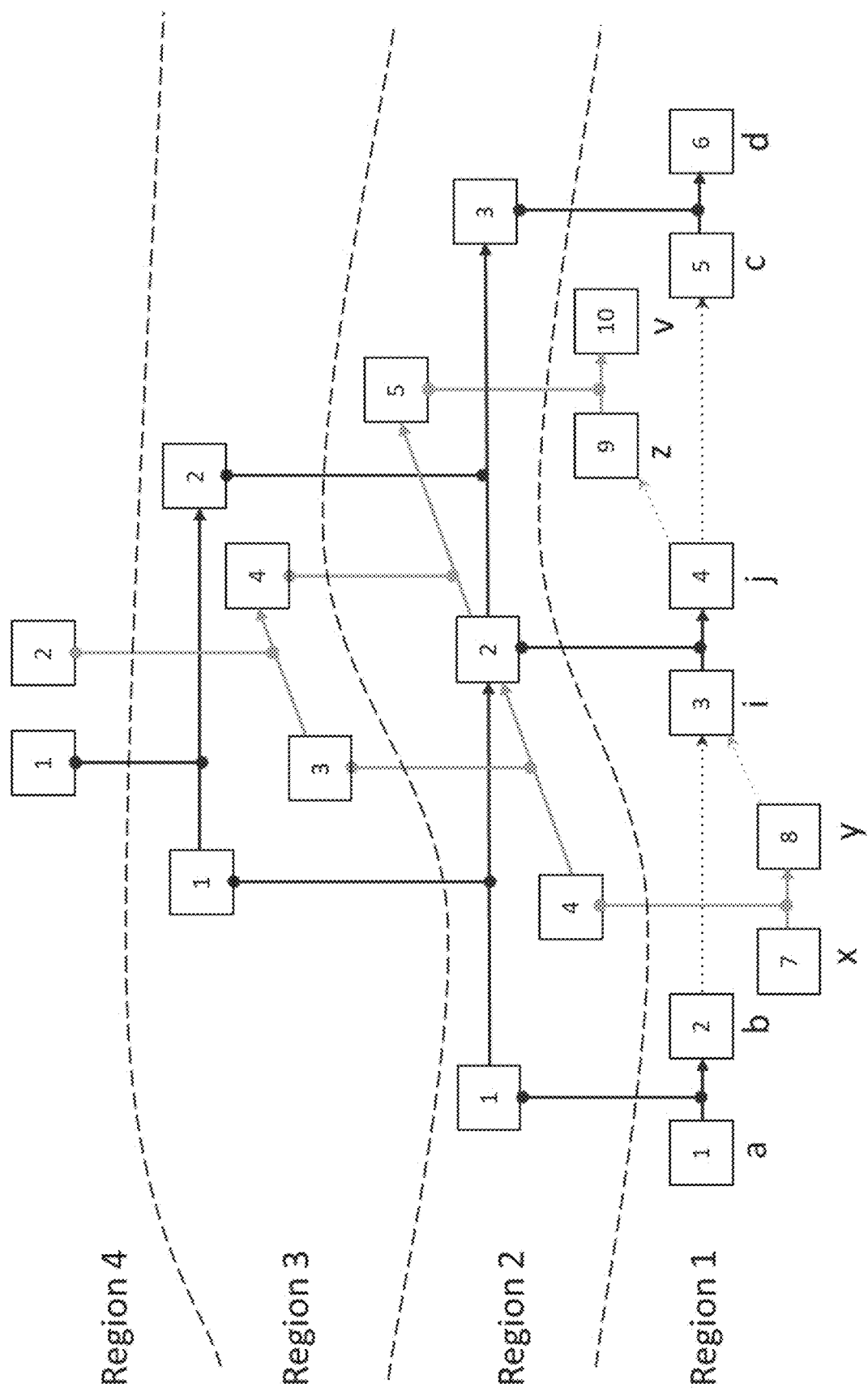
FIG. 12 illustrates a non-limiting example of intersecting sequences.

Finally, notice in FIG. 12 how multiple learned sequences may reuse parts of the already learned internal sequence representations. In the example, sequence abijcd has first been learned followed by the learning of sequence xyijzy. Observe, how both sequences now share the common internal representation of the subsequence xy (units $u_3^1, u_4^1$ and $u_2^2$). This further contributes in f Net sequence compression: Smaller building blocks (internal representations of shorter sub sequences) are reused when learning the internal representations of bigger building blocks (internal representations of longer sequences).

3.2.3 Sequence Concurrency and Disentanglement.

It has so far been illustrated on several examples how f Nets represent and track the progression of just one sequence at a time. In general however, an f Net can concurrently track the progression of multiple sequences, by alternating between the sequences it currently pays attention to (similarly to how a CPU core concurrently handles multiple processes by alternating between them). As described herein, this also allows the f Net to robustly handle the unexpected sequence interruptions and resumptions, a critical feature that permits the underlying CCE Execution Agent to multitask between its domain action plans.

Specifically, one of the core features of human intelligence is its ability to seamlessly track the progression of multiple concurrent events, on different time-scales. This is particularly pronounced when these events correspond to action plans whose results arrive later in time, and when the underlying agent may not stay idle while waiting for these results. For example, when ordering remotely lunch for home delivery, an agent should not stay idle waiting for the lunch to arrive. Instead, it should voluntarily interrupt the execution of its current plan (e.g., feeding oneself) and switch to some other plan (e.g., reading a book) that can be pursued in the meantime. When the ordered lunch finally arrives, the agent should interrupt the currently pursued reading a book plan and resume the execution of the feeding oneself plan, exactly from the point where it was earlier interrupted. Likewise, when the right time comes, the agent should know how to resume its reading a book plan exactly from the point where it was left off. It is now shown how f Net accomplishes that.

The process of disentangling of f Net concurrent sequences uses the $s[u_k^r]_{likely}^{in}$ and $s[u_k^r]_{last}^{in}$ unit switches and is accomplished in two steps: (i) Preparation for the sequence interruption and (ii) Resumption of the sequence execution. Informally, to prepare itself for the interruption of the currently attended-to sequence (in state $u_{A(r)}^r$, r∈{$r_1, \ldots, r^R$}) the f Net constantly alerts the units $u_k^r$ that are currently likely to be attended-to next (e.g., whose $s[u_k^r]_{likely}^{in}=1$) to instruct them how to resume a sequence ($\ldots, u_{A(r)}^r, u_A^r, \ldots$) in case they become activated at some point in the future; These instructions essentially consist of setting the current values of the switches $s[u_k^r]_{last}^{in}$ to A(r), for all the alerted units, and they persist until explicitly modified by some future alert. On the other hand, to resume a previously interrupted sequence, a newly activated unit $u_k^r$ may need only to look at its $s[u_k^r]_{last}^{in}$ switch; In particular, if the activation of $u_k^r$ was unexpected (unlikely), f Net assumes that $$u^r_{s[u_k^r]_{last}^{in}}$$

was the most recently attended-to, likely predecessor of $u_k^r$. Consequently, the horizontal connection is $$h^r_{s[u_k^r]_{last}^{in} \to k}$$

retrieved, and the parsing of the sequence $$\left( \ldots, u^r_{s[u_k^r]_{last}^{in}}, u^r_k, \ldots \right)$$

proceeds normally, as described elsewhere herein.

Figure 13:
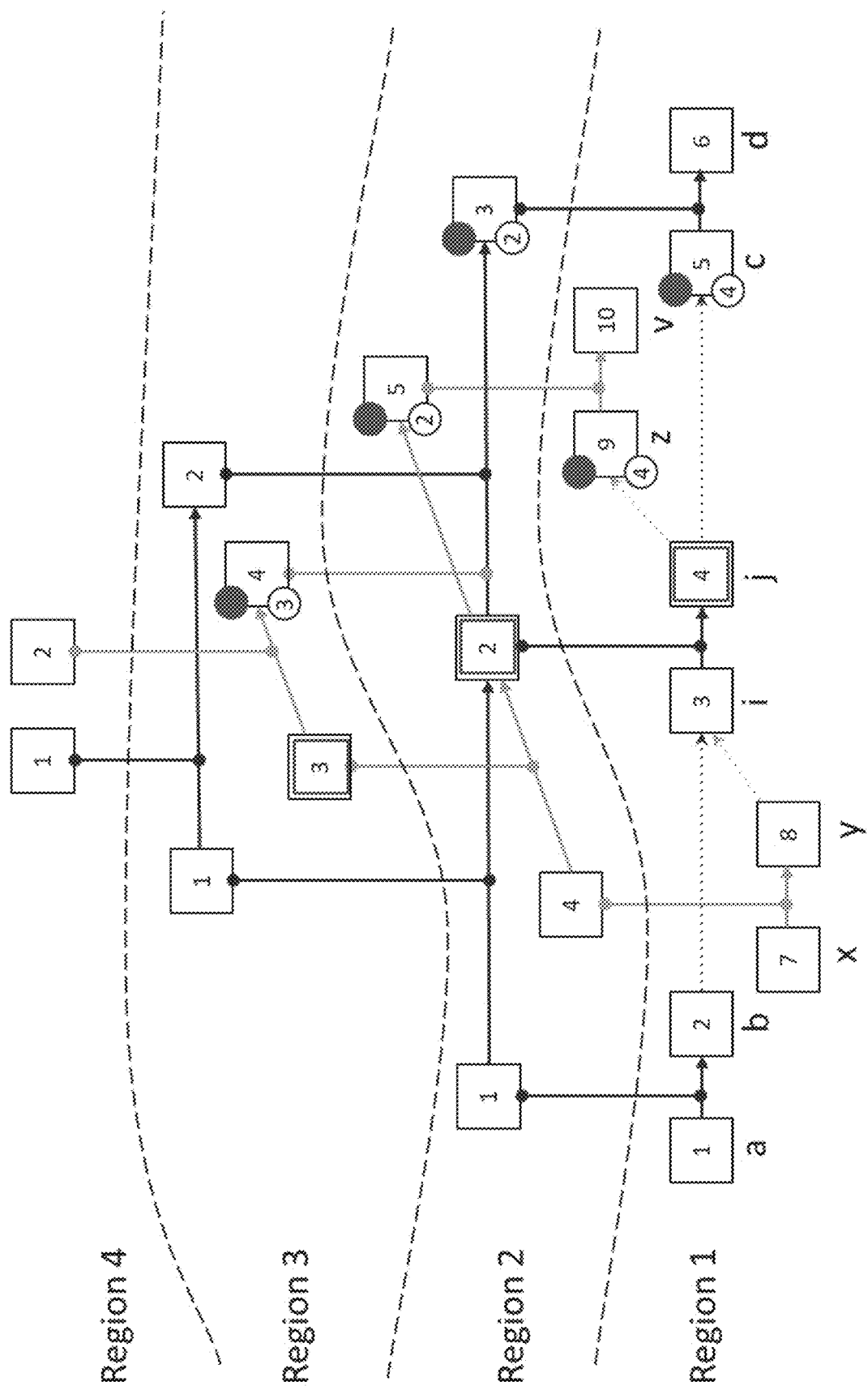
FIG. 13 illustrates a non-limiting example of preparations for sequence interruption: f Net is preemptively updating the $s[u_k^r]_{last}^{in}$ switches of the likely to be attended-to next units.

To illustrate the preparation for sequence interruption step on an example, refer to FIG. 13. Here, the f Net has already processed a sequence of elements xyij at which point the sequence can advance to either zv or to cd. At this point, the f Net can perform two things: (i) prepare the sequence for possible compression and (ii) prepare the sequence for possible interruption. To this end: (i) It establishes the set of units that are likely to be attended-to next (in context of the current f Net state A(1)=4, A(2)=2, A(3)=3 because every transition of attention from $u_A^r(r)$ to a likely unit $u_k^r$ will not result in increasing the weight of the underlying horizontal connection $h_{A(r) \to k}^r$ (and hence avoid forming an unnecessary vertical connection to some newly allocated unit in region r+1, resulting in better sequence compression); (ii) It alerts all these likely units and instruct them how to resume tracking of the currently attended-to sequence, in case the sequence gets interrupted and later resumes. (The details of this process are provided in Algorithm 4 (see FIG. 24D) in Section 3.4.)

In the example in FIG. 13 (focus on the filled circles in the top-left corners of the units) the f Net therefore alerts (e.g., sets $s[u_k^1]_{likely}^{in}:=1$) units $u_4^3, u_5^2, u_3^2$, because these units have the incoming strong horizontal connections from the currently attended-to units $u_3^3, u_2^2$. Furthermore, the f Net also alerts units $u_9^1, u_5^1$, since they are also strongly connected to the currently attended-to unit $u_4^1$, albeit indirectly, through their respective temporal-dilution-gaps ($u_4^1 \to u_2^2 \to u_5^2 \to u_9^1$ and $u_4^1 \to u_2^2 \to u_3^2 \to u_5^1$ respectively). All the alerted units have then their $s[u_k^r]_{last}^{in}$ switches (focus on the numbers in the circles in the bottom left corner of units) set to the indices of the units that the alert came from. That is, $s[u_4^3]_{last}^{in}:=3$, $s[u_5^2]_{last}^{in}:=2$, $s[u_3^2]_{last}^{in}:=2$, $s[u_9^1]_{last}^{in}:=4$, $s[u_5^1]_{last}^{in}:=4$, respectively.

Figure 14A:
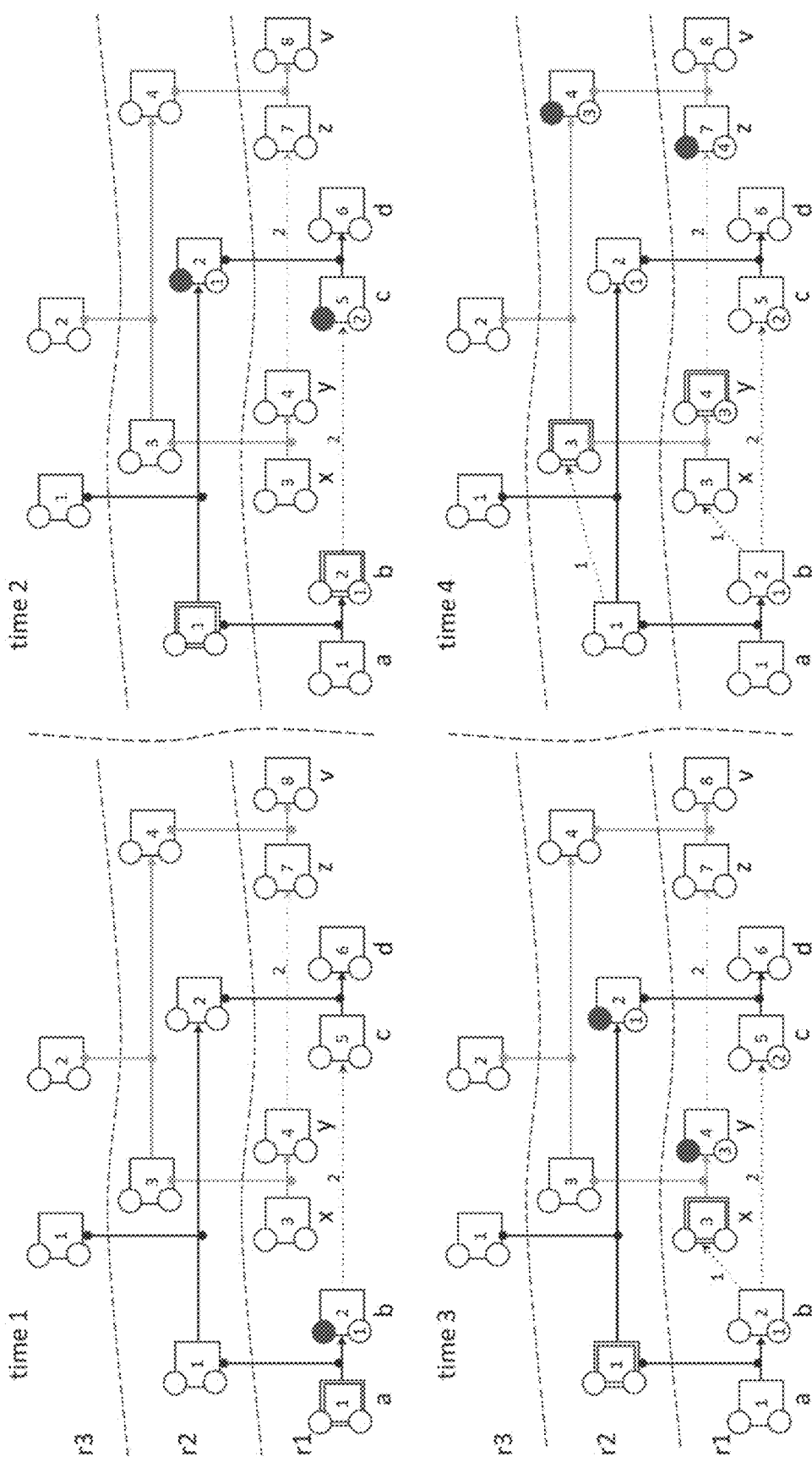
FIGS. 14A-14B illustrate a non-limiting example of disentangling of sequences, e.g., abcd and xyzv.
Figure 14B:
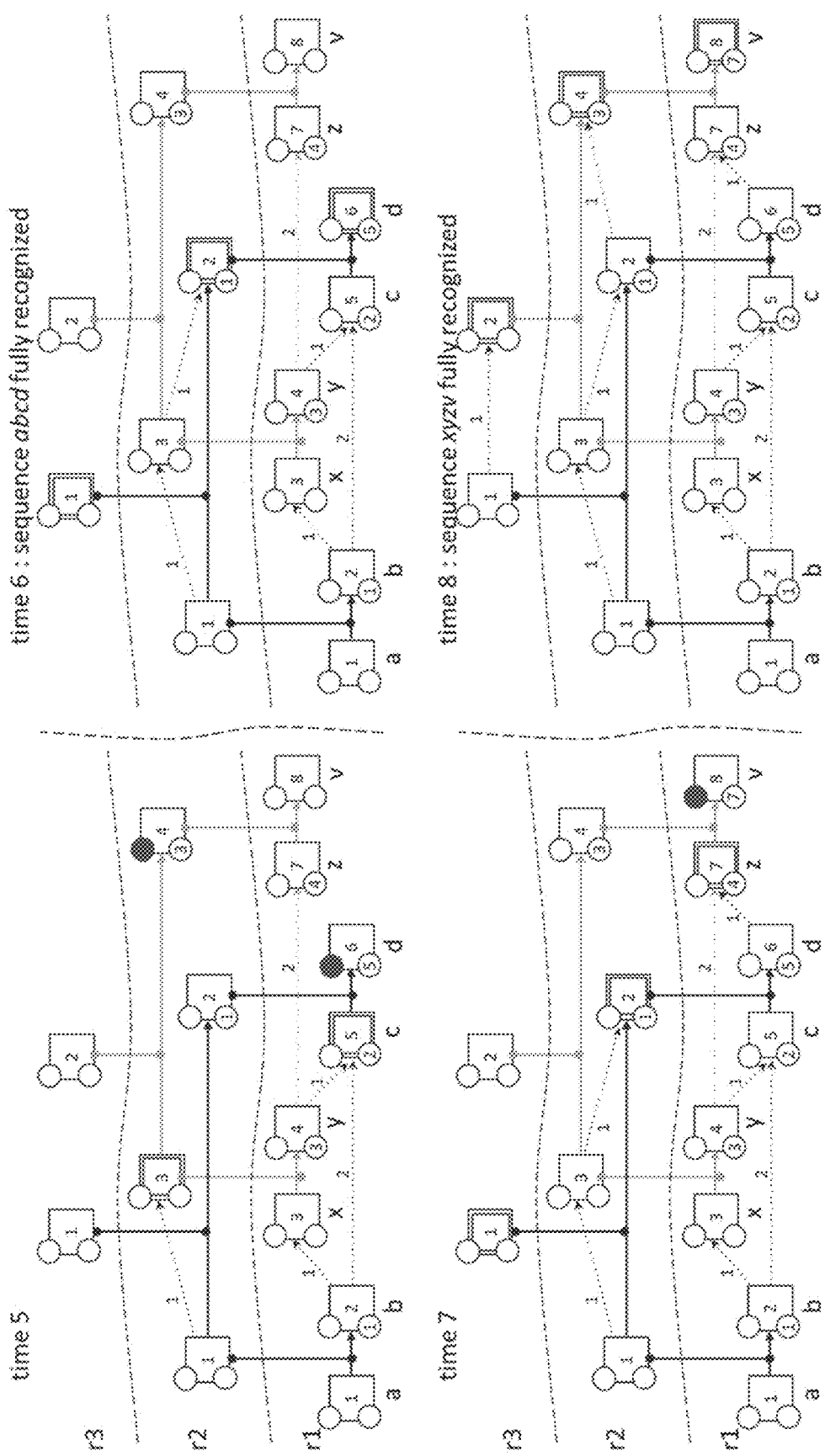

Equipped with a method for updating the $s[u_k^r]_{likely}^{in}$ and $s[u_k^r]_{last}^{in}$ last switches, one can now demonstrate how f Net sequences disentangling is accomplished. Refer to FIGS. 14A-14B where the f Net, having previously built its internal representations of sequences abcd and xyzv (marked in blue and green respectively), is now exposed to abxycdzv (e.g., to a sequence that consists of the entangled sequences abcd and xyzv). The goal of the f Net here is to fully recognize each of these entangled sequences, accomplished by (eventually) activating units $u_1^3$ and $u_2^3$ respectively.

At time 1, element 'a' is entered and the f Net sends an alert $s[u_2^1]_{likely}^{in}:=1$ only to $u_2^1$ because it is the only unit that has a strong incoming horizontal connection from some currently attended-to unit ($u_1^1$). Correspondingly, $u_2^1$ receives the instruction $s[u_2^1]_{last}^{in}:=1$ how to resume sequence ($\ldots, u_1^1, u_2^1, \ldots$) in case $u_2^1$ becomes activated at some point in the future. Next, element 'b' is entered at time 2, strong connection $h_{1 \to 2}^1$ is parsed, resulting in the f Net attention moving in $r_1$ to A(1):=2 and in $r_2$ to A(2):=1, as shown in the FIG. 14A. Herein, because $u_2^2$ has a strong incoming horizontal connection from the currently attended-to unit $u_1^2$, it receives the alert $s[u_2^2]_{likely}^{in}:=1$ and a corresponding instruction $s[u_2^2]_{last}^{in}:=1$. Likewise, because $u_5^1$ is strongly (albeit indirectly, via a temporal dilution gap $u_2^1 \to u_1^2 \to u_2^2 \to u_5^1$) connected to the currently attended-to unit $u_2^1$, it receives the alert $s[u_k^1]_{likely}^{in}:=1$ and a corresponding instruction $s[u_k^1]_{last}^{in}==2$.

The situation complicates itself at time 3 when instead of the currently likely element 'c', the f Net unexpectedly receives at input the element x. This first results in forming a horizontal connection $h_{2 \to 3}^1$ between the previously and currently attended-to unit in $r_1$. Next, unit $u_4^1$ strongly connected to the currently attended-to unit $u_3^1$ receives an alert $s[u_4^1]_{likely}^{in}:=1$ and a corresponding instruction $s[u_4^1]_{last}^{in}:=3$. Finally, unit $u_5^1$ stops being likely (it is no longer connected to a currently attended-to unit in $r_1$), hence its $s[u_5^1]_{likely}^{in}$ reverts to 0; Of note though, the instruction $s[u_5^1]_{last}^{in}=2$ remains unchanged, as it could still be used in the future, as shown later.

The arrival of the element 'y' at time 4 is expected (likely) in region $r_1$: The strong connection $h_{3 \to 4}^1$ from the previously to the currently attended-to unit in $r_1$ is parsed, resulting in the f Net attention moving in $r_1$ to A(1):=4 and in $r_2$ to A(2):=3. The last attention shift in $r_2$ though has been unexpected (unlikely), and hence results in forming of a new horizontal connection $h_{1 \to 3}^2$. The alerts $s[u_4^2]_{likely}^{in}:=1$, $s[u_7^1]_{likely}^{in}:=1$ and instructions $s[u_4^2]_{last}^{in}:=3$, $s[u_7^1]_{last}^{in}:=4$ are then being sent to units $u_4^2, u_7^1$ strongly connected (directly and indirectly) to the currently-attended to units $u_3^2, u_4^1$, while $s[u_2^2]_{likely}^{in}$ is reverted to 0 but $s[u_2^2]_{last}^{in}=1$ persistently keeps its current value, for possible later usage.

The arrival at time 5 of element 'c' is unexpected (unlikely), as the f Net was rather expecting to receive 'z' at input (which would have advanced the sequence xy the f Net was attending-to), resulting in the formation of $h_{4 \to 5}^1$. And because the attention in $r_1$ moved to $u_5^1$ unexpectedly, the f Net looked up the instructions in $s[u_5^1]_{last}^{in}=2$ to assert, that $u_5^1$ is likely a continuation of some old sequence that (abruptly) ended with $u_2^1$. It henceforth attempted to parse $h_{4 \to 5}^1$ but since $h_{4 \to 5}^1$ was not strong, it did not result in any changes in attention in $r_2$. Therefore, the f Net simply sent alerts $s[u_4^2]_{likely}^{in}=1$, $s[u_6^1]_{likely}^{in}:=1$ and instructions $s[u_4^2]_{last}^{in}:=3$, $s[u_6^1]_{last}^{in}:=5$ and reset $[u_7^1]_{likely}^{in}:=0$ while keeping $s[u_4^2]_{last}^{in}=4$ unchanged.

The arrival at time 6 of element 'd' has more profound ramifications: The attention move from $u_5^1$ to $u_6^1$ in $r_1$ resulted in the parsing of the strong connection $h_{5 \to 6}^1$ which consequently activated $u_2^2$ in $r_2$. The resulting attention move in $r_2$ from $u_3^2$ to $u_2^2$ was unexpected (new horizontal connection $h_{3 \to 2}^2$ was formed) and hence, the f Net looked up the instructions in $s[u_2^2]_{last}^{in}\mathrel{+}=1$ to assert, that this unexpected activation of $u_5^1$ is likely a continuation of an old sequence that (abruptly) ended with $u_1^2$. Consequently, the strong connection $h_{1\to2}^2$ was parsed, activating its corresponding vertical connection unit $u_1^3$, thereby fully recognising the original sequence abcd. Finally, notice how no units are alerted at this point, because there are no strong outgoing horizontal connections from the units $u_1^3, u_2^2, u_6^1$ that the f Net currently attends to.

The arrival of 'z' at time 7 is therefore unexpected and hence a new horizontal connection $h_{6\to7}^1$ is formed. Instruction $s[u_7^1]_{last}^{in}=4$ on what is the likely predecessor of the unexpected activation of $u_7^1$ is then read, but since the connection $h_{4\to7}^1$ is not strong, no further action is taken. Only an alert $s[u_8^1]_{likely}^{in}:=1$ and an instruction $s[u_8^1]_{last}^{in}:=7$ is sent to $u_8^1$, preparing it for a possible future activation. This activation indeed manifests itself at time 8 when the element 'v' arrives, thereby activating $u_4^2$. This last activation is unexpected in $r_2$ and hence, a new connection $h_{2\to4}^2$ is formed, and an instruction $s[u_4^2]_{last}^{in}=3$ is retrieved to assert that $u_4^2$ was likely preceded by an earlier activation of $u_3^2$. Consequently, the strong connection $h_{3\to4}^2$ is parsed, activating its corresponding vertical connection unit $u_2^3$, thereby fully recognising the original sequence xyzv. At this point, both of the original sequences abcd and xyzv have been disentangled and fully recognized; That they followed each other in the dataset has been encoded in the new connection $h_{1\to2}^3$.

3.2.4 Sequence Continuation Prediction.

It has so far been shown how an f Net continually grows and updates its model of the world, from the entangled sequences of f Sim actions and observations that the f Net attends-to. This learned world model is then used by the f Net to make the most likely predictions, on multiple timescales, on how these sequences are going to continue into the future.

Figure 15A:
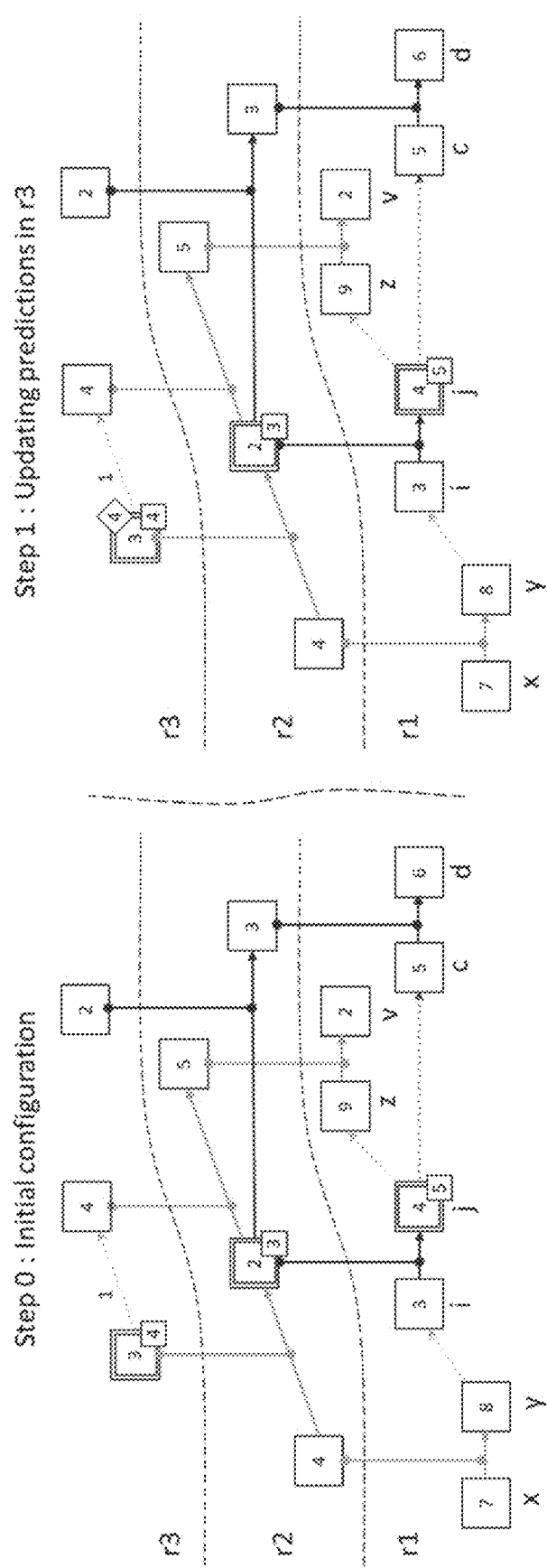
FIGS. 15A-15B illustrate a non-limiting example of predicting the continuation of sequences.
Figure 15B:
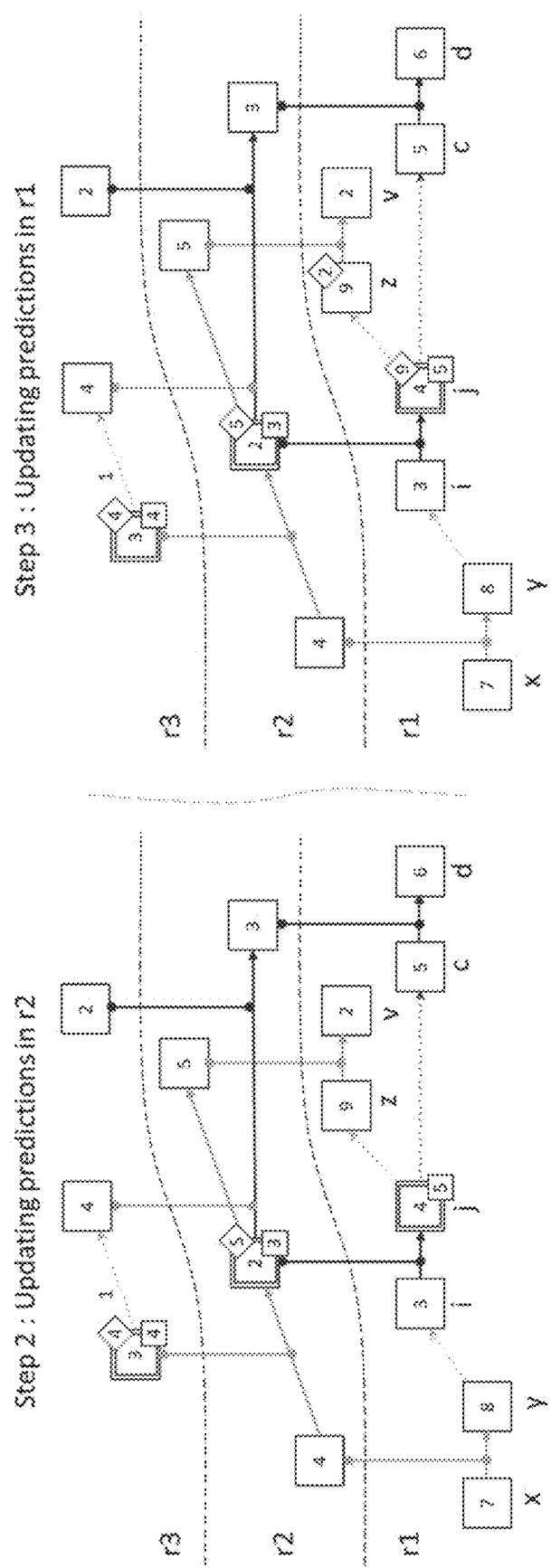
Figure 16A:
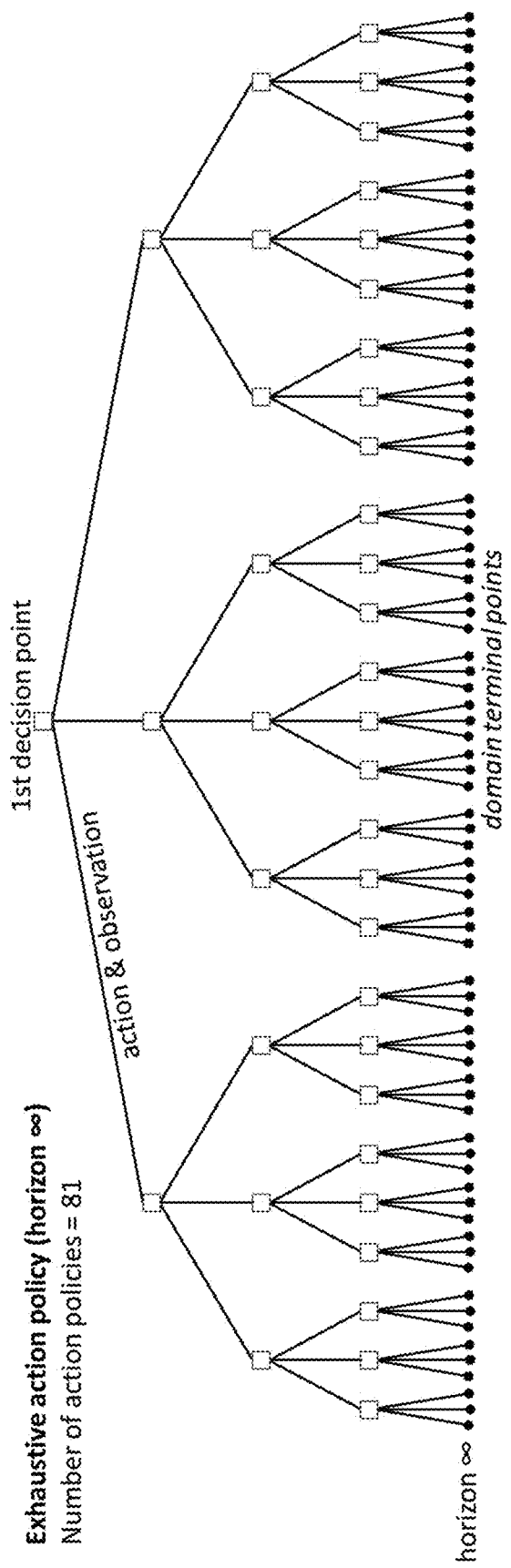
FIGS. 16A-16D illustrate a non-limiting example of model-based f Net policy search algorithms.
Figure 16B:
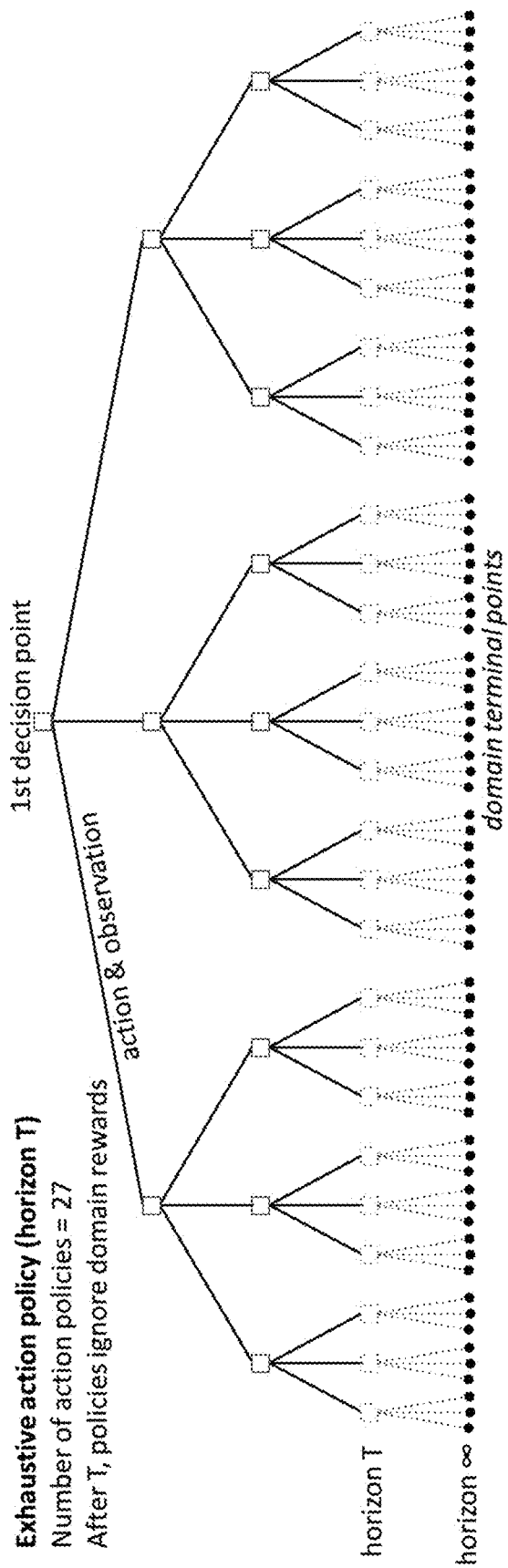
Figure 16C:
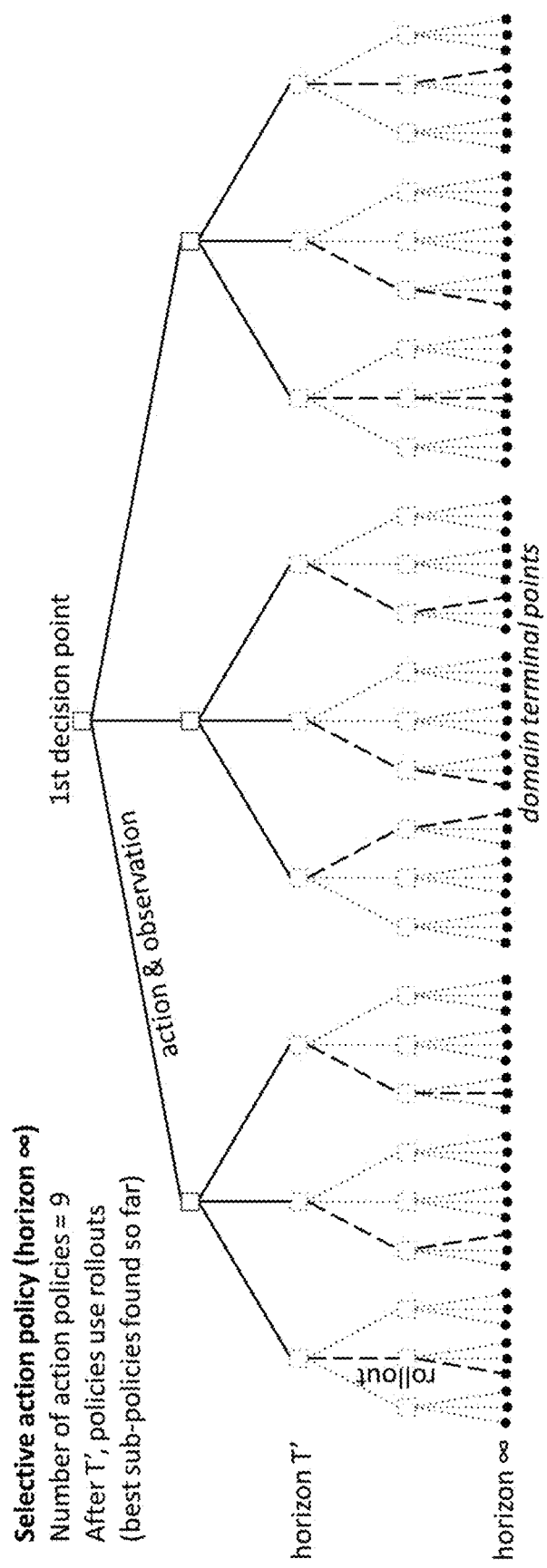
Figure 16D:
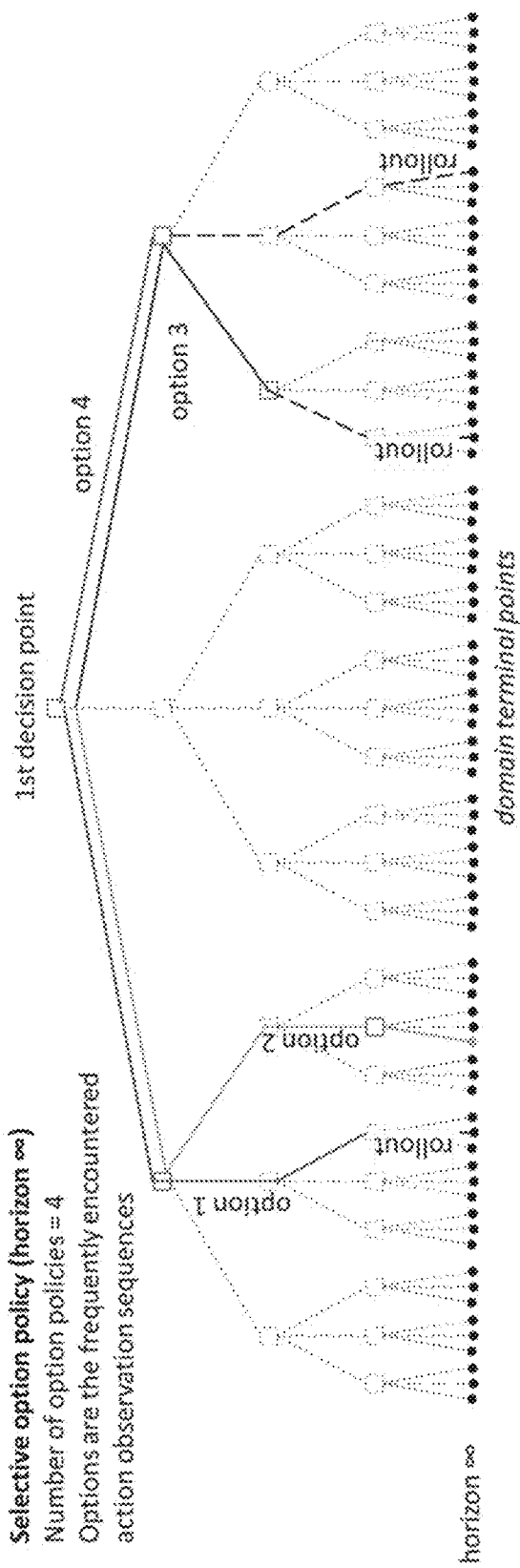

To gain an intuition on how the f Net sequence continuation prediction algorithm works, consider an example from FIGS. 15A-15B wherein the f Net has already built an internal representation of sequence ijed and a partial internal representation of sequence xyijzu (partial because $h_{3\to4}^3$ is not-yet strong). Assume that the f Net attends to $A(3)=3, A(2)=2, A(1)=4$, as shown in step 0 in FIG. 15A, from where it can predict where its attention $A(r)$ will move next, for each region r. Of particular interest is the prediction where $A(1)$ will move next (either to $u_9^1$ or $u_5^1$), as this will indicate the very next action/observation (either z or c respectively) that the f Net predicts that it will receive next from the f Sim.

f Net predictions, stored persistently in f Net unit switches $s[u_k^r]_{next}^{out}$, are updated selectively (for only a tiny number of units at a time), for regions r=R, R−1, ..., 1. In general, f Net updates $s[u_{A(r)}^2]_{last}^{out}\leftarrow s[u_{A(r)}^r]_{last}^{out}$, unless the already computed $s[u_{A(r+1)}^{r+1}]_{next}^{out}=k$ implies that (a likely to be activated next) $u_i^r$ or $u_j^r$ will instead be activated after $u_{A(r)}^r$, for some existing $v_{k|i\to j}^{r+1}$. This is formalized in Algorithm 5 (see FIG. 24E) and illustrated in Steps 1, 2, 3 in FIGS. 15A-15B: In Step 1, f Net updates its predictions for region 3, by assigning $s[u_3^3]_{next}^{out}\leftarrow s[u_3^3]_{last}^{out}=4$ and since $r_3$ is the top region of the f Net, moves on to region $r_2$. In Step 2, f Net updates its predictions for region 2, by first assigning $s[u_2^2]_{next}^{out}\leftarrow s[u_2^2]_{last}^{out}=3$. However, the already computed $s[u_3^3]_{next}^{out}=4$ predicts that either $u_2^2$ or $u_5^2$ will instead be activated next in $r_2$, and since $u_2^2$ is already activated, it can be $u_5^2$ that will be activated next. Therefore, f Net reassigns $s[u_2^2]_{next}^{out}\leftarrow 5$. Finally, in Step 3, f Net updates its predictions for region 1, by first assigning $s[u_4^1]_{next}^{out}\leftarrow s[u_4^1]_{last}^{out}=5$. However, the already computed $s[u_2^2]_{next}^{out}=5$ predicts that either $u_9^1$ or $u_2^1$ will instead be activated next in $r_1$, and since $u_9^1$ is not yet activated, it is predicted that $u_9^1$ will be activated next. Therefore, f Net reassigns $s[u_4^1]_{next}^{out}\leftarrow 9$, which together with $s[u_2^2]_{next}^{out}=5$ also implies that $s[u_9^1]_{next}^{out}=2$, as shown in the FIG. 15B.

In general, towards using the f Net for predicting the continuation of the currently attended-to sequence into more distant future, one can repeatedly compute $s[u_{A(1)}^1]_{next}^{out}$ and enter it to the f Net. That is, compute the first (in region 1) attention move, $p^{(1)}\leftarrow s[u_{A(1)}^1]_{next}^{out}$, then enter $u_{p(1)}^1$ into the f Net (which automatically updates all $A(r)$) and compute the second attention move $p^{(2)}\leftarrow s[u_{A(1)}^1]_{next}^{out}$, then enter $u_{p(2)}^1$ into the f Net (which again automatically updates all $A(r)$) and compute the third attention move $p^{(3)}\leftarrow s[u_{A(1)}^1]_{next}^{out}$ etc. The sequence $u_{p(1)}^1, u_{p(2)}^1, u_{p(3)}^1, \ldots$ of units to be attended-to next then uniquely identifies the corresponding f Sim observations/actions that are predicted to be received by the f Net. Note, that in order for the f Net to be reverted to the state from before the prediction process started, the changes to $A(r)$ and the unit switches (except the prediction switches $s[u_k^r]_{next}^{out}$) made during the prediction process would be reverted to their pre-prediction-process state. Furthermore, to prevent the f Net from expanding its connectome, the PARSE( ) function from Algorithm 2 (see FIG. 24B) can be called with EnterMode=Imaginary. Finally, since the connectome will then obviously not be expanding, to improve the efficiency of the long term prediction process, the ALERT-LIKELY-UNITS( ) function may not be called whenever ENTER( ) is called.

So far, Sections 3.2.2, 3.2.3 and 3.2.4 introduced the core f Net functions required for learning the world model. Equipped with the proper intuition of how these functions should work, formal details on how these functions are implemented in CCE are disclosed elsewhere herein, e.g., Algorithms 1, 2, 3, 4 and 5 in Section 3.4. For use of CCE Agents for controlling the world model, refer to Section 3.3 for learning how f Net uses its learned model for planning its next actions/options.

3.3 Model-Based Policy Search.

Having access to a learned world model provides an agent with distinct advantages over model-free deep RL algorithms when it comes to planning its actions. Most notably, being able to predict the world dynamics allows for much improved data efficiency (fewer agent interactions with the world) for optimal control, better transfer to other goals and tasks and finally, higher confidence in the underlying policy, through model-based estimation of policy uncertainty. It has already been demonstrated that an f Net can indeed continually learn and update the model of the world, from the entangled sequences of heterogeneous f Sim observations and actions. It is now shown how this learned model is used by an f Net for planning its future course of actions.

This document outlines four different algorithms that could be employed for policy search: (i) Exhaustive Action Policy Search (with a fixed horizon T), that treats the underlying f Net model as a black-box, (ii) Selective Action Policy Search (with an infinite horizon), that takes advantage of the unique hierarchical encoding of f Net sequences, (iii) Selective Option Policy Search, that also takes advantage of the unique hierarchical encoding of f Net sequences, but searches more strategically, in the space of next options (macro sequences of actions and observations) rather than next actions to be taken, from the starting points in which said options have been tried and finally (iv) Exhaustive Option Policy Search that extends the option based policy search to arbitrary starting points. Refer to FIGS. 16A-16D for the illustration of the conceptual differences between the first three of these algorithms.

3.3.1 Exhaustive Action Policy Search (Horizon T)

The first proposed algorithm for searching the action policy considers all possible future action sequences, of a given length T, considering the learned model as a blackbox. That is, the planning agent does not see the internal encoding off Net sequences, and can only interact with the model by calling the ENTER( ) and PREDICT-ATTENTION-MOVES( ) functions (Algorithms 1, 5), to enter an observation (or an action) to the model and to predict the next observation. In particular, since each unit $u_k^1$, k=1, 2, . . . , l(1) has an associated reward reward[$u_k^1$] that the agent collects for receiving the corresponding f Sim observation, the agent can also use the model to predict the sum of rewards that a given action policy is expected to yield. As such, the agent is interested in optimally controlling the sequences of observations/actions it attends-to, towards collecting the highest expected sum of rewards from the observations it is going to receive in the future.

Formally, for a given planning horizon T, the algorithm exhaustively considers all possible action policies $\pi=(a^{(1)}, a^{(2)}, \ldots, a^{(t)}, \ldots, a^{(T)}) \in \Pi^T$ where $a^{(t)}$ is the action that the agent will execute at $t^{th}$ decision point on the policy. Towards evaluating policy $\pi$, the algorithm calls ENTER ($a^{(1)}$), retrieves the predicted observation $o^{(1)} \leftarrow s[u_{A(1)}^1]_{next}^{out}$ and feeds it back into the f Net by calling ENTER($o^{(1)}$), then calls ENTER ($a^{(2)}$), retrieves the predicted observation $o^{(2)} \leftarrow s[u_{A(1)}^1]_{next}^{out}$ and feeds it back into the f Net by calling ENTER($o^{(2)}$) etc. After T such steps, the algorithm computes the utility of policy $\pi$ as $\Sigma_{t=1,\ldots,T}$ reward[$a^{(t)}$]+reward[$o^{(t)}$]. Finally, in order for the f Net to be reverted to the state from before the evaluation of policy $\pi$ started, all the changes made to unit switches $s[u_k^r]_{last}^{in}$, $s[u_k^r]_{last}^{out}$, $s[u_k^r]_{next}^{out}$ and indices A(r) of the currently attended-to units during policy $\pi$ evaluation process can be reverted to the state from before the evaluation. Of note, to prevent the f Net from expanding its connectome during said policy evaluation process, the PARSE( ) function from Algorithm 2 (see FIG. 24B) can be called with EnterMode=Imaginary.

The above described algorithm for the exhaustive action policy search has two notable shortcomings: (i) It only works for a fixed planning horizon T that is often small and chosen in an ad-hoc way and (ii) It has an exponential complexity, since the set $\Pi^T$ of possible policies to consider grows exponentially in T. While the effects of these shortcomings are less pronounced in short, episodic domains (that are often considered in RL benchmarks), they are arguably catastrophic in never-ending domains, where the planning agent can strategically consider the action policies over large (often unknown) time horizons. For example, in FIG. 16, each of the 27 plausible action policies (each tree branch corresponds to some action and resulting observation at some decision point) only considers rewards collected at decision points 1, 2, 3=T and ignores all the rewards at subsequent decision points T+1, . . . , T∞ connected via the dotted lines. And because AGI agents eventually will operate in such never-ending domains, there is an urgent desire for model-based planning algorithms that do take such large time horizons into account, as proposed next.

3.3.2 Selective Action Policy Search (Horizon ∞).

The selective action policy search algorithm is proposed specifically to address the problem of large planning horizons. It is referred-to as selective because it does not consider for evaluation all the action policies of length T∞; Instead, it narrows its search space to policies, that from some future f Net state attained at decision point T∞, follow the most-recently executed policy. The rationale behind this heuristic, is that once the agent masters its sub-policy from an f Net state attained at decision point T', it will then stick to executing this sub-policy whenever it finds itself in that state.

Therefore, at decision point 1, the agent may exhaustively consider only the initial action sequences ($a^{(1)}, a^{(2)}, \ldots, a^{(t)}, \ldots, a^{(T'-1)}) \in \Pi^{T'-1}$ of length T'−1, and for each such action sequence, assume that the subsequent actions ($a^{(T')}, \ldots, a^{(T\infty)}$) alongside the underlying observations (referred hereafter as rollouts) will be predicted (e.g., recalled the most recently observed ones) by the model. (Notice, that for a given ($a^{(1)}, a^{(2)}, \ldots, a^{(t)}, \ldots, a^{(T'-1)}$), the predicted/recalled actions and observations will obviously also depend on the f Net state A(r), r=1, . . . , R at decision point 1.) The utility of a candidate policy, calculated as $\Sigma_{t+1,\ldots,T',\ldots,T\infty}$ reward[$a^{(t)}$]+reward[$o^{(t)}$], where $o^t$ is the observation received at $i^{th}$ decision point, therefore accounts for the rewards that the agent will collect in all the domain decision points 1, . . . , T (as opposed to only in domain decision points 1, . . . , T<T∞ when the exhaustive action policy search algorithm is used).

For a general pseudocode of the Selective Action Policy Search, refer to Algorithm 6 (see FIG. 24F). To illustrate this algorithm on an example, consider the third policy search tree from FIG. 16C. Here, T'=3 and there are 3 actions to choose from at each decision point, so the agent considers $3^{(T'-1)}=9$ plausible action policies of length T'−1. Each such action policy is then assumed to be predictable at decision points T', . . . , T∞, in that it follows the most recently executed sub-policy from an f Net state at decision epoch T', given some starting state A(r), r=1, . . . . R in decision epoch 1. For example, given some starting f Net state in decision point 1 and the subsequent execution of actions on the 'left branch' and then 'middle branch', the f Net predicts that in decision point 3 the action on the 'left branch' will be executed, and in decision point 4, action on the 'right branch' will be executed. Notice, that this particular sub-policy rollout (marked with the dashed lines) differs from other rollouts at decision point 7'. Also notice, that although it is not shown, this very rollout depends on what state A(r), r=1, . . . . R the f Net was in at the 1st decision point.

The actual value of T' may not be static: Depending on how much time the underlying agent has to search for policies at decision point 1, it can choose larger values of T' if time allows for it, or smaller values of T if quicker reaction is desired. Similarly, in infinite horizon domains, whenever a quick agent response is warranted, the agent can choose to truncate its policy rollout horizon T∞ at will, or employ a lenient discount factor to gracefully discount rewards from very distant futures. The rollouts themselves are fast (their computational complexity O(R*T') in linear in T' for a bounded number R of f Net regions), as they are performed with EnterMode=Imaginary (see Algorithm 1, FIG. 24A) resulting in no connectome growth, and thus, may not call the computationally expensive ALERT-LIKELY-UNITS( ) function in Algorithm 1 (see FIG. 24A). And thanks to the specific internal encoding of f Net sequences, one can detect when the states visited by the rollout start forming cycles (detected when there are no changes to A(r'), r'=r+1, . . . . R in-between the reactivations of some unit $u_k^r$) and consider terminating the rollouts at such juncture. Finally, instead of a fixed T, one could vary it for different branches of the policy search tree, effectively adapting a Monte Carlo Tree Search iterative approach to build the underlying policy search tree, readily using as rollouts the rollout procedure described above.

The Selective Action Policy Search can be further improved retrospectively: As explained in depth in Section 5.4, the execution agent can retrospectively revisit its past actions taken, and in light of the new evidence (e.g., a mismatch between the predicted- and the actually-observed effects of executing these past actions), internally imagine having taken a different action in the corresponding decision point in the past. The benefit of using such retrospective reasoning is that the future rollouts (performed by the selective action policy search algorithm at decision point T') will likely follow the sub-policies of higher utility, and thus lead to better overall policies at decision point 1. For example, this would be particularly useful for the execution agents employing ϵ-greedy exploration strategies that wish to instantly forget that they have most recently taken a random detour action while following a high utility action plan.

3.3.3 Selective Option Policy Search (Horizon ∞).

Model-based policy search theoretically offers much improved data efficiency, policy explain-ability and policy transfer. In practice though, the policies found by the underlying planning agents are often suboptimal, caused by the inaccuracy of the learned world model, as well as the computational limitations involved in the planning process itself. These computational limitations have been known for the researchers in the planning community, and the proposed mitigation strategies typically involve either: (i) Fixing the planning horizon to some small number, towards performing an exhaustive policy search (sometimes improved by an iterative policy-tree construction schedule and policy rollouts), or (ii) Allowing for an infinite planning horizon, but employing a reward discount factor (that discounts the rewards collected later in time), towards finding a fixed point solution to the underlying Bellman Equations. While these strategies have allowed for the impressive prowess of the underlying agents in academic domains, their applications to real-world, mission-critical domains have been lagging, due to the limited confidence in the suboptimal policies found.

An idea emerged at some point, to deepen the planning horizon while keeping the computational overhead at bay, by employing options in the planning process. Options are the packaged, fixed sequences of actions and observations that the agent can consider pursuing (either instead of the domain actions, or in addition to them). For example, in the bottommost policy tree in FIG. 16D, at the 1st decision epoch the agent can choose to pursue one of four admissible options: Option 1, that allows the agent to consider the action policy: 'left branch'→'middle branch'→'right branch' followed by a short rollout, that was originally (in the 3rd policy tree in FIG. 16C) missing from the set of selective action policies (for a given T'=3); Option 2 (in green), that spans the entire domain time horizon T∞, thus not requiring any policy rollout, and Options 3 (in pink) and 4 (in blue) that are relatively short and are therefore potentially easier to be reused/transferred to some other decision points. In particular, notice that Option 4 (which corresponds to the execution of just one action) is essentially a prefix of the larger Option 3, when unpacked. Also notice, that the agent considers no options that start at the 1st decision point with the 'middle branch' action, possibly because that action was never beneficial to the agent (at the 1st decision point), and the underlying options (that start with that action) have not been pursued frequently enough to be learned.

The benefit of searching for option policies, versus action policies, is a significant reduction in complexity of the search process: Whereas the computational complexity of the exhaustive action policy search in FIGS. 16A-16D is exponential in $T^\infty$ (e.g., there are 27 distinct action policies for T'=5), the computational complexity of the selective option policy search is typically much lower (e.g., there are only 4 options to consider in FIGS. 16A-16D), provided that the set of domain options is properly constructed. The natural question then becomes: How to determine if an option is/is not admissible (and then feasible), at a given decision point, and how to how to properly construct the set of domain options to begin with. How this is accomplished, for the domains whose dynamics are represented by f Nets, is explained next.

Barring any domain expert knowledge, the set of domain options may not be hand-crafted, and instead can be automatically discovered. Indeed, the topic of automatic options discovery has received a lot of attention, but only limited progress has been achieved so far, mainly on identifying the 1st-level options. In this context, the method for the automatic options discovery and options feasibility identification, presented hereafter, fundamentally alters this landscape. What allows for that, is the unique encoding of the domain model using the fractal networks, arguably missing from past approaches that assumed a black-box version of the world model. Specifically, it is the fractal network connectome growth, that prioritizes the encoding of the most frequently encountered sequences (of domain actions/observations), that naturally leads to the discovery of higher level options, associated with higher region f Net units. And it is the persistent, yet rapidly alterable, f Net unit $s[u_k^r]_{next}^{out}$ switches, that allow for a near instantaneous identification whether a given admissible option is feasible, in a given context (current state of the f Net model).

Formally, an option in an f Net model, denoted as $\Phi_k^r$, is strictly associated with an f Net unit $u_k^r$. In region 1, options $\Phi_k^1$ naturally unpack to a single f Sim action or observation, associated with unit $u_k^r$. For example (refer to FIG. 15), $\Phi_9^1$ unpacks to f Sim observation 'z' (that is considered to be actionable if motor[$u_9^1$]=True). In higher regions, options $\Phi_k^r$ unpack to sequences of f Sim actions and observations; And they are composed from options of $\Phi_i^{r-1}$ and $\Phi_j^{r-1}$ in the region below, for the existing vertical connection $v_{k|i \to j}^r$. In the example in FIG. 15, option $\Phi_5^2$ unpacks to a sequence (z, v) of f Sim observations and is composed of options $\Phi_9^1$ and $\Phi_2^1$.

Options $\Phi_k^r$ may not be pursued without context: That is, option $\Phi_k^r$ can only be chosen to be voluntarily pursued in context of some currently attended to unit $u_{A(r)}^r$, provided that $w(h'_{A(r) \to k}^r)>0$. (Intuitively, an option can be voluntarily pursued in a given context, provided that it has already been observed in that context, at some point in the past.) The set of all admissible options in the current context is therefore $\{\Phi_k^r:r=1, 2, \ldots, R; A(r)\neq null; w(h_{A(r) \to k}^r)>0\}$. In the example in FIG. 15: The context in region 3 is A(3)=3, and because $w(h_{3 \to 4}^3)>0$, option $\Phi_4^3$ is admissible (unlike, e.g., $\Phi_2^3$ because $w(h_{3 \to 2}^3)=0$); The context in region 2 is A(2)=2, and because $w(h_{2 \to 5}^2)>0$ and $w(h_{2 \to 3}^2)>0$, both options $\Phi_5^2$ and $\Phi_3^2$ are admissible; Finally, the context in region 1 is A(1)=4, and since $w(h_{4 \to 9}^1)>0$ and $w(h_{4 \to 5}^1)>0$, both options $\Phi_9^1$ and $\Phi_5^1$ are admissible.

When in the context of $u_A^r(r)$, option $\Phi_k^r$ is chosen to be voluntarily pursued, it may be unpacked: That is, because there may be an overlap between the suffix of the sequence of f Sim actions and observations corresponding to (the already completed) option $\Phi_{A(r)}^r$ and the prefix of the sequence of f Sim actions and observations corresponding to option $\Phi_k^r$, when $\Phi_k^r$ is chosen to be voluntarily pursued, only the non-overlapped part of the sequence corresponding to $\Phi_k^r$ will be pursued. Formally, only the last l elements of the full sequence that corresponds to $\Phi_k^r$ will be pursued, where $l=l(h_{A(r)\to k}^r)$ is the length of the horizontal connection between $u_{A(r)}^r$ and $u_k^r$, established when the connection was first formed. In the illustrative example, when the admissible option $\Phi_4^3$ is chosen to be pursued, in context of A(3)=3, it is first unrolled: The full sequence of f Sim observations that $\Phi_4^3$ corresponds to is (i, j, z, v), whereas the full sequence of f Sim observations that the just completed option $\Phi_{A(3)}^3$ corresponds to is (x, y, i, j). Thus, the non-overlapped part of the sequence of the option $\Phi_4^3$ to be pursued is (z, v), and it happens to corresponds to exactly $l=l(h_{3\to 4}^3)=2$ last elements of the full sequence of $\Phi_4^3$. (See Algorithm 9, FIG. 24I for the details on how to unpack the options in an arbitrary case.)

Of the currently admissible options, only some are currently feasible, given the current state of the f Net. This is because the options to be pursued correspond to the sequences of f Sim actions and observations, and unlike the former (which are under the agent's control), the latter may simply not (be predicted to) be achievable given the current f Net state and the values of its $s[u_k^r]_{next}^{out}$ switches. For example, consider again the f Net in FIG. 15, at Step 3 (after the prediction of the continuation of sequences has been completed) and assume that motor[$u_5^1$]=False, that is, it is not under the agent's control to activate unit [$u_5^1$] whenever it wishes to do so. Notice, that in that case, the admissible option $\Phi_5^1$ will no longer be feasible, because the f Net is currently predicting that unit $s[u_4^1]_{next}^{out}=9$ will be activated next (in region 1) and there is nothing that the agent can do to change that. Similarly, the admissible option $\Phi_3^2$ will no longer be feasible, because the f Net is currently predicting that unit $s[u_2^2]_{next}^{out}=5$ will be activated next (in region 2), and again, there is nothing that the agent can do to change that. Notice however, that if motor[$u_5^1$]=True, then despite $s[u_4^1]_{next}^{out}=9$, the admissible option $\Phi_3^2$ will be feasible, because the agent can cause the activation of the motor unit $u_5^1$ in the current context. Furthermore, the admissible option $\Phi_3^2$ also will start being feasible, because the agent's ability to activate $u_5^1$ at will, combined with $s[u_4^1]_{next}^{out}=6$ (that obviously holds, since $u_6^1$ is the only successor unit of $u_5^1$ in the f Net shown) means that the agent can cause the activation of $u_3^2$ (albeit indirectly). Finally, notice that despite changing motor[$u_5^1$] to True, the admissible options $\Phi_9^1$ and $\Phi_5^2$ are still feasible, because $s[u_4^1]_{next}^{out}=9$ and $s[u_2^2]_{next}^{out}=5$ still hold. (See Algorithm 8, FIG. 24H for the details on how to determine the feasibility of the admissible options in an arbitrary case.)

Figure 17:
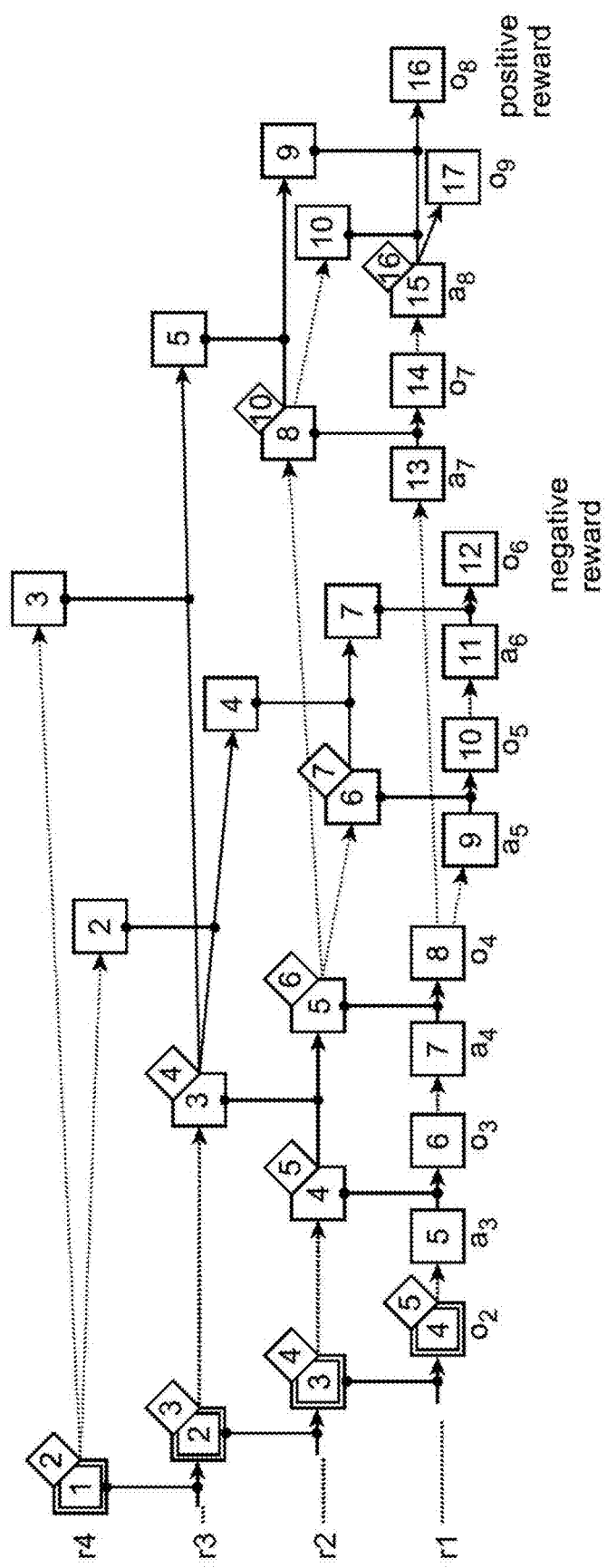
FIG. 17 illustrates a non-limiting example of an option policy search.

To illustrate the search for option policies on an example, consider the f Net from FIG. 17. Having last observed $o_2$, the f Net is in state A(1)=4, A(2)=3, A(3)=2, A(4)=1, from where the underlying agent will either: (i) follow a purple-red (action/observation) sequence, that terminates with a negative reward[$u_{12}^1$] (for receiving observation $o_6$), or (ii) follow a purple-blue sequence, that terminates with a positive reward[$u_{16}^1$] (for receiving observation $o_8$). Unfortunately for the agent, it has most recently followed (from the current state) the purple-red sequence (for which it received a negative reward), and therefore, the PREDICT-ATTENTION-MOVES( ) function has updated the prediction switches to $s[u_1^7]_{next}^{out}=2$, $s[u_2^3]_{next}^{out}=3$, $s[u_3^3]_{next}^{out}=4$, $s[u_4^1]_{next}^{out}=4$ and $s[u_4^1]_{next}^{out}=5$. The task of the planning agent is to determine if it is worth executing action $a_3$; That is, to determine the expected total reward for executing action $a_3$, when following the optimal policy that starts with $a_6$ in the current state.

Unfortunately, action-based policy search algorithms will most likely fail at this task, due to their explicit limit T' on the maximum length of admissible actions sequences to consider. For example, the selective action policy search algorithm (from Section 3.3.2), with the limit T'=2 on the length of the admissible action sub-policies that are exhaustively searched, will trigger the policy rollout at decision point 3. Consequently, the one and only action policy that the algorithm will evaluate will be the one that employs action $a_3$ and observes $o_3$ (at decision point 1), followed by action $a_4$ and observation $o_4$ (at decision point 2), at which point the algorithm will switch to policy rollout, that in turn will predict action $a_5$ and observation $o_5$ (at decision point 3) and finally action $a_6$ and observation $a_6$ (at decision point 4) that yields a negative reward reward[$u_{12}^1$]. As such, the algorithm will falsely determine that it is not worth pursuing $a_2$ at the current state. While in this particular example, increasing the limit T' to 3 would remedy this problem (the agent could then consider a better policy, that at decision point 3 chooses action $a_7$ and consequently, predictably collects the positive reward[$u_{16}^1$] at decision point 4), one can easily imagine a more complex planning problem, where multiple different actions can be considered at decision point T'+1. Action-based policy search algorithms, with a fixed T', will eventually fail in such settings.

The proposed selective option policy search algorithm addresses this problem, for it considers option policies that employ different actions (versus only the one predicted by the model during the policy rollout) at potentially any decision point of the policy. This is best illustrated by revisiting the example in FIG. 17. From the current state A(1)=4, A(2)=3, A(3)=2, A(4)=1, the algorithm can consider the admissible options $\Phi_5^2$, $\Phi_4^2$, $\Phi_3^3$, $\Phi_2^4$ and $\Phi_3^4$. The first four of them are trivially feasible, because each of them is actually already predicted to be pursued from the current state (since $s[u_4^1]_{next}^{out}=5$, $s[u_3^2]_{next}^{out}=4$, $s[u_2^3]_{next}^{out}=3$ and $s[u_1^4]_{next}^{out}=2$ respectively). Unfortunately, each of them eventually leads to the encounter of observation $o_6$ (that yields the negative reward[$u_{12}^1$]), either immediately, during the option unpacking process or later, during the policy rollout after the option is completed. For example, option $\Phi_2^4$ unpacks to the unit sequence (5, 6, 7, 8, 9, 10, 11, 12) that immediately yields the negative reward[$u_{12}^1$]. On the other hand, option $\Phi_3^3$ for example, unrolls to the unit sequence (5, 6, 7, 8) after which it is followed by the policy rollout that visits units (9, 10, 11, 12), thus also yielding the negative reward[$u_{12}^1$].

The last admissible option that can be considered, of, would actually be the most desirable, as its unpacked sequence (5, 6, 7, 8, 13, 14, 15, 16) not only avoids the negative reward[$u_{12}^1$], but also encounters a positive reward [$u_{16}^1$]. But is option $\Phi_3^4$ feasible to begin with? $\Phi_3^4$ is composed of $\Phi_3^3$ and $\Phi_5^3$, of which the former is obviously feasible (since $u_3^3$ is currently predicted by $s[u_2^3]_{next}^{out}=3$), so the feasibility of $\Phi_3^4$ hinges solely upon the feasibility of $\Phi_5^3$. Unfortunately, because $u_5^3$ is not predicted by $s[u_3^3]_{next}^{out}$, the feasibility of $\Phi_5^3$ is contingent on: (i) the feasibility of $\Phi_8^2$ and (ii) the feasibility of $\Phi_9^2$ Regarding (i): because $s[u_5^2]_{next}^{out}=6$ versus 8, the feasibility of $\Phi_8^2$ hinges upon the feasibility of $\Phi_{13}^1$ and $\Phi_{14}^1$. Fortunately, motor[$u_{13}^1$]=True, implies that the agent can activate $u_{13}^1$ (action $a_7$) at will, so $\Phi_{13}^1$ is feasible. $\Phi_{14}^1$ also happens to be feasible, because clearly $s[u_{13}^1]_{next}^{out}$ since $u_{14}^1$ is the only successor of $u_{13}^1$ in the f Net shown. Regarding (ii): Because $s[u_8^2]_{next}^{out}=10$ versus 9, the feasibility of $\Phi_9^2$ hinges upon the feasibility of $\Phi_{15}^1$ and $\Phi_{16}^1$. Fortunately, motor$[u_{15}^1]=$ True implies that the agent can activate $u_1^{51}$ (action $a_8$) at will, so $\Phi_{15}^1$ is feasible. On the other hand, $\Phi_{16}^1$ is feasible because $s[u_{15}^1]_{next}^{out}=16$. In conclusion, because option of has been determined to be feasible, and it unpacks to a sequence of units whose cumulative reward is positive (equal to reward$[u_{16}^1]$), the agent will consider the first action of the unpacked option $\Phi_3^4$, namely $a_3$, to be worth executing. The selective option policy search will therefore successfully solve the planning task, that the action-based policy search algorithms struggled with. (Refer to Algorithm 7 (see FIG. 24G) in Section 3.4 for the detailed implementation of the selective option policy search described herein.)

This concludes the explanation of the core functions of the fractal networks, employed by the underlying CCE execution agent to help it to achieve its domain goals. As explained in Sections 5.4 and 5.4, the agent can achieve even higher performance when additionally using retrospective and counterfactual control. Briefly, retrospective control allows the agent to revisit its past decisions, and in the light of new evidence, imagine having undertaken a different action in the past and encode it in its model, to improve its selective action policy search. The counterfactual control on the other hand, allows the agent to also consider pursuing the currently non-feasible options, provided that some other policy, executed preemptively, can alter the current predictions $s[u]_{next}^{out}$ of the model, towards rendering the original (non-feasible) option feasible. Techniques are further described elsewhere herein, e.g., Section 5.

3.3.4 Exhaustive Option Policy Search (Horizon ∞).

Recall that the Selective Option Policy Search only considered the feasibility of the admissible options, that is, options that have already been performed (at some point in the past) in a given context (f Net state). Specifically, for a given region r and its currently attended-to unit $u_{A(r)}^r$ (if present), only the options $\Phi_k^r$ for the already existing horizontal connections $h_{A(r) \to k}^r$ were being marked as admissible. For example, in FIG. 17, in region 3 only option $\Phi_3^3$ was being considered, since this is the only option that has at some point in the past been fully completed following the activation of unit $u_2^3$ (note that $h_{2 \to 3}^3$ is the only outgoing horizontal connection from the currently attended-to unit $u_2^3$). As such, from its current f Net state, the agent was not considering to proceed directly with the execution of option $\Phi_4^3$, even though option $\Phi_4^3$ is clearly feasible and could be readily commenced.

This selectivity in admissible options thus yielded two advantages and one disadvantage. It terms of the advantages: (i) The search for the option policy was much constrained and thus faster, since not all f Net options were being considered, and (ii) The outcomes of the execution of the admissible options, in their respective contexts (f Net states), were already encoded in the f Net model, and as such, were more predictable and reliable (albeit arguably less interesting for a novelty-motivated planning agent). In contrast, the main disadvantage of the selective option policy search was in not directly admitting the options that, although currently feasible, have never actually been attempted in the current context (f Net state). As such, some advantageous options were excluded from the planning process, potentially depriving the agent of higher quality policies.

Towards remedying this shortcoming, the planning agent can initiate the Exhaustive Option Policy Search that works as follows: First, the agent can list all of its f Net units as potential options to be undertaken. Next, the agent can quickly filter that list, by removing from it the options that may not be started with any of the admissible actions (or the currently predicted observation in region 1). Finally, for each remaining option from the filtered list, the agent can check if this option is feasible using Algorithm 8 (see FIG. 24H), and if yes, compute the option utility by adding the rewards of region 1 units that the option unpacks into (using Algorithm 9, FIG. 24I) and optionally adding the rewards of region 1 units that are predicted to be visited after the option is completed (using Algorithm 10, FIG. 24J). From an option that yields the highest utility the agent can then extract the first action to be executed, and finally start the execution of said action until the arrival of the next observation, at which the exhaustive option policy search process restarts.

As such, the Exhaustive Option Policy Search differs from the Selective Option Policy Search (Algorithm 7, FIG. 24G) only in the list of options to consider (established in lines 2,3 in Algorithm 7, FIG. 24G). It is shown in detail in Algorithm 11 (see FIG. 24K) how this exhaustive list of options for the Exhaustive Option Policy Search is established.

3.4 Pseudocodes.

This section provides the pseudo-codes that formalize the f Net core functions first introduced in Sections 3.2.2, 3.2.3 (for sequence learning, compression, concurrency and disentanglement), in Section 3.2.4 (for sequence continuation prediction) and in Section 3.3 (for the model-based policy search).

Sequence learning, compression, concurrency, disentanglement. To begin with, when a new action or observation (identified by a discrete symbol dst$^1$) arrives to an f Net, it is entered into the f Net region r=1 using function ENTER (dst$^1$) in Algorithm 1 (see FIG. 24A). From there on (while loop in lines 2-15), this triggers a cascade of attention moves in regions r=1, 2, 3, ... as follows: Assume A(r)=src is the identifier of a unit that has been attended-to in region r (line 3) and dst is the identifier of a unit that just got activated in region r (line 4). The attention A(r) immediately moves to dst (line 5) and the latest ActivationTime of $u_{dst}^r$ receives the current time stamp TIME( ) from the operating system (line 6). It is possible that the old A(r)=src was null (line 7) in which case the algorithm breaks the while loop (line 14). Otherwise (in line 8), the f Net attempts to PARSE the attention shift from $u_{src}^r$ to $u_{dst}^r$. If the PARSE function (described herein) returns a non-null identifier dst$^{r+1}$ of a unit to be activated in region r+1 (line 9), the region r is incremented by 1 (line 10) and the execution of the while loop continues from the beginning (from line 3). Once the while loop eventually terminates, the f Net calls (in line 16) the ALERT-LIKELY-UNITS( ) function towards preparing the units that are likely to be the continuation of the currently attended-to sequences for their upcoming activation (either immediately, or later, after a sequence interruption). Finally (in line 17), the f Net calls PREDICT-ATTENTION-MOVES( ) a function for predicting how the currently attended-to sequence will continue into the future, at multiple time-scales.

When the PARSE (r, src, dst) function in Algorithm 2 (see FIG. 24B) is called, the f Net can be in one of two EnterModes: Real or Imaginary. In the former case, the actions or observations that enter the f Net are Real, e.g., they have been generated by some f Sim, whereas in the latter case, they have been internally imagined by a corresponding CCE Agent. The difference between the two EnterModes is that whereas the f Net units switches can be modified in either EnterMode, the f Net (horizontal or vertical) connections can only be modified when EnterMode=Real. (Intuitively, a CCE can learn new concepts only when they are experienced in reality, but can revisit and update the already learned concepts even if they are only imagined.)

The first task of PARSE (r, src, dst) (when EnterMode is Real in line 1) is to handle the formation and update of the horizontal connection $h_{src \rightarrow dst}^r$. If $h_{src \rightarrow dst}^r$ is novel, e.g., its weight is 0 (line 1), it is first formed by assigning to it a fixed length $l(h_{src \rightarrow dst}^r)$ computed (in line 2) using the LENGTH $(h_{src \rightarrow dst}^r)$ function defined in Algorithm 3 (see FIG. 24C). (The weight of the just formed $h_{src \rightarrow dst}^r$ is increased later.) The last attention move from $u_{src}^r$ as well as the predicted next attention move from $u_{src}^r$ are then encoded in the switches $s[u_{src}^r]_{last}^{out}$ and $s[u_{src}^r]_{next}^{out}$ (lines 4-6), provided that the underlying here-dst already exists in case Enter-Mode is Imaginary.

The second task of PARSE (r, src, dst) (when EnterMode is Real and the parse has been unlikely, in line 8) is to increment the weight of $h_{src \rightarrow dst}^r$ (line 9) and then potentially form a new vertical connection $v_{k|src \rightarrow dst}^{r+1}$ if the weight $w(_{src \rightarrow dst}^r)$ of a not-yet-strong $h_{src \rightarrow dst}^r$ exceeds threshold $\tau(r)$ or the PARSE function processes a self-transition, e.g., src=dst (line 10). (The special handling of the self-transition is introduced to prevent the f Net from forming weak horizontal self-connections, as this would potentially lead to the creation of f Net units that could ambiguously correspond to multiple different sequences.) Critically, this formation of $v_{k|src \rightarrow dst}^{r+1}$ can only occur if the underlying attention move A(r) from src to dst has been unlikely, e.g., when src≠$s[u_{dst}^r]_{last}^{in}$ (explained in depth in Algorithm 4, FIG. 24D). Once all these conditions are met, the underlying $h_{src \rightarrow dst}^r$ is permanently marked as strong (line 11). And if r is still smaller than the theoretical limit $R_{max}$ of the number of existing regions (line 14) then some $u_k^{r+1}$ is allocated and a vertical connection $v_{k|src \rightarrow dst}^{r+1}$ is formed, connecting $u_k^{r+1}$ to $h_{src \rightarrow dst}^r$ to (line 13).

The final task of PARSE (r, src, dst) is to return k if there exists some unit $u_k^{r+1}$ that should be activated next in r+1 when the f Net parses the attention move A(r) from src to dst. This task is simple if $h_{src \rightarrow dst}^r$ is strong (lines 18-19), because (unless r=$R_{max}$) there certainly exists $v_{k|src \rightarrow dst}^{r+1}$ for some $u_k^{r+1}$ that will become activated once A(r) completes the move from src to dst. Otherwise, when $h_{src \rightarrow dst}^r$ is not-yet-strong, the f Net checks whether there exists some alternative explanation for the unexpected activation of $u_{dst}^r$. In particular, the f Net attempts (in line 17) to identify the last sequence ( . . . , $u_{src}^r$, $u_{dst}^r$, . . . ) whose unit $u_{src}^r$, alerted $u_{dst}^r$, about a possible future activation of $u_{dst}^r$. If such src'≠null exists (line 20), f Net assumes that the (interrupted) sequence ( . . . , $u_{src'}^r$, $u_{dst}^r$, . . . ) may have resumed, therefore updating (in lines 21-22) the last attention move from $u_{src'}^r$ to $u_{dst}^r$ and the predicted next attention move from $u_{src'}^r$ to $u_{dst}^r$ as well as returning k if $v_{k|src' \rightarrow dst}^{r+1}$ exists.

As shown in Algorithm 2 (see FIG. 24B), each time a new horizontal connection $h_{src \rightarrow dst}^r$ is formed, a call to LENGTH $(h_{src \rightarrow dst}^r)$ is made to establish a permanent connection length $l(h_{src \rightarrow dst}^r)$. Intuitively, $l(h_{src \rightarrow dst}^r)$ is the minimum number of region 1 activations between the subsequent activations of $u_{src}^r$ and $u_{dst}^r$. Therefore, in Algorithm 3 (see FIG. 24C), LENGTH($h_{src \rightarrow dst}^r$) returns 1 if r=1 (lines 1-2). Otherwise, the Algorithm loops (in lines 5-22) over the regions r, r–1, . . . , 1 while increasing the temporary length to be returned (initialized to 0 in line 4). The logic in each loop pass is as follows: The length $l(h_{src \rightarrow dst}^r)$ between the current $u_{src}^r$ and $u_{src}^r$ is the sum of the lengths $l(h_{left \rightarrow center}^{r-1})$ and $l(h_{center \rightarrow right}^{r-1})$ for the units $u_{left}^{r-1}$, $u_{center}^{r-1}$, $u_{src}^r$, $u_{right}^{r-1}$ activated in r–1 in-between the subsequent activations of $u_{src}^r$ and $u_{dst}^r$ (established in lines 6-8). Therefore, if left=center the current length is only incremented by $l(h_{center \rightarrow right}^{r-1})$ and immediately returned (lines 9-12). Else (in line 13), if $h_{left \rightarrow center}^{r-1}$ already exists, then length is further incremented by $h_{left \rightarrow center}^{r-1}$ (in line 14) and immediately returned. In all other cases when r is not the bottom region, the loop prepares itself (lines 19-21) for descending to region r–1 where length will be further increased by the distance between $u_{src}^{r-1}$ and $u_{dst}^{r-1}$ for the updated identifiers src←left and dst←center.

When the ENTER( ) function completes its main loop, the newly attended-to units jointly mark the current state of the currently attended-to sequence. These newly attended-to units then send the alerts to the units that are likely to be attended-to next, by using the ALERT-LIKELY-likely and UNITS( ). The function implements these alerts by updating the $s[u_k^r]$ in $s[u_k^r]_{last}^{in}$ switches, as shown in Algorithm 4 (see FIG. 24D).

First, all the current $s[u_k^r]_{likely}^{in}$ switches are reset to false (line 1). The algorithm then loops over all the regions r=1, 2, . . . , $R_{Max}$ for which A(r)≠null (lines 2-19), and for a given r, loops over all the strong connections $h_{A(r) \rightarrow dst}^r$ (lines 3-18). Intuitively, the algorithm will send an alert from unit $u_{A(r)}^r$ to unit $u_{dst}^r$ and then repeat that for the units on the boundaries of the temporal dilution gap underneath $h_{A(r) \rightarrow dst}^r$ (lines 5-17). To this end, the algorithm keeps track of the residual, which is the remaining temporal dilution gap between the currently attended to unit $u_{A(r')}^{r'}$ and the likely to be attended-to-next unit $u_{dst}^{r'}$, for regions r':=r, r–1, . . . 1. Specifically, if unit $u_{dst}^{r'}$ has not yet been alerted, it is alerted by setting $s[u_{dst}^{r'}]_{likely}^{in}$ to true and updating $s[u_{dst}^{r'}]_{last}^{in}$ to the identifier of the currently attended-to unit in region r' (lines 7,8). In the subsequent lines (10-17) the algorithm prepares itself for the next iteration of the loop over r'. Notice the three conditions (in line 13) to be fulfilled in order for the algorithm to step down to r'–1 (or else break the current iteration of the loop over r').

Firstly, the f Net may be attending in region r'–1 to unit $u_c^{r'-1}$ for some existing vertical connection $v_{A(r')|* \rightarrow c}^{r'}$; That can hold, because if the currently tracked sequence has already advanced in region r'–1 (e.g., from unit c to some unit d of an existing vertical connection $v_{dst|d \rightarrow e}^{r'}$) unit $v_{dst|d \rightarrow e}^{r'}$) unit $u_d^{r'-1}$ itself will be sending alerts (in some other iteration of the loop in line 2) to subsequent units, starting with alerting the unit $u_e^{r'-1}$. Secondly, there can exist a horizontal connection head, $h_{c \rightarrow d}^{r'-1}$, because otherwise, $u_d^{r'-1}$ has never been observed to follow $u_c^{r'-1}$ and hence, is actually not likely to be attended-to next (from the currently attended-to unit $u_c^{r'-1}$). Finally, the remaining residual can still be greater than zero, since otherwise, the loop in line 5 has already reached the bottom end of the temporal dilution gap. (Notice, how without the use of the residual, the r' loop iterations could potentially erroneously continue, e.g., in the presence of a weak self-transition $h_{A(r'-1) \rightarrow A(r'-1)}^{r'-1}$) Once all these three conditions are fulfilled, the algorithm updates dst to d (in line 14) descends to a lower region r'+r'-1.

The presence of the three nested loops in ALERT-LIKELY-UNITS( ) potentially constitutes the computational bottleneck of the f Net sequence learning. While the break condition statement (in line 6) cancels the innermost loop when encountering a switch $s[u_{dst}^{r'}]_{likely}^{in}$ already set to true, the algorithm complexity is still of the order $O(F \times R_{Max})$ where $F = \max_{r,i} \Sigma_j W(h_{i \leftarrow j}^r)$ is the current maximum fan-out of the strong horizontal connections from an f Net unit. Efforts to improve the efficiency of this algorithm, e.g., by converting it into matrix operations, are worthy of exploration.

Sequence continuation prediction. f Net Sequence continuation prediction is implemented using the PREDICT-ATTENTION-MOVES( ) function in Algorithm 5 (see FIG. 24E). The function updates the prediction p of where the (non-null) attention A(r) will move next, in regions r+R, R−1, . . . , 1 (lines 2,3). For a given region r, p is by default assigned the last attended-to successor of A(r) (line 4). This default assignment is critical for proper CCE functioning. However, it is possible at this point to alternatively assign p to the identifier k of successor $u_k^r$ sampled (e.g., uniformly) from the underlying histogram $w(h'_{A(r) \to k}^r)$ for $1 \leq k \leq l(r)$. Such experimental assignment could yield promising results when using f Net as a probabilistic generative temporal model. This default assignment for p is then changed (in line 5) to p' (the overriding prediction of where A(r) will move next, computed when the loop was processing region r+1) in case p'≠0. Upon copying p to $s[u_{A(r)r}]_{likely}^{in}$ (line 6), the algorithm computes (in lines 7-16) the new value for p', to be later used when processing region r−1>0. When p is not null, the default value p'←null (line 9) can then be replaced by i' or j' (extracted from an existing $v_{p|i' \to j'}^r$) as follows: If the attention A(r) is predicted to move to p and $u_{i'}^{r-1}$ is already attended-to (e.g., A(r−1)=i') then $u_{j'}^{r-1}$ will be the next unit to be attended-to in region r−1 and therefore p'→j' lines 10,11). Alternatively, when $u_{i'}^{r-1}$ is not yet attended-to, the attention will move to it from A(r−1), provided that $s[u_{A(r)}^r]_{next}^{out}$=A(r−1) (i.e., $u_{A(r-1)}^{r-1}$ and $u_{i'}^{r-1}$ are the likely successors on some sequence), hence p'←i' (lines 12,13). Additionally, once the predicted $u_{i'}^{r-1}$ is activated, it itself will then predict $u_{j'}^{r-1}$ (because of the simultaneous prediction of $u_p^r$ in r) and therefore $s[u_{i'}^{r-1}]_{next}^{out}$ is preemptively set to j' (line 14).

Selective Action Policy Search.

The Selective Action Policy Search, introduced in Section 3.3.2 is detailed in Algorithm 6 (see FIG. 24F). The algorithm is started with the f Net being in a given input state A(r), r=1, 2, . . . , R from which the utilities Q(a) of all admissible actions a are to be computed. The algorithm will iterate over these actions (either sequentially or in parallel, depending on the CCE implementation) hence it first (in line 1) makes a Backup of the current f Net state and the values of f Net unit switches. The backup itself is soft, e.g., only the registered changes to the f Net model may need to be stored in the Backup data structure, for later rollback to the original model. The algorithm then sets EnterMode to Imaginary, to prevent the f Net connectome from expanding during the policy search, and resets all the values of Q(a) (lines 2,3). The actual loop over all the selective action policies, performed in lines 4-15, considers all admissible initial action sub-policies $(a^{(1)}, a^{(2)}, \ldots, a^{(T'-1)})$ where $a^{(t)}$ is an action that the agent performs at decision point t. The effects of each such sub-policy are first simulated by the learned f Net model: For each decision point t<T' the algorithm calls ENTER $(a^{(t)})$ to internally PARSE( ) out the simulated action $a^{(t)}$ and update its current state A(r) and predictions $s[u_{A(r)}^1]_{next}^{out}$, r=out 1, 2 . . . , R. In particular, its region 1 prediction $s[u_{A(1)}^1]_{next}^{out}$ is used to infer the underlying observation $o^{(t)}$ that the agent will receive after executing $a^{(t)}$ at decision point t. This observation is then entered back into the f Net to internally update f Net state and its predictions as if $o^{(t)}$ was actually received by the f Net. Finally, at decision point T' the algorithm switches to policy rollout wherein it infers (and then enters into its model to update next predictions) both the actions $o^{(t)}$ that will be executed at decision point t (lines 6,7) as well as the underlying observations $o^{(t)}$ that will be received (lines 8,9), for t=T', T'+1, . . . , T'.

Having simulated the entire policy (initial sub-policy followed by the rollout), the agent then stores in q the expected value of the policy: The sums reward[$a^{(t)}$]+reward [$o^{(t)}$] received at decision points (=1, 2, . . . $T^\infty$, discounted (optionally) by δ' for 0<δ<1 (line 11). As explained later (Section 5.4), the agent then (optionally, in line 12) further increases the policy reward q by CFR( ) an intrinsic counterfactual reward for altering the value of f Net unit switches (identified in Section 3.3.3 to be critical for the feasibility of some promising master-level policy). Finally, Q(a) is updated to be the maximum of its existing value or q (line 13) and the f Net state and switches changes are rolled back using the Backup stored in line 1.

Selective Option Policy Search.

The Selective Option Policy Search, introduced in Section 3.3.3 is formalized in Algorithm 7 (see FIG. 24G) and uses functions FEASIBLE( ), UNPACK( ) and ROLLOUT( ) defined in Algorithms 8, 9, 10 respectively. The Selective Option Policy Search takes as input the current f Net state, e.g., A(r) for r=1, 2, . . . , R and returns the highest utilities Q(a) of actions that correspond to the initial actions of the options admissible—and previously attempted—in the current f Net state. The algorithm begins by initializing in line 1 all Q(a) to −∞. It then proceeds to iterating (in lines 2-19) over all the options $\Phi_K^r$ that are admissible from some currently attended-to unit $u'_{A(r)}^r$ in region r, for r=1, 2, . . . , R.

First (line 4), the algorithm checks if the currently considered option $\Phi_K^r$ is feasible, in context of the current f Net state. The check itself is invariant of A(r'), r'r, but does depend on $[A(r')]_{r'=1}^r$ as well as on the current values of switches $s[u]_{next}^{out}$ of units u that $\Phi_K^r$ is made from. Upon passing this check, the option $\Phi_K^r$ is then unpacked, in the context of $[A(r')]_{r'=1}^r$ and $l(h_{A(r') \leftarrow k}^r)$ (explained in Algorithm 9, FIG. 24I), to determine the remaining set of region 1 units (and their relative completion times) that will be visited during the continuation of the execution of the option until its completion. The sum q of rewards for these to-be-visited units is then computed by summing over each individual reward[$u_k^1$] (that could be optionally discounted, to prioritize earlier rewards, using the relative completion times). In lines 7-10, q is further in-creased/decreased, by performing a policy rollout from an imagined f Net state after the completion of option ok. It is important to back up the pre-rollout f Net state and switches (line 7) and later restore it (line 10), as the rollout itself changes these values. Optionally (line 9), q can be further increased by CFR( ) an intrinsic counterfactual reward for altering the value of f Net unit switches that are critical for the feasibility of some other master-level policy search, as explained in Section 5.4.

With the expected reward q of a feasible option $\Phi_K^r$ already computed, the algorithm determines (in lines 11-15) the next action a that would be executed if option $\Phi_K^r$ were to be pursued from the current f Net state. This is accomplished by descending to regions r'←r,r−1, . . . , 2 and updating the temporary variable a (initialized at k) to either src or dst for an existing $v_{a|src \to dst}^{r'}$ in context of the currently active unit in region r'−1. The highest-so-far expected reward Q(a) for executing a is then reassigned to the expected reward q for executing option $\Phi_K^r$, if q>Q(a) (line 16).

The function FEASIBLE ($\Phi_K^r$, A) that determines the feasibility (True or False) of option $\Phi_K^r$ given the vector of attended-to units A is recursive (refer to Algorithm 8, FIG. 24H). If $\Phi_K^r$ is located in the bottom region r=1, its feasibility is determined in lines 1-2: The option is feasible, in case its corresponding unit $u_k^1$ is a motor unit (because the agent can activate it at will at any time), or the option is already attended to, or is predicted to be attended-to next. Otherwise, the option is currently considered to be infeasible.

In case $\Phi_K^r$ is located in a (non-bottom) region r>1, its feasibility is determined in lines 4-13 using the recursive calls to FEASIBLE( . . . ) in lower regions. To begin with (line 5), option $\Phi_K^r$ is immediately returned as infeasible if it does not constitute a continuation of the currently attended-to sequence in region r−1, that is, if unit $u_{src}^{r-1}$ is neither attended-to, nor it is connected (via a horizontal connection) to the currently attended-to unit in region r−1, for an existing vertical connection $u_{k|src \to dst}^{r-1}$. Otherwise, the feasibility of $\Phi_K^r$ is resolved by recursively resolving the feasibility of a sub-option $\Phi_{src}^{r-1}$ given A, and the feasibility of a sub-option $\Phi_{dst}^{r-1}$ given an imagined future state A' (determined in lines 8-12) that the f Net will find itself in once option $\Phi_{src}^{r-1}$ is completed.

To begin with, if unit $u_{src}^{r-1}$ is not yet attended-to and option $\Phi_{src}^{r-1}$ is infeasible (determined via a recursive call in line 6), so is option $\Phi_K^r$ and the algorithm returns False. Otherwise, when (the feasible option) $\Phi_{src}^{r-1}$ is additionally predicted by the f Net to be next followed by the completion of option $\Phi_{dst}^{r-1}$ (line 7), option $\Phi_K^r$ is considered to be feasible and the algorithm returns True. Finally, if option $\Phi_{dst}^{r-1}$ is currently not predicted to follow the execution of option $\Phi_{src}^{r-1}$, the algorithm can determine (recursively, in line 13) whether the option $\Phi_{dst}^{r-1}$ itself is feasible, from an imagined future f Net state A'. If yes, the algorithm considers $\Phi_K^r$ to also be feasible and returns True; otherwise it returns False. (Note, that the returned results of the FEASIBLE function calls can be cached and reused later for the computation of the feasibility of other options at the current decision step.)

The function UNPACK ($\Phi_K^r$, A, t) takes as input option $\Phi_K^r$, an f Net state A and an expected completion time t (relative) of an option and returns the remaining region 1 units that will be encountered when the option is pursued until its completion (refer to Algorithm 9, FIG. 24I). In case r=1 (lines 1-3), the function returns a singleton set comprised of a single tuple (k, t) (e.g., option $\Phi_K^r$ unpacked to unit $u_k^1$ at time t). Otherwise, the functions is called recursively for region r−1. Specifically, for a given vertical connection $v_{k|src \to dst}^r$, if the option $\Phi_K^r$, execution has advanced to the point where f Net unit $u_{src}^{r-1}$ is already attended-to (lines 5-6), then the function only may return the result of a recursive call to unpack option $\Phi_{dst}^{r-1}$, that is, the remainder of the region 1 units that $\Phi_K^r$ comprises of. On the other hand, the function may combine (lines 8-13) the results of unpacking option $\Phi_{src}^{r-1}$ (with the expected completion time t−l($v_{src \to dst}^{r-1}$)) with the results of unpacking option $\Phi_{dst}^{r-1}$ (with the expected completion time t, yet started in a future f Net state A' once $\Phi_{src}^{r-1}$ is completed).

Finally, the ROLLOUT-AFTER ($\Phi_K^r$,l) function (refer to Algorithm 10, FIG. 24J) returns the sum of rewards of an action policy rollout performed after option $\Phi_K^r$ is completed, at a relative time l. To this end, the function first can update (lines 1-15) the current f Net state A(R'), R'=1, 2 . . . , R, to reflect the completion of option $\Phi_K^r$. The update is done in two stages, for r'≥r and then for r'≤r. In the first stage (lines 2-10), r' is initialized to r, and the function moves the attention A(r') to dst (initialized to k); In case this movement follows a strong horizontal connection $v_{A(r') \to dst}^{r'}$ a corresponding vertical connection $v_{k'|A(r') \to dst}^{r'+1}$ exists, the attention A(r'−1) naturally move to $u_d^{r'+1}$st and the process will repeat in region (r'+1). Otherwise, the first stage terminates. In the second stage (lines 11-15), A(r') is updated to dst, upon which dst takes the value of j of the corresponding vertical connection $v_{dst|i \to j|}^{r'}$ and the process repeats, for r'=r, r−1, . . . , 1.

From the updated f Net state A(r'), =r', =1, 2, . . . , R the function then performs a policy rollout, exactly in the same way as in the selective-action policy search Algorithm 6 (see FIG. 24F). That is, upon calling PREDICT-ATTENTION-MOVES( ) to update the f Net predictions from the updated f Net state, the function performs a loop over decision epochs 1←1, 2, . . . , T∞ (lines 17-22); In each epoch t, it retrieves the predicted action $a^{(t)}$, enters it into the f Net (which automatically updates the f Net state and the next state predictions), then retrieves the predicted observation $o^{(t)}$ and again enters is into the f Net (which also automatically updates the f Net state and the next state predictions). The rewards for executing these actions and receiving the corresponding observations are then summed up and (optionally) discounted, before being returned by the function (in line 23).

Exhaustive Options List.

Finally, towards implementing the Exhaustive Options Policy Search (Section 3.3.4) the agent can establish the exhaustive list of options that are (at least in theory) applicable in the current f Net state (refer to Algorithm 11, FIG. 24K), and then simply proceed with the execution of Algorithm 7 (see FIG. 24G), from line 4 onward, while ensuring that the FEASIBLE( ) Algorithm does not call the instruction in line 5 (That is, when A[r−1]≠src and W($h_{A|r-1| \to src}^{r-1}$)=0, the option is not necessarily infeasible.)

3.5 Garbage Collector.

When the number of f Net units exceeds a user chosen threshold, the f Net garbage collector can be called, to reduce the number of f Net units to a desired level. The garbage collector itself can either be agnostic to the relative importance of units or take this importance into account, when choosing which units to remove, as explained next.

3.5.1 Unit Importance Agnostic Garbage Collector.

The garbage collector that is agnostic to the importance of units prioritizes units representing more complex patterns/longer sequences when choosing which units to remove. To this end, it starts removing units from the top-most regions first, prior to moving to lower regions. When a unit u is removed, all the horizontal and vertical connections involving this units are removed, and all the switches of the remaining units that were pointing at the unit to be removed may be reset. Unit u can then be safely removed from the f Net connectome, and the memory it occupied can be deallocated and recovered by the system hosting the CCE.

3.5.2 Unit Importance Aware Garbage Collector.

The garbage collector that takes the unit relative importance into account, when choosing which units to remove first, may compute the unit importance I(u), for each f Net unit u. In general, if u may not be activated while traversing any sequence that encounters non-zero rewards, then its importance is 0. Otherwise, I(u) is set to ActivationTime(u). The units are then sorted according to their increasing importance, and the garbage collector removes them one by one, starting with the least important units.

When a unit $u_k^r$ is being removed: (i) its vertical connection $v_{k|i \to j}^r$ is removed; (ii) its horizontal connections are removed; (iii) the units in region r+1, whose vertical connection is anchored at a horizontal connection to/from $u_k^r$, are marked to be removed next, and, (iv) all the switches of the remaining units, that were referring to the unit to be removed, can be reset. Unit $u_k^r$ can then be safely removed from the f Net connectome, and the memory it occupied can be deallocated and recovered by the system hosting the CCE. If the number of remaining units is below a desired level, the garbage collector stops.

4.0 Focusing Simulator

The focusing simulator module acts as a middle layer between the Domain Engine and the CCE execution agent and its f Nets. The module consists of individual focused simulators, referred to as f Sims, each wrapping one of the input signal modalities produced by the Domain Engine. Each f Sim, running asynchronously, is responsible for: (i) maintaining a compressed and focus-able, intermediate representation of that modality, (ii) updating this intermediate representation, if desired, whenever the Domain Engine produces the next frame in that modality, (iii) reporting to the CCE execution agent whenever the intermediate representation changes nearby the representation nodes currently in-focus, (iv) re-focusing the intermediate representation, whenever requested by the CCE execution agent, and finally, (v) sending to the Domain Engine any updates to the domain action currently executed.

Regarding (i): The f Sim intermediate representation derives from the original quad-tree data structure for compressed representation of images (recalled in Section 4.1). f Sim further extends it, by introducing the focusing head mechanism, that allows the f Sim to focus on selected nodes of the underlying tree. The mechanism is under full control of the CCE execution agent, who voluntarily issues asynchronous commands to shift the focusing head, when desired. Finally, the f Sim intermediate representation introduces the concept of oracle observations: They are the observations that correspond to the nodes of the underlying tree that are nearby the focusing head, and whose changes are perceptible to the CCE execution agent.

Regarding (ii): The CCE execution agent, the f Sim and the Domain Engine are all separate processes that operate according to their own internal clocks. In particular, the Domain Engine is assumed to operate at a rate specified by a given number of frames-per-second (FPS) that may fluctuate over time. The FPS number itself may range from being relatively small (e.g., less than 60, for visual modalities) to relatively high (e.g., over 8000, for auditory modalities). The f Sim is assumed to operate at a much higher rate, sufficiently high, to enable it to receive a new frame from the Domain Engine, and to encode it in its intermediate representation.

Regarding (iii): Of the changes to the f Sim internal representation made after receiving a new frame for the Domain Engine, only a selected few are assumed to be perceptible to the underlying agent, and consequently reported to the CCE execution agent. That is, the f Sim reports to CCE execution agent only the changes to the nodes (of the tree in its internal representation) that are currently nearby the node pointed-to by the focusing head. These are referred-to as the current oracle nodes and provide oracle observations to the CCE execution agent. The advantage of using oracle observations is, that the agent receives (from the f Sim) significantly more information (about the current frame) than contained only within the node pointed-to by the focusing head; Yet, as this extra information is already factored, it does not result in the agent over-fitting to the current intermediate representation of the current frame.

Regarding (iv): At any point in time, the CCE execution agent can request that the f Sim re-focus the current focusing head, by instructing the f Sim on where (in the intermediate representation) to move the focusing head. The focusing movement commands obey the physical limitations of f Sim, in that they incrementally follow the branches of the underlying f Sim intermediate representation of the current frame, versus allow for direct jumps to any node in the representation. Furthermore, each focusing command consumes a tiny amount of time Ef>0, that is assumed to be smaller than the 1/FPS, to allow for sufficient time to process the new frame information, generated for the modality at hand by the Domain Engine.

Regarding (v): Finally, the CCE execution agent may at any time request the f Sim to execute a given domain action (or, for a proprioceptive modality, request a change to the value of some node of the f Sim intermediate representation for that modality). This request, when received by the f Sim, is then passed along to the CCE Domain Engine, that in turn integrates the requested domain action when generating the next and the subsequent frames. The execution of the domain action lasts until the Domain Engine produces a frame, whose intermediate f Sim representation contains a perceptible change in at least one of the current oracle nodes. This change is then reported back to CCE execution agent, to close the action-observation agent loop.

In the remainder of this section, the f Sim architecture is first explained in detail. Next, it is shown on an example how an f Sim intermediate representation changes when executing an active sensing policy in a visual modality. Following that, it is demonstrated how f Sim tracks and encodes the changes in a modality that extends along a temporal dimension. Finally, it is explained how the underlying CCE execution agent actively employs f Sim to maintain its situational awareness about the agent's surroundings.

4.1 Architecture.

Each of the focusing simulator modules from FIG. 1 consists of a compressed, intermediate representation tree, a focusing head and the oracle nodes, as explained in this Section.

4.1.1 Quad-Tree Compression.

Figure 18:
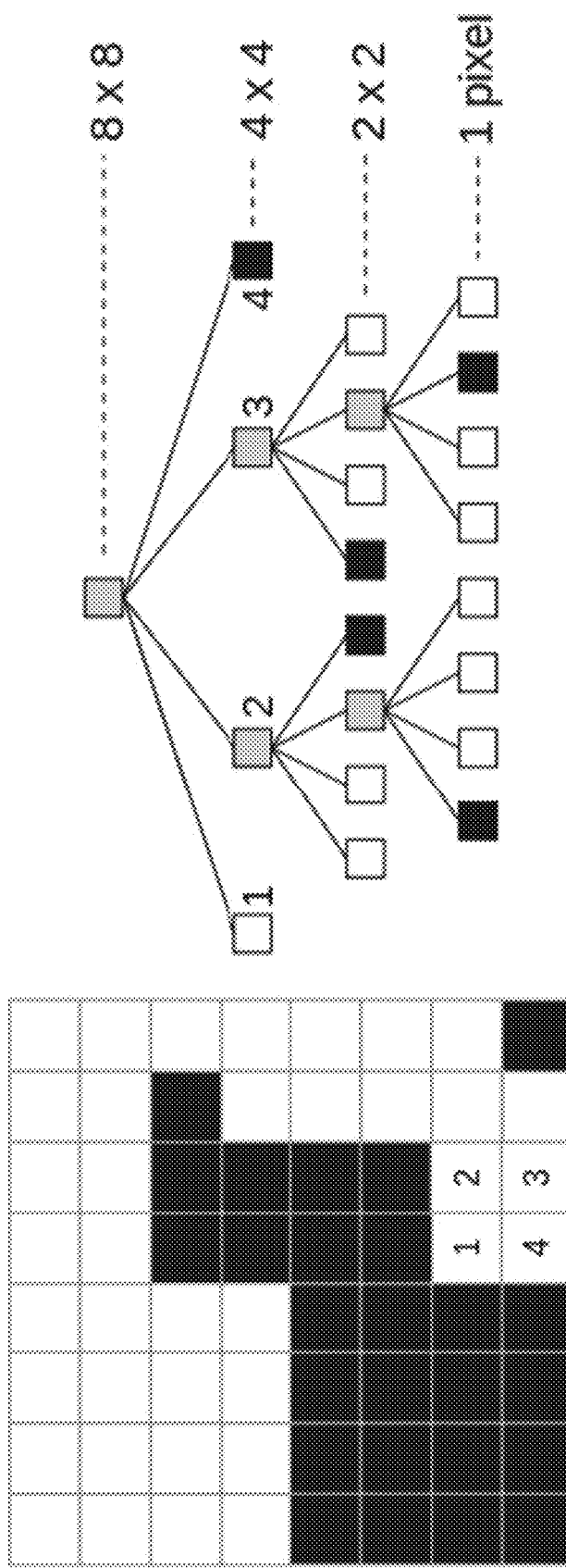
FIG. 18 illustrates a non-limiting example of a quad-tree compression of an image.

The architecture of f Sim derives from the quad-tree data structure for the compressed representation of images. In some cases, systems and methods described herein apply analogously to oct-tree and kd-tree data structures, with shared computational properties for CCE but different in computational behavior for various domains/dimensionality. The original quad-tree image compression method employs recursive partitioning of the image into four smaller sub-images such that the average shade in each sub-image is the average shade in its own sub-images. The recursive partitioning then terminates if this average shade is within a given error margin from the shade in each of the sub-images. For example, in FIG. 18, an 8×8 monochromatic image is compressed using the quad-tree method, with the original image depicted on the left-hand side and the corresponding quad-tree on the right hand side. The root node of the quad-tree corresponds to the entire field-of-view (8×8 pixels) and its value is the average of the values of its four children nodes, discretized into one of three buckets: white, gray and black. Children nodes of the root node cover a smaller field-of-view (4×4 pixels) and correspond to: (1) top-left, (2) top-right, (3) bottom-right and (4) bottom-left quadrants respectively. Nodes are considered to be the leaf-nodes if their further partitioning does not yield any new shade information: For example, the child node number 1 of the root node (shaded in white), if expanded, would have all its children nodes also shaded in white, hence its partitioning is terminated. In contrast, the child node number 3 of the root node (shaded in gray) needs to be expanded, because the shades of its children nodes are not uniformly gray. Consequently, the number of the leaf nodes of the quad-tree is 16 which is far smaller than the total number 64 of the pixels in the original image, resulting in a compression ratio of 4. Depending on the number of the discrete shade buckets that partition the underlying shade space, the ratio will then be smaller if the number of buckets increase, or bigger otherwise.

The quad-tree compression naturally extends to other types of modalities. For example, in the presence of multiple color channels, there can be multiple corresponding quad-trees, each compressing its assigned color channel into the shade values of that color. Or, the method can be adapted to either 1D or 3D image compression, by assuming either duo-trees or octa-trees respectively, where each a range in each dimension is split into exactly two sub-ranges. There may also be situations (e.g., when the robustness or the redundancy of the compressed data-structure is required) where one may want to split each dimension range into more than two sub-ranges, or when the sub-ranges partially overlap. Or, if the shade values of all the children nodes are all within a narrow sub-range, one may wish to first normalize these ranges to a bigger range and only then apply discretization, achieving a better relative (between the node children) shade discrimination, at the expense of a reduced absolute shade value accuracy. These, among others, are some of the possible extensions of the original quad-tree data structure, that are relatively easy to implement and experiment with.

4.1.2 f Sim Module.

The focusing simulator module derives from the original quad-tree compression method in that it also maintains a compressed, tree-like, representation of the underlying frame generated by the Domain Engine. (As this f Sim representation lies between the original, Domain Engine image representation, and the internal f Net representation, it is referred hereafter as intermediate representation.) Critically, though, the f Sim allows for an even better rate of compression, by presenting to the CCE execution agent (and the underlying CCE f Nets) only selected parts of its intermediate representation: Parts that are likely to be relevant to the policy that the CCE agent is pursuing.

Figure 19:
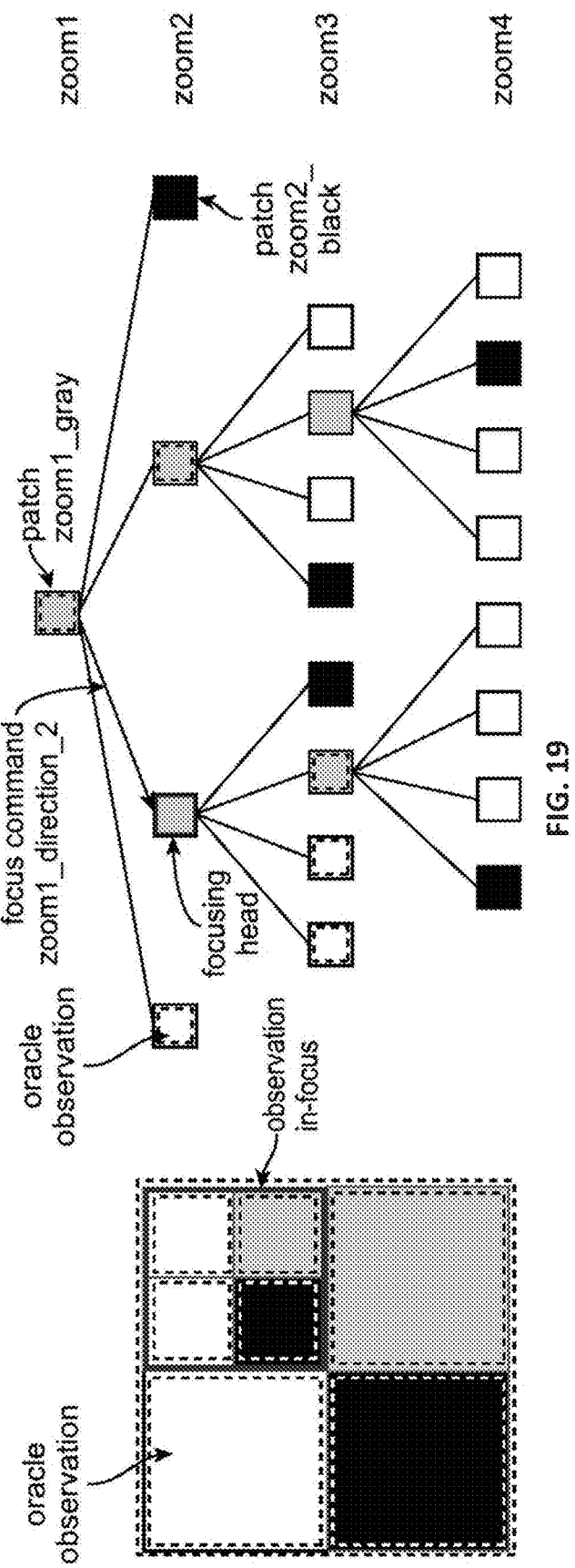
FIG. 19 illustrates a non-limiting example of a focusing simulator.

In order for the f Sim to accomplish that, the f Sim employs the concepts of a focusing head and the oracle observations, as illustrated in FIG. 19. In essence, the f Sim allows the CCE agent to control the f Sim focusing head, towards probing the f Sim intermediate representation (of a Domain Engine frame) only in the parts, that the CCE agent considers important, for the execution of the current CCE agent policy. For example, in the intermediate representation in FIG. 19, the CCE agent has just issued a command to f Sim, to move the f Sim focusing head from the root node at zoom level 1 along the direction number 2, towards revealing the contents of the top-right quadrant of the original image. Once this move of the f Sim focusing head (the solid red square) is completed, the f Sim will report back to the CCE agent the current contents of its intermediate representation node, that the focusing head points-at ('patch-zoom2-gray'). Furthermore, the f Sim will also inform the CCE agent about the current contents of its intermediate representation oracle nodes (surrounded by the dashed red squares), wherein said oracle nodes are essentially the immediate destinations where the focusing head can move-to next. As such, the CCE agent receives from the f Sim the information about the shade of only 9 out of 21 total f Sim intermediate representation nodes, resulting in a further 2.33 compression ratio (or 8.66 in total) of the original image. The downside for the CCE agent is, that for instance, it does not quite know (yet) what is the precise content of the bottom right (8×8 pixels wide) quadrant of the original image, other than that there is something in that quadrant (because of the oracle observation 'patch-zoom2-gray' at that node). Critically though, for a given policy that the CCE agent is currently pursuing, the precise contents of that quadrant may not end up being relevant at all, resulting in notable benefits (less f Net memory to store the image; less time to probe the other parts of the image; less risk for the CCE agent policy to overfit to irrelevant observations). Otherwise, the CCE agent may command the f Sim to perform a sequence of its focusing head movements, referred hereafter as a focusing policy. How to accomplish that, for different types of f Sim modalities, is as explained next.

4.2 Modalities.

This subsection demonstrates the f Sim focusing policies on spatial modalities, temporal modalities and the most general, temporal graph modalities.

4.2.1 Spatial Modalities.

It is first demonstrated how f Sim focusing policies work on modalities with spatial dimensions, but without temporal dimensions. Examples of such modalities are 1D images (e.g., representing real-values between 0 and 1), 2D images (e.g., representing photos) or 3D images (e.g., representing depth maps). f Sims handle such spatial modalities in exactly the same way, employing the intermediate (quad-tree like) representations, attention heads and oracle nodes, as explained in Section 4.1.2. The only differences are in the f Sim parameters, that prescribe: (i) The number of quadrants used, for each dimension; (ii) The relative quadrant overlap; (iii) The chosen number of buckets that shade values will be discretized into, and (iv) Whether to normalize the values of the shades for the children of each node in the intermediate representation.

These parameters are best illustrated on an example. Recall the intermediate representation in FIG. 19, corresponding to an 8×8 pixels, monochromatic visual modality. Here, the intermediate representation considers only two quadrants per dimension used, with a 0% relative quadrant overlap, resulting in exactly four children nodes of each node in the intermediate representation. Towards more efficient recognition of shapes on the boundaries between the quadrants, one could alternatively consider three quadrants per dimension, with a 50% relative quadrant overlap, resulting in exactly nine children nodes of each node in the intermediate representation. Or, one could consider four quadrants per dimension, with no quadrant overlap, towards a shallower intermediate representation tree (with only three zoom levels), albeit a higher tree branching factor, resulting in each focusing action revealing information covering relatively smaller fields-of-view.

The number of buckets that shade values are discretized into is also an f Sim parameter that may be carefully chosen: Greater number of buckets naturally translates into higher node shade accuracy, resulting in more accurate shade information being sent back to the CCE agent. However, this also potentially results in over-fitting the CCE agent policy to too-fine shade variations, impacting negatively the generalizability of said policy. Smaller number of buckets (e.g., three in FIG. 19) could in some instances be preferable, since the agent can always instruct the f Sim to zoom in on smaller sub-images, down to the individual pixels, to reveal their absolute shade (and encode it with a dithering pattern), albeit at a cost of longer focusing policies. Striking the right balance between the focusing policy generalizability versus its length (by varying the number of discretization buckets) is therefore critical for the optimal performance of an f Sim.

Finally, the design of an f Sim can employ a normalization of node shades, to increase the relative contrast between the shades of node children. This can be accomplished at agent run-time, by computing the current range of the shade values of all the children nodes, and then discretizing this (narrow) range into the chosen (small) number of buckets. The individual shades are then normalized by being projected into that narrow, discretized range. In addition to this technique allowing the f Sim to encode the finest details in the relative shades of the nodes, it permits for an encoding of an image that preserves the color constancy: The tendency of objects to be perceived (by a human observer) in the same color, even under changing illumination.

Focusing Policy for a Spatial Modality.

The CCE agent encoding of (the f Sim intermediate representation of) an object in a spatial modality is therefore a directed graph (with cycles), whose vertices are the discretized shade values (of the nodes of the f Sim intermediate representation) coupled with their corresponding zoom levels, whereas the graph edges are the focusing head commands that have been issued to transition to these nodes. To illustrate that on an example, consider a focusing policy from FIGS. 20A-20D. Here (refer to the first tree), the focusing head has initially been issued (by a CCE agent) a 'focuszoom1' command, resulting in it moving to the root node (in the intermediate representation tree) and observing a shade 'patch-zoom1-gray' that most accurately describes the shade in the entire 8×8 pixels field-of-view of the original image. At the point, the f Sim sends back to the CCE agent this shade 'patch-zoom1-gray', as well as the shades of the current oracle nodes (marked with the red, dashed boxes), that are the possible nodes that the focusing head can move next. Thanks to the this auxiliary information from the oracle nodes, the CCE current perception of the image (images to the left of the f Sim intermediate representations) is much richer, in that covers the entire field-of-view but also reveals some of the details of the shades in each of the zoom level 2 quadrants.

Figure 20B:
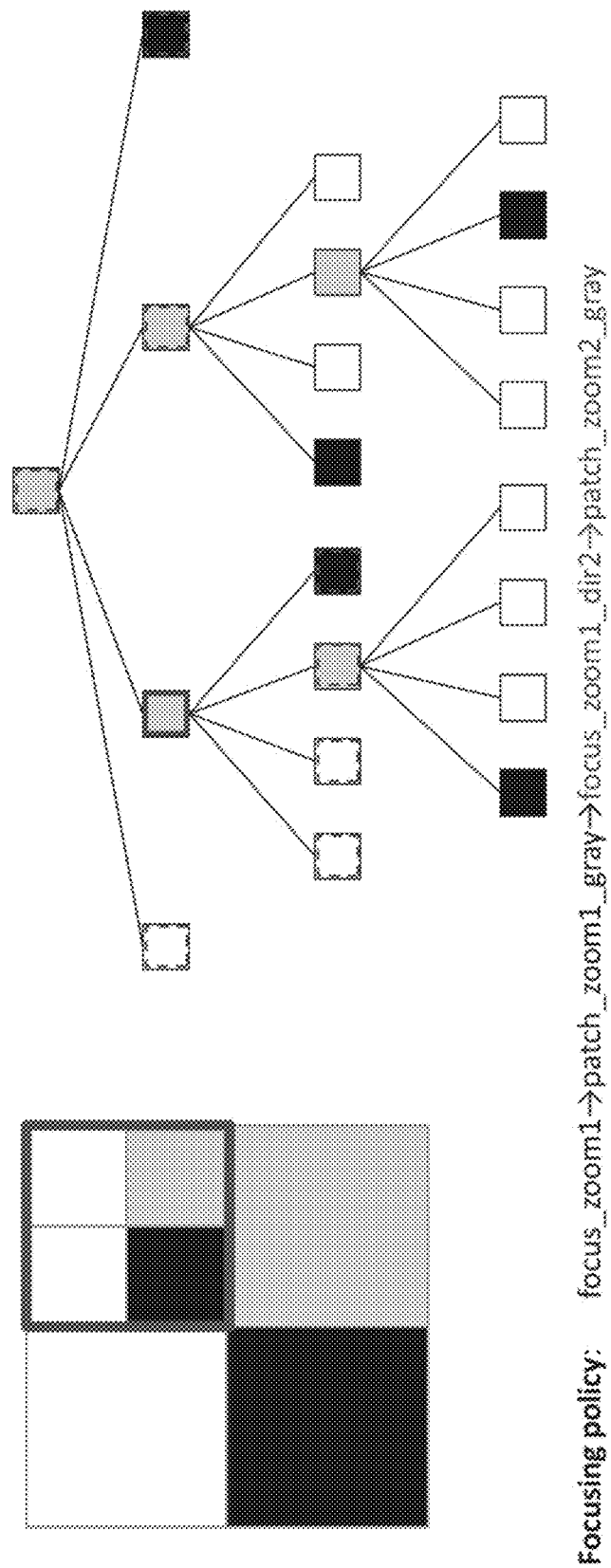

The second tree in FIG. 20B is an intermediate f Sim representation after the focusing head has been commanded to move from zoom level 1, along the direction 2, to zoom level 2 (denoted as 'focus-zoom1-dir2'). The focusing head now points at the node whose shade is 'patch-zoom-2-gray', as depicted, whereas the oracle nodes reveal 7 extra (oracle) observations, from zoom levels 1, 2 and 3 in the intermediate representation tree. These are all passed to the CCE agent, whose current perception of the image (visualized to the left of the tree) contains the shade patch 'patch-zoom2-gray' that the focusing head is pointing-at, a low resolution peripheral vision (at zoom 1, along directions 1, 3, 4) of the outside of the focusing head red box, as well as a higher resolution vision of the inner visual patches, attained if the focusing head were to execute the zoom-in commands from its current position. Crucially, the CCE agent not only learns (and stores it in its f Nets) the (attended-to) sequence of its executed focusing head commands and focusing head observations, but also (inattentively) updates the switches of its existing f Net units, to save the most recent oracle observations, in context of the current position of its focusing head. What this allows the CCE agent for, is being persistently aware of these oracle observations, even after they are no longer perceivable.

Figure 20C:
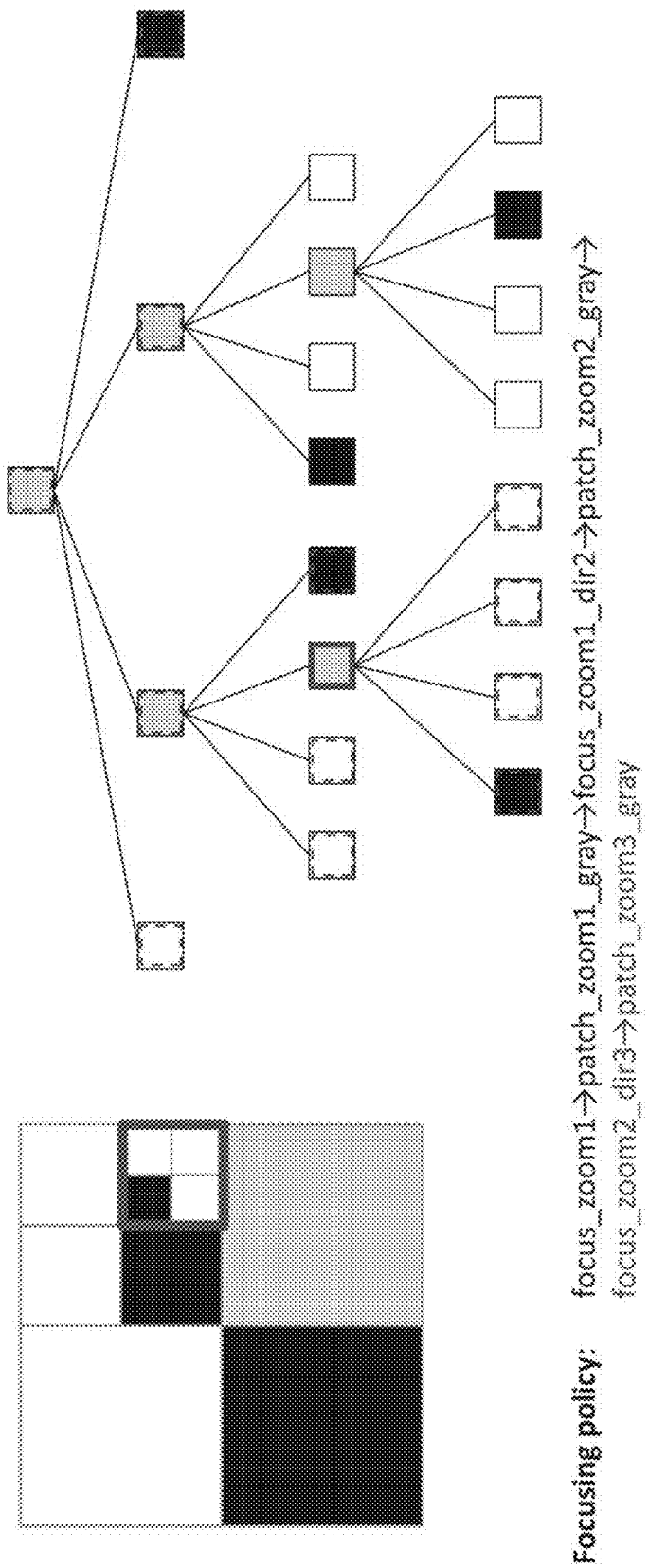

The third tree in FIG. 20C is an intermediate f Sim representation after the focusing head has been commanded to move from its previous node, at zoom level 2, along the direction 3, to zoom level 3 (denoted as 'focus-zoom2-dir3'). The focusing head now points at the node whose shade is 'patch-zoom3-gray', as depicted, whereas the oracle nodes reveal 12 extra (oracle) observations, from zoom levels 1, 2, 3 and 4 in the intermediate representation tree. These are all again passed to the CCE agent, whose current perception of the image is shown to the left of the f Sim intermediate representation tree. In particular, notice how the CCE agent now accurately perceives the pixel-level information about the shades of the original image, albeit in a narrow 2×2 field of view. And despite it focusing on such narrow field-of-view, the CCE agent also does perceive the (oracle) observations, in zoom levels 1, 2 and 3 of its peripheral vision.

Figure 20D:
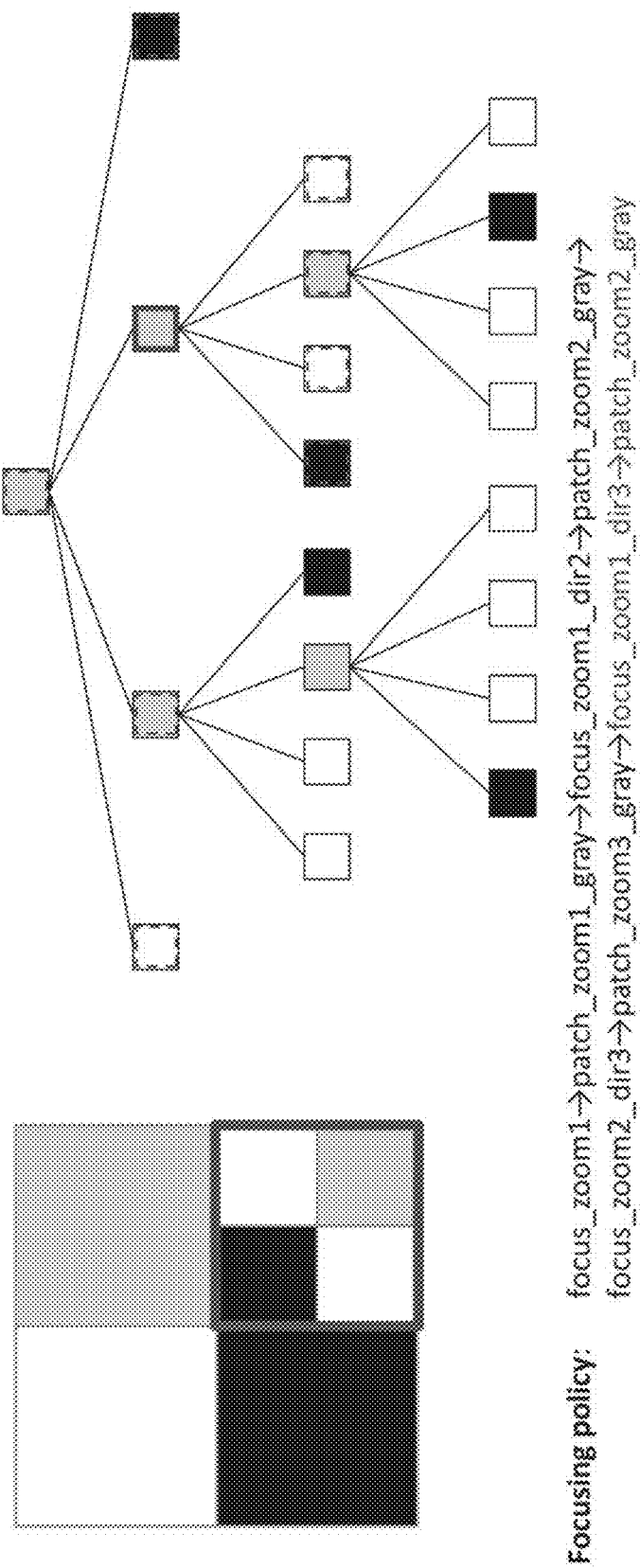

Finally, the fourth tree in FIG. 20D depicts the intermediate f Sim representation after the focusing head has been commanded to zoom-out to zoom level 1 and move its focusing head along direction 3 (denoted as 'focus-zoom1-dir3'). Notice, how the detailed content of quadrant 2 in zoom level 2 have disappeared, since the focusing head it no longer pointing at this direction. Instead, more details are now revealed in quadrant 3 at zoom level 2, which is where the focusing head has moved to, and from where the new oracle observations are provided to the CCE agent. At this point, the CCE agent can continue its focusing policy, to gather more information about the image, or decide to undertake some other tasks, if the gathered information is predicted to be sufficient for the successful execution of said task.

Figure 21A:
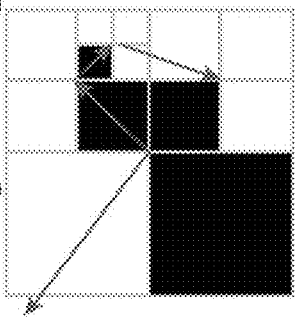
FIGS. 21A-21B illustrate a non-limiting example of focusing policy and image awareness of the CCE agent (top) and a saccadic policy and the image awareness in human vision (bottom)
Figure 21B:
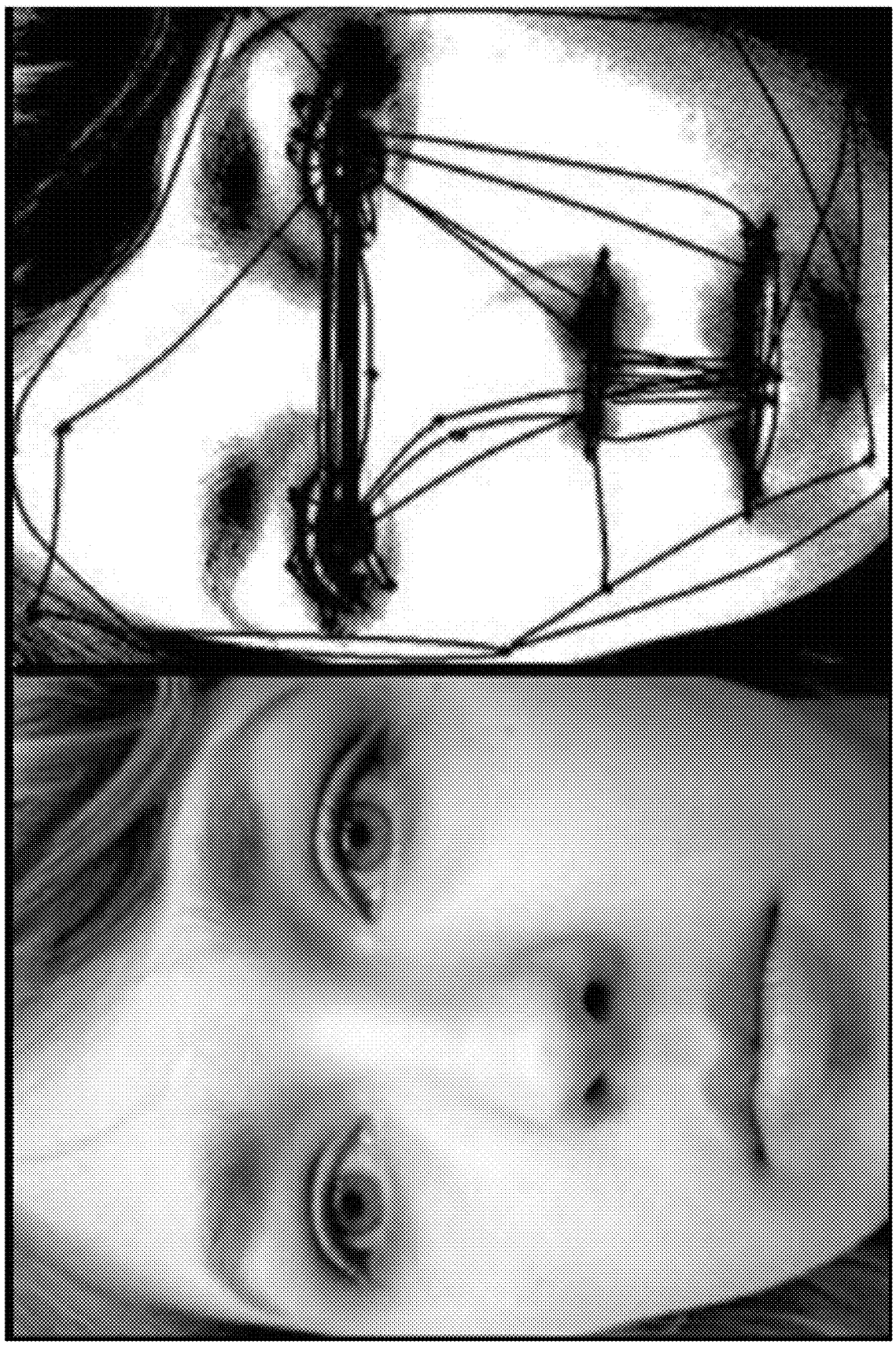

FIGS. 21A-21B summarize the focusing policy that has been executed by the CCE agent. As can be seen, it consists of just four focusing head movement commands, each followed by a corresponding observation of the shade of a patch at a given zoom level. Notice, how the representation allows for the object translation invariance (similarly to a convolutional ANNs): From a certain node in the intermediate representation, all the subsequent sequences (of visual patches and focusing head commands that together identify an object) are invariant of the exact path from that node to the root node in the intermediate representation tree. Critically though, (and unlike in convolutional ANNs) these subsequent sequences are observed (and saved) in context of past sequences (e.g., encoding the relative position of the object with respect to other object), ensuring that the object recognition is contextual, versus detached from any context (as done by individual filters of a CNN). Moreover, the CCE agent representation is likely more resilient to adversarial perturbation of individual pixels, for the f Sim intermediate representation progressively filters out the noise (or adversarial pixel perturbations) the closer the focusing head is to the root node of the tree (and where it is more likely to be in the first place). Also, notice that (unlike in convolutional ANNs), the f Sim intermediate representation is essentially image resolution invariant and thus future-proof: It allows for the underlying Domain Engine to be upgraded over time, producing higher-resolution images, without the necessity to retrain the underlying CCE agent. (All that the CCE Agent would then have to do, is to allow the f Sim to start focusing on the previously inaccessible, deeper nodes in its intermediate representation.)

The actual focusing policy of the CCE agent is therefore quite compact. Yet, the CCE agent accumulated image representation is much richer, as shown in the left image in FIG. 21A. When all the information for the oracle observations is factored-in (note, that this information is stored in the CCE agent f Nets, in the form of 17 oracle observation sequences that have been registered by the underlying f Nets), the CCE agent accumulated image representation is remarkably close to the original image generated by the Domain Engine. And while the CCE agent does not perceive all these observations at the same time, it is aware of them, at all times, because it can always choose to internally predict the continuation of these recently observation sequences, thus imagining the finer details of the image that are no longer perceptible. An intriguing comparison can then be made between the focusing policy and the image awareness of the CCE agent, and the saccadic policy and the image awareness observed in human vision: In FIG. 21B, the registered saccadic movements of a human eye (when looking at the image of someone's face) only allow for a very selective, high-resolution probing of the underlying image parts. Yet, the accumulated saccadic information, combined with human ability to imagine the (no longer perceived) parts of the visual scene, gives an internal impression that the image is perceived in high resolution, at all times.

In summary, the CCE agent representation of spatial modalities is therefore a directed graph, whose edges are the f Sim focusing head movements whereas the vertices are the perceived visual patches. And the goal of a CCE agent focusing policy is to recognize the objects by efficiently traversing only the relevant (for a given task) parts of that graph. Such traversals are meant to reveal the visual patches that, together the underlying focusing head movement commands, from f Sim observation sequences that have already been learned by the underlying f Nets, and are predicted to lead to positive rewards, accrued for the completion of the underlying domain tasks.

4.2.2 Temporal Modalities.

In real-world domains, the actions that the agents execute, including the f Sim focusing head commands, do consume time. As such, any domain modality that the CCE agent perceives is unequivocally extended along the temporal dimension. This section demonstrates how such temporal dimension extension is handled by the CCE.

The main difference in the CCE handling of the temporarily extended modalities is that some parts of the f Sim intermediate representation of a given modality (the shades of the nodes within these parts) may get changed over time, when the Domain Engine generates a new frame for that modality. Most of these changes are likely to by unnoticed by the CCE agent, who at any given time sees (via the oracle observations) only a tiny part of the f Sim intermediate representation tree. However, when the f Sim focusing head is nearby these changed nodes, the CCE agent will perceive the changes of the shades in the underlying oracle observations, potentially causing it to interrupt the execution of its current policy. At that point, the agent will voluntarily choose which node (of those, whose shade change has been perceived by the agent) of the f Sim intermediate representation to focus on next, by commanding the f Sim focusing head to move towards it.

Remarkably, such handling of a temporally extended modality is also encoded as a directed graph (whose edges are the focusing head commands, whereas the vertices are the patches of frames from the temporal modality), nearly identical to the CCE agent encoding of a spatial modality. And likewise, with a given task in mind, the recognition of a pattern in such temporal modality consists of traversing a correct path (sequence of observations) in that graph, to reveal sufficient information for the task at hand. This nearly homogeneous CCE agent encoding of the heterogeneous spatial and temporal modalities is what allows the agent to seamlessly fuse its policies in these modalities: It permits the agent to effectively merge the underlying directed graphs and store it efficiently (in f Nets) as just one policy graph. And then to follow this joined policy graph, when issuing concurrently the commands to the focusing heads of the corresponding f Sim modalities.

Focusing Policy for a Temporal Modality.

Figure 22A:
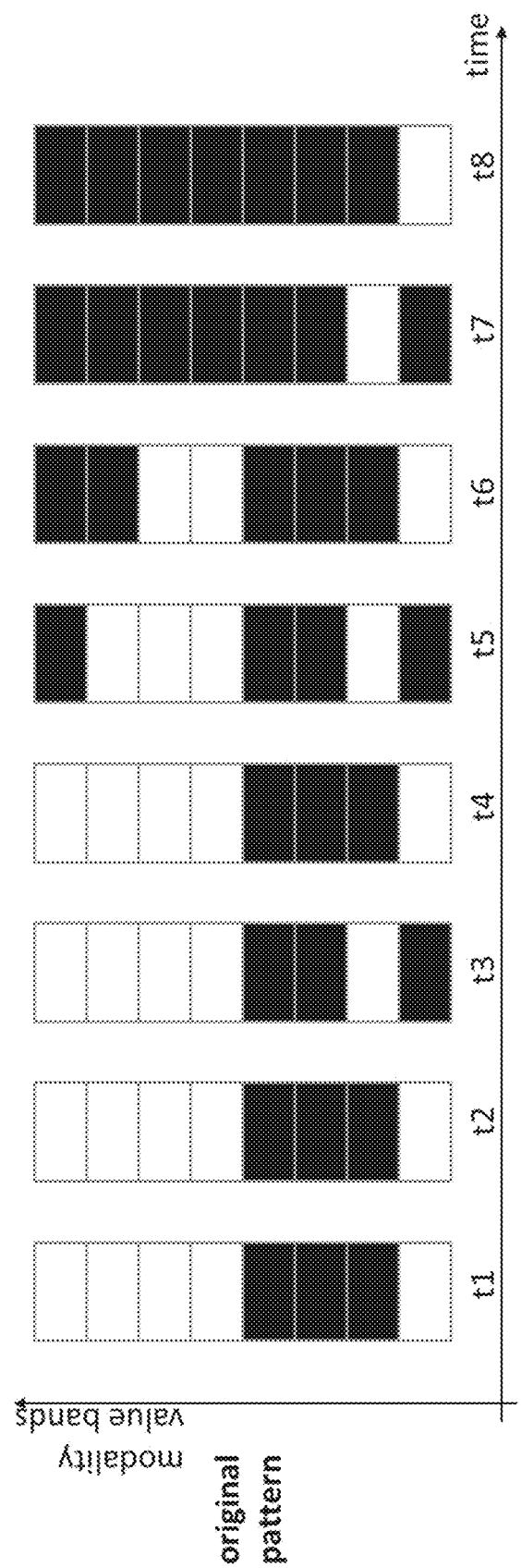
FIGS. 22A-22E illustrate a non-limiting example of a focusing simulator in a temporal modality.

To illustrate a focusing simulator and a focusing policy for a temporal modality, refer to the example in FIGS. 22A-22E. The first illustration in the FIG. 22A depicts the original pattern that evolves over time (sampled on the x-axis). At any point in time, the pattern itself is a 1d monochromatic image that consists of 8 non-overlapping value bands (e.g., a simplified spectrogram with 8 frequency bands). The intermediate representation tree of the f Sim assigned to handle that modality has a branching factor of 2, meaning that the image can be split into two non-overlapping parts, each of which can itself be split into two non-overlapping parts etc. Thus, the f Sim focusing head can move from a given zoom level either up, or down, denoted as 'focus-z2-d1' and 'focus-z2-d2' respectively, for zoom level 2. The shade patterns of the intermediate representation nodes here a more complex (than a single shade) in that they consist of the top and bottom parts, e.g., 'patch-z1-wg' corresponds to white (w) top part and gray (g) bottom part, at zoom level 1, whereas 'patch-z3-bw' corresponds to black (b) top part and white (w) bottom part, at zoom level 3 etc. The goal of the CCE agent is to learn to recognize that spatio-temporal pattern.

Figure 22B:
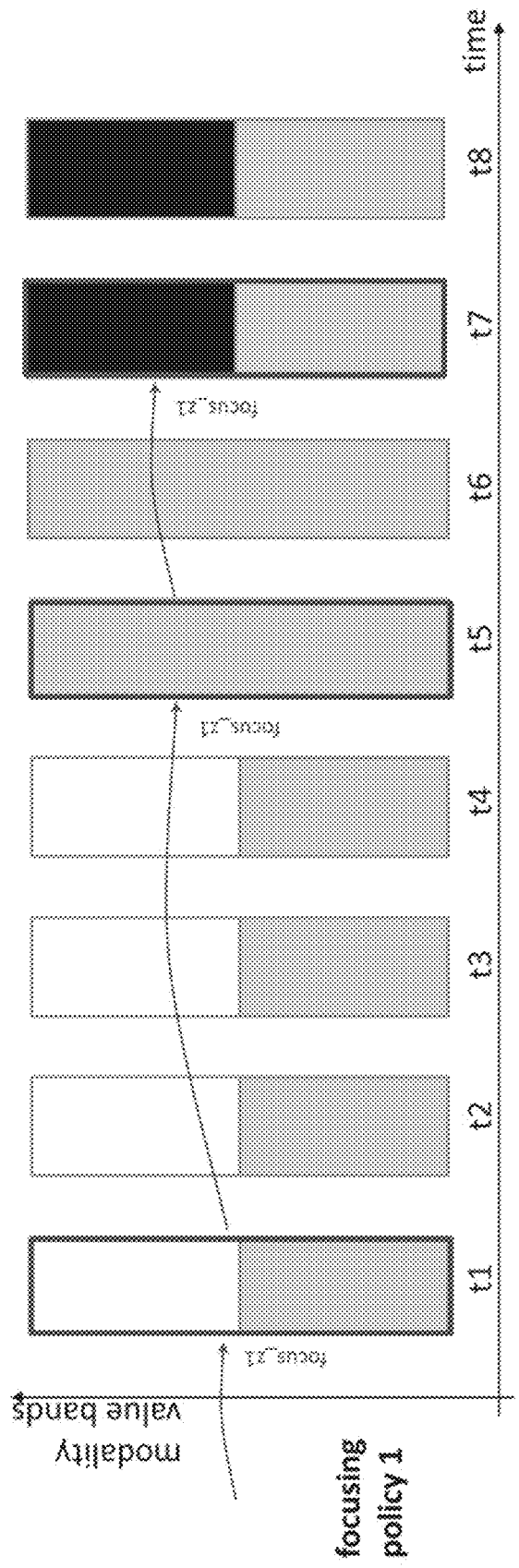

The second illustration in FIG. 22B shows the 1st example focusing policy of the CCE agent. The policy is on an extreme, as it does not involve any focusing head movements to zoom levels greater than 1, and is therefore likely to be among the first executed by the CCE agent. Specifically, the agent first (before time $t_1$) commands the focusing head to focus on zoom level 1 ('focus-z1' command), to observe the entire field of view (8×1 pixels), albeit at a low resolution. The shade pattern of the node that the focusing head is pointing-at is 'patch-z1-wg', and as can be seen in FIG. 22, this pattern is unchanged during time snapshots $t_1$, $t_2$, $t_3$, $t_4$. (For clarity of the illustration, the oracle observations from the children nodes of the currently pointed-at node are now shown.) During these times, the CCE agent may appear idle to an outside observer; Yet, finally not distracted by the perceivable observations, the CCE agent can effectively engage in other activities, e.g., related to its computationally expensive, model-based policy search. This lasts until time $t_5$, when the Domain Engine generates a frame that finally results in a change of the shade pattern (in the root node of the f Sim intermediate representation tree) from 'patch-z1-wg' to 'patch-z1-gg'. This is immediately noticed by the CCE agent, who reissues the command 'focus-z1' and receives from f Sim the underlying pattern 'patch-z1-gg'. The agent perception of the current pattern then, similarly, does not change until time $t_7$, when a substantially different, new frame from the Domain Engine forces the agent to reissue the command 'focus-z1' and observe the underlying pattern 'patch-z1-bg'. Finally, the subtle change in this pattern, at time $t_8$, is imperceptible to the agent, despite it likely being registered in some more distant (from the root) nodes of the f Sim intermediate representation tree. In summary: The focusing policy 1 of the agent consists of just three focusing head actions, and is therefore the most coarse-grained (on the temporal scale). And although it does encode some of the most pronounced features of the original spatio-temporal pattern (perceivable even at zoom level 1), and will likely generalize well to other settings, some tasks may require it to be further specialized.

Figure 22C:
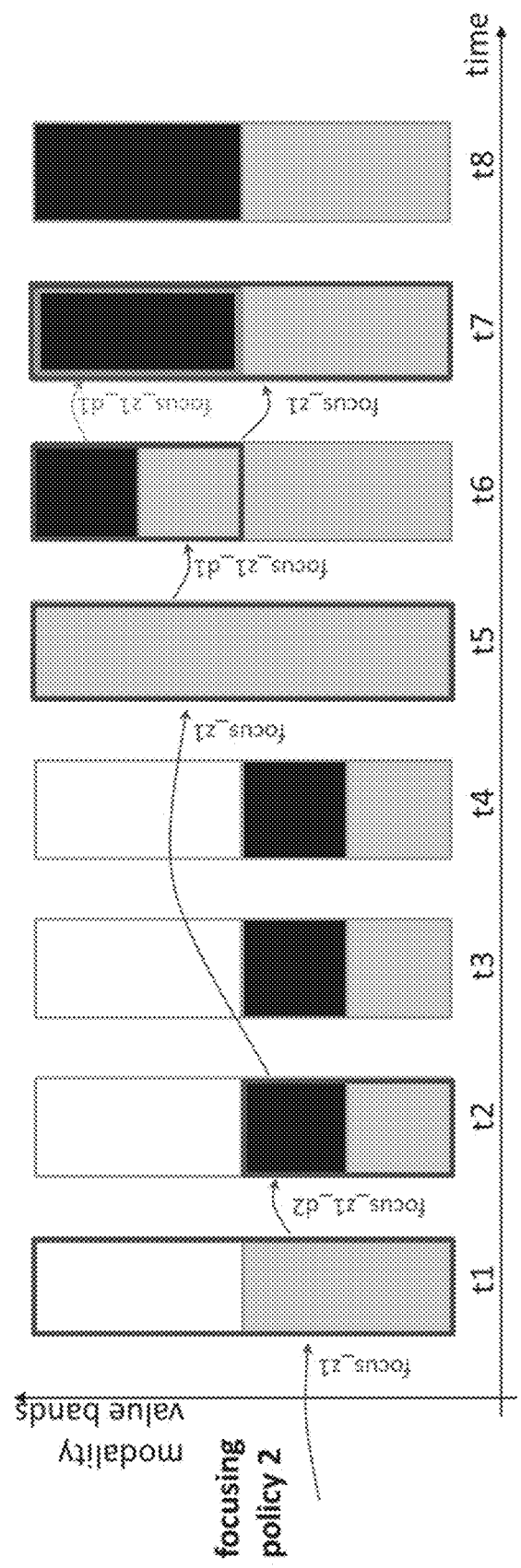

One such policy specialization is shown in the focusing policy 2 in FIG. 22C. Herein, the agent similarly (as in the focusing policy 1) has initially issued to f Sim the 'focus-z1' command and received observation 'patch-z1-wg' at time $t_1$. But unlike in policy 1, rather than idling until 15, the agent (knowing that the bottom part of the image is neither uniformly white nor black, and thus can contain some non-uniform pattern, yet to be revealed) has chosen to issue the 'focus-z1-d2' command, and learned from the corresponding observation (received from f Sim) that the bottom part of the original image contains the 'patch-z2-bg' pattern. Notice, how this pattern does not change in all the subsequent time snapshots, and will therefore not distract the agent. However, one of the f Sim current oracle nodes, corresponding to the root node of the intermediate representation tree, will change its value, from 'patch-z1-wg' to 'patch-z1-gg' at time $t_5$. As such, the agent will get distracted by it, and forcibly issue the 'focus-z1' command and observe the underlying pattern 'patch-z1-gg'. At this point, the agent could (as in policy 1) choose to stay idle until time $t_1$ which is when the 'patch-z1-gg' pattern changes into 'patch-z1-bg'. But instead, knowing that there is something to be revealed in both the top and the bottom parts of the image (which are gray in the 'patch-z1-gg' pattern), it has decided to issue command 'zoom-z1-d1', to focus on that top part, and receive the pattern 'patch-z2-bg', at time $t_6$. Soon after, the agent gets 'double' distracted: Not only has the 'patch-z2-bg' pattern (in the node that the f Sim focusing head is pointing-at) changed to 'patch-z2-bb' (blue box), but the pattern 'patch-z1-gg' (the oracle observation corresponding to the root node in the intermediate representation tree) simultaneously changed to 'patch-z1-bg' (red box). As can be seen in the FIG. 22C, in this instance, the agent has opted to focus on the latter observation (red box), and then stay idle at time to. In summary: The focusing policy 2 of the agent consists of five focusing head actions, three of which match the actions from policy 1, with the remaining two providing the agent with extra details about the original spatio-temporal pattern. Notice though, that in order to gather this extra information, the agent was required to reduce its idling time from 5 to 3 time ticks, resulting in less available time it could e.g., allot to perform model based policy search.

Figure 22D:
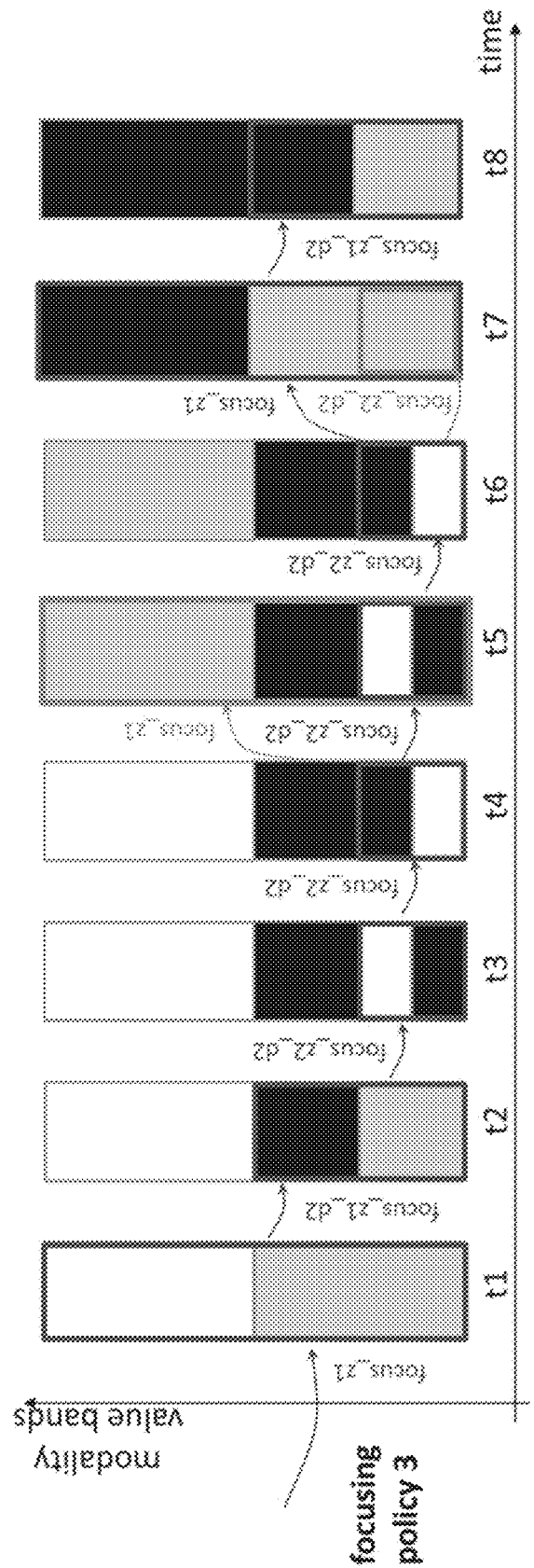

Finally, at the opposite extreme, the agent can opt to use all its idle time for a spatio-temporal pattern recognition, as illustrated in the focusing policy 3 in FIG. 22D. In time ticks $t_1$ and $t_2$ the policy matches policy 2. Yet, instead of idling at time $t_3$, the agent opts to fully disambiguate the shade pattern 'patch-z2-bg' in the bottom part of the image, by issuing a 'focus-z2-d2' command, to receive the underlying pattern 'patch-z3-wb'. As the shade pattern at the node that the focusing head is now pointing-at keeps fluctuating (between 'patch-z3-wb' and 'patch-z3-bw') in the subsequent time ticks, the agent is busy trying to track it, repeatedly issuing the 'focus-z2-d2' command to the f Sim. In fact, the agent is so pre-occupied with trying to track these tiny fluctuations, that it opts to ignore at time $t_5$ the change in the oracle observation (from 'patch-z1-wg' to 'patch-z1-gg') at the root node of the intermediate representation tree. Yet, at time$_7$, the agent finally gives-in to the urge to explore the significant change in the shade in the oracle node at the root node of the tree, by issuing a 'focus-z1' command and receiving observation 'patch-z1-bg'. Having done so, the agent then opts to waste no time being idle, but to immediately (in time $t_8$) re-focus on the bottom part of the image, by issuing a 'focus-z1-d2' command and receiving observation 'patch-z2-bg'. In summary: The focusing policy 3 of the agent consists of 8 focusing head actions, involving all possible zoom levels, and using all 8 available time ticks for tracking the underlying spatio-temporal pattern. A visual inspection of the accumulated visual representation over time (that involves all the oracle observations received) reveals, that it does resemble in parts the original spatio-temporal pattern, while also offering some degree of generalizability.

Most importantly though, the goal of the CCE agent focusing policy is not to reveal all the most frequent features of the original spatio-temporal pattern. Unlike in ANN agents, that ingest all these features indiscriminately, a CCE agent focusing policy aims to reveal only the features, that are relevant for a given domain task at hand. And therefore, given different domain tasks, the CCE agent will most likely employ different focusing strategies, each time revealing slightly different parts of the original spatio-temporal pattern.

Figure 22E:
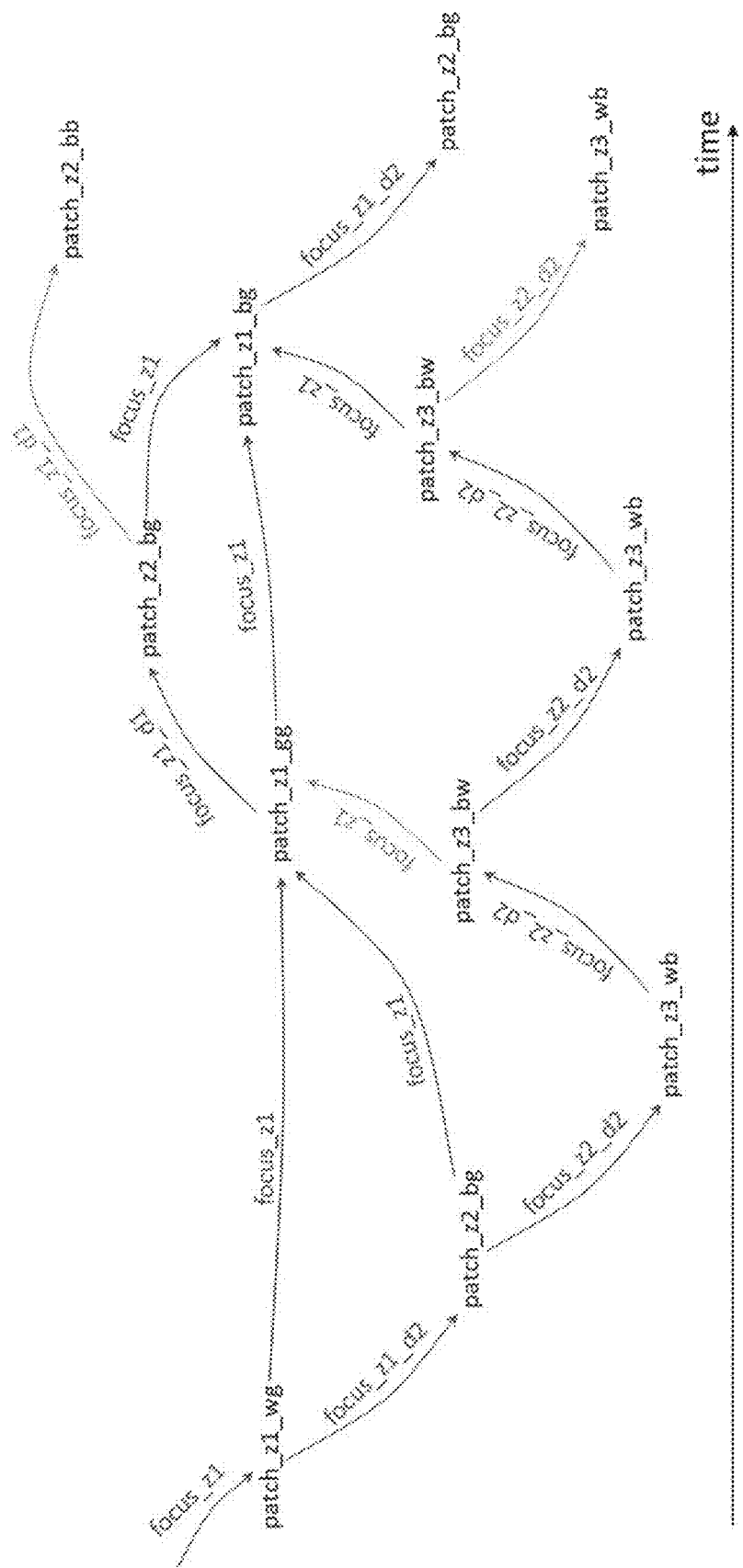

Consider the graph at the bottom in FIG. 22E, that aggregates the focusing policies 1, 2, 3. Here, the red edges represent the focusing head commands that have been issued, whereas the blue edges represent the alternative focusing head commands that could have, but have not been issued. The nodes of the graph represent the shade patterns that have been observed by the focusing head upon executing a focusing head command. The graph itself represents the learned-so-far, CCE agent representation of the original spatio-temporal pattern. (The actual graph is stored in a compressed form in the fractal networks of the underlying CCE agent.) And depending on the domain task at hand, the agent will plan for an optimal traversal of that graph, to gather in as little effort as possible, all the relevant observations for a successful completion of the task. Along the way, the agent will perceive many auxiliary observations, provided to it via the oracle observations, giving it an impression of perceiving more observations that it is focusing on. It furthermore will constantly perform its sequence continuation predictions, along the paths that hypothetically branch out for its main focusing policy path, further boosting its awareness of what is going on in the parts of the pattern that are currently out-of-focus. Finally, when following a main path, it will preemptively prepare itself for this main path interruption or policy detours, to be able to seamlessly resume tracking that main path in the future. For example, upon performing 'focus-z1' and encountering 'patch-z1-wg', it (the agent f Net) will prepare itself for encountering 'patch-z1-wg' once the 'focus-z1' command is issued again (on the main path). Should it then encounter policy detours, starting along the 'focus-z1-d1' edge, it will still be able to reconnect the parts of the main path, once it eventually perceives 'patch-z1-gg' as one of its oracle observations.

4.2.3 Graph Modalities.

It has so far been shown how the CCE agent can track the progression of the spatio-temporal patterns, through interfacing with the intermediate representation trees of the corresponding f Sims. This section outlines an extension of this method, towards allowing the CCE agent to track the temporal progression of modalities represented as directed, acyclic graphs. The extension is motivated by the desire to allow CCE to be applied efficiently to dynamic networks domain, as well by demonstrating how CCE f Sims can handle somatosensory and proprioceptive modalities of the underlying AGI agents.

In general, a temporal graph modality is represented by a directed, acyclic graph G (V', E) where V is the set of graph vertices and E is a set of graph edges. The set V contains a source node $v_s \in V_s \subset V$, that only has outgoing edges, multiple intermediate vertices, that have both incoming and outgoing edges, and multiple sink nodes $v_t \in V_t \subset V$, that only have incoming edges. Without the loss of generality, assume that $|V_s|=1$, because in the presence of multiple source nodes, one can always construct a corresponding graph $G'=(V', E')$; $V'=V \cup \{v'_s\}$; $E'=E \cup \{(v's, V_s):v_s \in V_s\}$ with just a single source node $v'_s$. Each vertex $v_t \in V_t$ maps to a unique sensor, whose real value $c(v_t) \in [0, 1]$ can change over time. The role an intermediate vertex v is to aggregate the sensory values from the vertices v': (v, v')∈E, and pass-on this value to the vertices (v", v)∈E.

As proposed in Section 4.2.1, the shade aggregation function c(v) of vertex v can be defined as the averaged sum over all the shades c(v') of vertices v': (v, v')∈E, discretized into K predefined bucket ranges. Alternatively, to encode the subtle, relative shade differences c(v') of vertices v': (v, v')∈E, values c(v') can first be normalized (by projecting them onto the range [0, 1]), and only then summed, averaged, and discretized into K predefined bucket ranges. And as proposed in Section 4.2.2, instead of a single shade of a vertex, vertex v can maintain a more complex shade pattern, which is a vector of the single shades of the vertices v': (v, v')∈E. Or, in the most general setting, one can use the K-mean algorithm to determine the set of centroids that best approximate the space of the past observed shade patterns in node v and then assign to c(v) the dominant centroid, for the currently observed pattern.

The f Sim intermediate representation of the above described, temporal graph modality is then no longer a tree, but the graph G=(V, E) itself. Consequently, the focusing head no longer points at a tree node, but instead at a given graph vertex v∈V. The admissible movements of the focusing head, from the currently pointed-at vertex v, are then either to: (i) 'zoom-in', that is, to move to some node v': (v, v')∈E; (ii) 'zoom-out', that is, to move to some intermediate vertex v" that is on a path from ($v_s$ to v, or to (iii) 'zoom-sideways', that is, to move to some node v", v'∈E such that (v", v')∈E and (v", v') for some (v", v)∈V. The oracle nodes of f Sim are then the graph vertices that will be pointed-at by the focusing head, after it completes one of its admissible movements from the graph vertex it currently points at. And finally, for a graph modality that changes over time, the agent gets distracted (interrupts its idle state) only when it observes a change in the shade pattern in one of its oracle observations (less the oracle observations corresponding to 'zoom-in' focusing head movements, if less distraction sensitivity is warranted).

4.2.4 Controllable Modalities.

The final remark in the Focusing Simulator section is, that of all the modalities that the CCE agent is perceiving, some may also be allowed to be controlled by the agent (e.g., the motor/proprioceptive modalities). That is, for a controllable f Sim modality, the agent can not only perceive the current shade values in the nodes of the f Sim intermediate representation of that modality, but also to voluntarily issue commands to f Sim, to change the current shades of these nodes, to the desired values. Notice, that each such CCE agent command will change not just one pixel/sensory value of the underlying modality, but rather affect an entire subframe of pixels/sensory values, albeit at a lower resolution. Towards issuing more refined changes, the agent will then likewise issue the 'zoom-in' focusing commands to the focusing head, followed by the shade change commands to the smaller sub-frames etc. The notion of executing a 'domain action' will then be fundamentally different: Instead of executing an atomic domain action, the agent will issue to f Sim a sequence of the focusing head movements and node shading commands, relying on f Sim to unpack these changes of its intermediate representation tree nodes into the pixel/sensory values of the underlying controllable modality.

The CCE execution agent therefore simultaneously interacts with a set of f Sim modalities, corresponding to all the modalities generated by the Domain Engine. The agent simultaneously perceives the oracle observations from all the modalities, and concurrently issues commands to the focusing head of each modality. It learns the model of the world, by growing its f Net connectomes from the sequences of heterogeneous f Sim actions and observations. It then uses this learned world model, to find the goal-achieving action policies, that it sends to the Domain Engine via the f Sim intermediate representations. How this is accomplished in detail in explained next (in Section 5).

4.3 Pseudocodes.

The pseudocodes for the focusing simulator are provided in the UniversalModality class, in either the Python or C++ implementation of CCE. For a given f Sim modality, they describe the following functionality:

AdmissibleFocusingActions: This function returns the list of the admissible focusing head movements, from a given node (e.g., the node that the focusing head is currently pointing at) in the f Sim intermediate representation (of the given modality). This then automatically translates into the list of the oracle nodes that are currently perceivable by the CCE agent.

PerceivableOracleObservations: Each f Sim is set-up to work with either 'low', 'medium' or 'high' perception sensitivity setting, prescribing the subset of the oracle nodes, whose value changes will interrupt the currently executed action of the CCE agent. The 'high' setting contains all the current oracle nodes; the 'medium' setting removes the oracle nodes that require the focusing-head to zoom-in from its current node; the 'low' setting contains only the oracle nodes that are on the path from the current node to the root node, in the intermediate representation tree. For a chosen perception sensitivity setting, the PerceivableOracleObservations therefore returns a subset of the current oracle nodes, from the intermediate representation tree.

GetObservation: This function returns the average shade pattern in a given node of the intermediate representation tree. The function employs the well-known algorithm for computing (in constant time) the sum of all elements in a submatrix (that contains only the voxels that correspond to a sub-image of a given modality).

Refer to the Python or C++ CCE code-bases of these functions for their implementation details.

5.0 Execution Agent

This section describes various types of CCE execution agents (recall FIG. 1) that are responsible for controlling the interaction between the CCE Fractal Networks and the Domain Engine, through the Focusing Simulator intermediaries. What makes the CCE execution agents stand out, is that they remedy the nagging shortcoming of existing deep reinforcement learning agents that requires the agent and the domain simulator to be synchronized. Furthermore, the CCE execution agents finally provide the mechanisms for counterfactual planning and multitasking, possible features of future AGI agents.

Figure 23A:
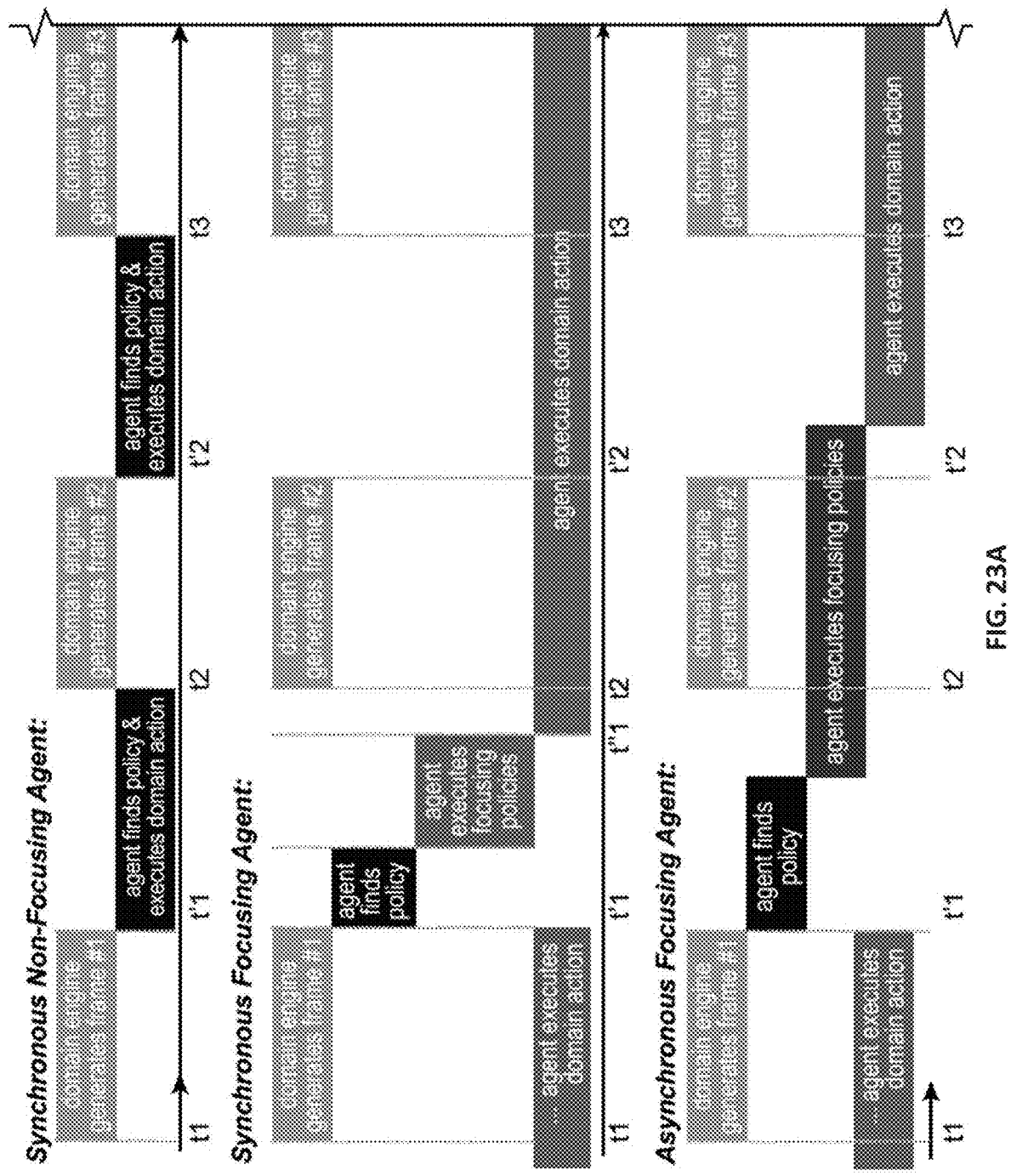
FIGS. 23A-23B illustrate non-limiting examples of types of CCE execution agents. For clarity.
Figure 23B:
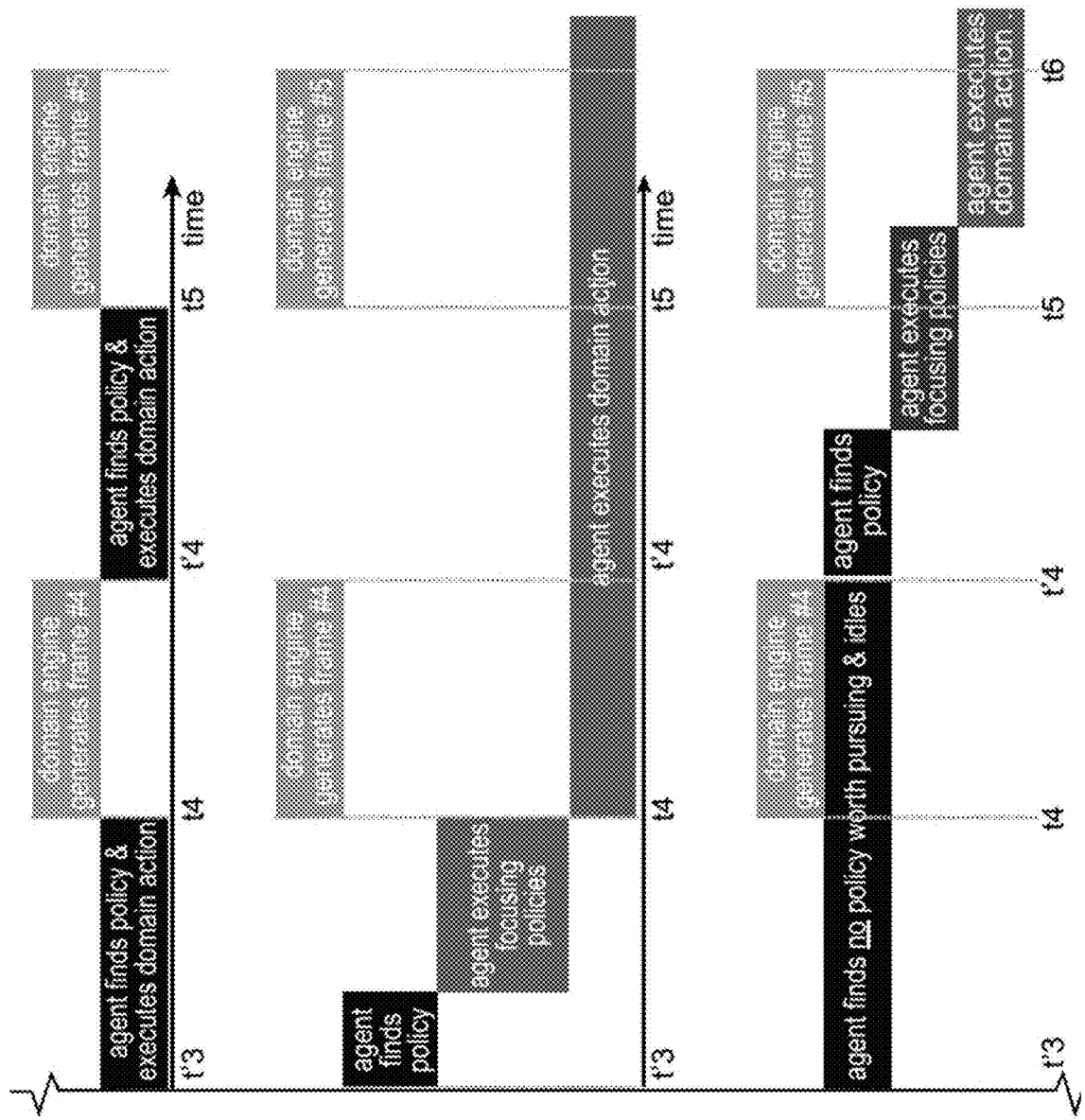

To illustrate the essential differences between the various CCE execution agents, refer to FIGS. 23A-23B. For clarity, FIG. 23B is a continuation of FIG. 23A. For example, FIG. 23A illustrates the first portion of FIGS. 23A-23B, and FIG. 23B illustrates the second portion of FIGS. 23A-23B. To begin with, the Synchronous Non-Focusing Agent implements the most basic agent/Domain Engine interaction loop from the RL literature, where: (1) The Domain Engine produces a frame (observation), sends it to the agent and goes to sleep; (2) The agent wakes up and computes a policy in response to the just received observation; (3) The agent sends the first action from the policy found to the Domain Engine, then goes to sleep, and finally (4) The Domain Engine wakes up when it receives an action from the agent and produces a new frame etc. There are two critical shortcomings of the synchronous, non-focusing agent: (i) When the Domain Engine generates the frames at a high rate, the agent often does not have sufficient time (in between the frames) for its policy search, regardless of how similar the subsequent frames are to each other. This forces the agent to act in a rushed manner, causing it to behave sub-optimally; (ii) Because of the high frame rate, a model based RL agent stores extremely long action-observation sequences (even if the subsequent frames are nearly identical) making the policy representation and policy search computationally prohibitive. Towards alleviating these critical shortcomings, model-based RL approaches have largely been abandoned, in favor of model-free approaches, that do not attempt to learn and store the dynamics of the underlying domains. And even the model-free approaches (the ones that attempt to encode in its current state the last few frames from the Domain Engine, towards computing the higher order Markov policies) resort to an ad-hoc discretization of time, that only considers every kth frame from the Domain Engine. And Semi-Markov Decision Processes do not really address the issue at hand, since they have been proposed to handle the uncertain frame arrival times, rather than to help to model the high rate of frames, arriving from the Domain Engine at uniformly spaced times.

The proposed CCE execution agents fundamentally remedy these shortcomings, by gradually relaxing the agent/Domain Engine clock inter-lock, towards fully asynchronous execution of both processes. To begin with, the Synchronous Focusing Agent (refer to the middle illustration in FIGS. 23A-23B) significantly reduces the complexity of the underlying agent control problem, by only reacting to the changes in the subsequent Domain Engine frames, that the agent perceives (versus reacting to each subsequent frame from the Domain Engine). That is, the agent builds the model of the domain dynamics from the events that it perceives, rather than from the frames that the Domain Engine generates. As a result, the execution of the agent chosen actions is carried out for as long as there are no perceptible (by the oracle nodes of the agent f Sims) changes in the subsequent Domain Engine frames. For example, in FIGS. 23A-23B, when the agent commences at time $t''_1$ the execution of its chosen domain action (depicted as a green bar), this execution is not interrupted once the Domain Engine generates frame #2 (because, presumably, the differences between frame #1 and #2 are not perceptible by the oracle nodes of the agent f Sims). Instead, the action execution lasts until the Domain Engine generates (at time $t'_3$) frame #3 (which, presumably, contains some f Sims oracle observations that differ from the oracle observations for frame #1). When the action execution is eventually interrupted, following the arrival of some frame #k at time $t'_k$, the agent has until time tk+1 to determine a new action to be sent to the Domain Engine, for the Domain Engine to commence generating frame #k+1. Thus, the agent has between time t'k and $t_{k+1}$ to (i) determine its best policy, (ii) execute a focusing policy (prefix of the best policy) to gather the relevant (for the policy) observations from frame #k and (iii) start the execution a domain action (implied by the policy). For example, in FIGS. 23A-23B, the agent started at time $t'_1$, the policy search, then executed a focusing policy (on frame #1) that lasted until time $t''_1 < t_2$, at which point it started the execution of a domain action (implied by the policy found).

If the focusing heads of f Sims are capable of moving substantially faster than the rate at which the Domain Engine generates new frames, the Synchronous Focusing Agent successfully resolves the agent/Domain Engine clock interlock problem. Otherwise, the agent may again be forced (by the Domain Engine) to act in a rushed manner: Notice, that the agent is likely forced to act prematurely at time $t_4$, when in the midst of executing a focusing policy, it is forced to start executing some domain action, required by the Domain Engine (at time $t_4$) for the generation of frame #4. Towards resolving this new problem, caused by the inadequately fast f Sim focusing heads, the CCE also introduces an Asynchronous Focusing Agent.

The CCE Asynchronous Focusing Agent (refer to the bottom illustration in FIGS. 23A-23B) extends the CCE Synchronous Focusing Agent with a critical (for AGI) feature: The agent is now no longer required to issue a domain action to the Domain Engine when it comes time to start generating another domain frame. That is, the Domain Engine is now also capable of generating frames without any actions issued by the agent. The feature has two profound consequences: (i) The agent can now take much longer (than the duration between the Domain Engine frames) to search for its best policy, and to execute focusing policy actions; Only a perceivable (by f Sim oracle nodes) change in the Domain Engine frame interrupts whatever the agent is currently doing; and (ii) If the agent does not find a policy worth pursuing at any given time, it is not required to act, and can instead stay idle/daydream, until some newly generated frame provides new, perceptible observations, in light of which a policy worth pursuing can now be found. These two consequences are best illustrated in FIGS. 23A-23B: (i) Following the arrival of frame #1 (at time t' 1) the agent now has ample time to search for policies and execute focusing policies; It does not have to interrupt it at time $t_2$ (when the generation of frame #2 starts). Furthermore, it does not even have to interrupt it at time t'2 (when the generation of frame #2 finishes, as long as changes between frame #1 and #2 are not perceptible by the oracle nodes of the f Sims). Regarding (ii), consider the situation at time t'3, when the Domain Engine frame #3 arrives. Here, the agent will start searching for a policy, but in the absence of any policy worth pursuing (e.g., Q(a)=0, for all admissible actions), the agent can effectively start idling/daydreaming (or start performing longer horizon policy rollouts or counter-factual option policies). As can be seen in FIGS. 23A-23B, this idling/daydreaming state of the agent lasted until time t'4, when some perceptible observation from the newly arrived frame #4 resulted in the agent finally stumbling upon a policy worth pursuing. In summary, the internal clock of the CCE Asynchronous Focusing Agent is now be fully decoupled from the internal clock of the Domain Engine: The current (external or internal) activity of the agent can now only be interrupted in the event of an arrival of a newly generated domain frame, provided that the change in that frame is actually perceived by the oracle nodes of the CCE f Sims.

The implementation details of the above-introduced CCE execution agents are provided next.

5.1 Synchronous Non-Focusing Agent Algorithm.

The pseudo-code of the Synchronous Non-Focusing Agent is provided in Algorithm 12 (see FIG. 24L). The algorithm is run for a desired number $F_{max}$ of frames, by iterating in lines 1-9 over frames $F_{counter}=1, 2, \ldots, F_{max}$ generated by the Domain Engine. For a current frame, the algorithm first (in line 2) receives from the Domain Engine the set action of currently admissible domain actions and then calls (in line 3) function CalculateActionUtilities (refer to Algorithm 13, FIG. 24M for details) to determine the utility Q(a) of action a for each a E actions. The action a* to be executed next is then the one with the highest utility (in line 4) or a random one (in line 5), with probability E.

Once the action a* to be executed in the current frame already established, the algorithm sends it to the Domain Engine (in line 6) to generate a new frame. The agent then waits for the Domain Engine, to receive from it a newly generated observation frame, and (optionally) the corresponding immediate reward. (Explicit modeling of the arrival of the immediate rewards is optional, since each f Net region 1 unit $[u_k^1]$, corresponding to some f Sim observation k, already has reward$[u_k^1]$, explicitly assigned to it.) The agent then calls the ENTER( ) function, for each of its f Nets, to encode all the newly encountered events: The action a* that was executed, the observation obs that was received, and (optionally) a non-zero discretized reward that was explicitly received.

Finally, the CalculateActionUtilities( ) function (refer to Algorithm 13, FIG. 24M) aggregates the utilities of actions $Q^k(a)$ across all f $Net^k \in$ f Nets. Depending on how much time the agent has to perform its policy search, for an f $Net_k$, the algorithm computes $\{Q^k(a)\}_{a \in actions}$ by calling the SELECTIVE-ACTION-POLICY-SEARCH( ) Algorithm 6 (see FIG. 24F) or the SELECTIVE-OPTION-POLICY-SEARCH( ) Algorithm 7 (see FIG. 24G) or the EXHAUSTIVE-OPTION-POLICY-SEARCH( ) Algorithm. Action utility aggregation is then performed in line 9: The aggregated action utility Q(a) is the sum of the maximum non-negative $Q^k(a)$ and the minimum non-positive $Q^k(a)$, across all the f Nets. (This particular aggregation approach is motivated by the desire of the agent to robustly consider both the most positive, and the most negative, f Nets predicted utilities of its best policy, each starting with action a.)

5.2 Synchronous Focusing Agent.

The pseudo-code of the Synchronous Focusing Agent is provided in Algorithm 14 (see FIG. 24N). The algorithm runs for a desired number $F_{max}$ of frames, for a desired maximum number of $S_{max}$ of focusing actions (a.k.a. saccades) per each domain frame. The Domain Engine frame counter, $F_{counter}$, is therefore initialized to 1 (the agent starts once frame #1 has been generated), whereas the counter $S_{counter}$ of the focusing actions executed in the current frame is reset to 0 (lines 1-2). The agent then interacts with its f Sims and with the Domain Engine, in lines 3-11, by executing the admissible focusing and domain actions, as long as, $F_{counter} < F_{max}$. Specifically, it first (in lines 4-5) determines its set of admissible actions: These are the currently admissible domain actions (specified by the Domain Engine), as well as the currently admissible focusing actions (specified by the f Sims), if $S_{counter} < S_{max}$. The latter also automatically determine (in line 6) the current set of oracles, which are the currently perceivable observations (selected nodes of the f Sim intermediate representation trees, given the current frame) of the agent. The agent action a* to be executed is determined (lines 7-9) to be the one that maximizes Q(a), for {Q(a)} returned by a call to CalculateActionUtilities( ) (explained earlier). Or, with a small chance e, a* is chosen to be random, to allow the agent to explore its action space.

Once the action a* to be executed is established, the agent ENTERS( ) it to all of its f Nets (line 10). Then, depending on whether a* is a focusing action or a domain action, the agent acts differently: For a focusing action a* (lines 11-14), the agent increases the counter $S_{counter}$ of the focusing actions performed within the current frame, then executes this focusing action (by contacting an f Sim corresponding to a*) and intercepts the returned observation (shade of the f Sim node pointed-at by the f Sim focusing head), which it then ENTERS( ) to each of its f Nets.

In contrast, if the action a* to be executed is a domain action (lines 16-29), the agent first resents its $S_{counter}$ and increments its frame counter $F_{counter}$ (because a domain action will have eventually returned a new frame) and then sends a* to the Domain Engine, for it to generate a new frame. The agent itself does not have a direct access to this new frame; Instead, it has access to the f Sim intermediate representation of that frame. As such, it receives from the f Sim a list of the oracle observations that have been modified due to the presence of the new frame. Having called ENTER( ) (in line 19) to optionally enter into each f Net the non-zero, discretized immediate reward returned by the Domain Engine, the agent turns to the list of the modified oracle observations: If the list is empty (line 28), the algorithm goes back to line (17), to execute a* for yet another Domain Engine frame. Otherwise, if $$\left| \begin{array}{c} \text{oracles} \\ \text{modified} \end{array} \right| > 0$$

the agent can choose which of the modified oracles to command the f Sim to focus on next: To this end, the agent extracts (line 21) from the list of the modified oracle nodes the list of the corresponding actions (focusing head movements to reach the modified oracle nodes), as well as the list of the corresponding new oracle observations. It then again calls CalculateAction Utilities( ) (line 22) to calculate the utilities Q(a) of each of the focusing actions, to determine the optimal action, a*. Finally, a* is executed (in line 24), and the corresponding oracle observation obs is returned by the f Sim. To encode these events, the agent then ENTERS( ) into each of its f Nets both a* as well as obs (lines 25-26). The algorithm then resumes the while loop, from line 3.

5.3 Asynchronous Focusing Agent.

The pseudo-code of the Asynchronous Focusing Agent is provided in Algorithm 15 (see FIG. 24O). The algorithm runs for a desired number $F_{max}$ of frames, for a desired maximum number of $S_{max}$ of focusing actions per each domain frame. The Domain Engine frame counter, $F_{counter}$, is therefore initialized to 1 (the agent starts once frame #1 has been generated), whereas the counter $S_{counter}$ of the focusing actions executed in the current frame is reset to 0 (lines 2-3). In each of the next $F_{max}$ frames, the Domain Engine will be executing a domain action specified by the current value of the $a^*_{current}$ variable. Since the agent is initially idle, $a^*_{current}$ is initially set by the agent to 0. The agent then acts inside a while loop (in lines 4-38), for as long as the current $F_{counter} < F_{max}$.

Each loop iteration consists of two distinct parts: In part 1 (lines 5-21) the agent considers whether to replace $a^*_{current}$ with the currently optimal action a*; And in part 2 (lines 23-37) the agent processes a new frame from the Domain Engine. Regarding part 1: The agent first (in line 5) determines the set actions of the currently admissible domain actions and focusing actions, for all f Sims that it interacts with; These f Sims then provide the agent with the list of the currently perceivable oracle observations. The calculation of the currently optimal action a* is done in lines 7-8, upon which a* is chosen at random with probability E, to boost the agent exploration of the underlying domain. (In practice, the exploration rate should be higher when the agent is idling, e.g., not pursuing any goals, and somewhat lower when the agent is actively pursuing a plan that is expected to yield a positive utility.) Unlike the synchronous agents, the asynchronous agent does not have to act at all times; It instead acts only when desired, that is (refer to line 12), only if it is currently not executing any domain action $a^*_{current}$ and the maximum utility $q_{max}$ of some action is positive, or the minimum utility $q_{min}$ of some action is negative, or $a^*$ is random. (That is, the agent is allowed to be idle only if each of its actions yields zero utility; Notice, how this will effectively wake the agent up e.g., in the presence of an observation that is currently predicted to lead to a negative reward, forcing the agent to act.) If some of these conditions is not met, the agent stays idle; Otherwise (lines 13-19), $a^*$ is chosen to be executed. To this end (upon entering $a^*$ to each f Net in line 13), if $a^*$ is a focusing action (lines 14-16), the agent commands the corresponding f Sim to execute it, and receives from it the current observation (shade of the node that the focusing head of the corresponding f Sim has moved to) obs, which the agent then enters into each of its f Nets. Otherwise, if $a^*$ is a domain action, the agent updates the current value of the $a^*$ current variable to $a^*$, for the Domain Engine to pick it up at the earliest. Finally, in line 21, the agent increments its counter $S_{counter}$ (line 21), to reflect the passage of $\epsilon_f = 1/(FPS*S_{max})$ and proceeds to part 2 of the while loop.

Part 2 is devoted to the generation of the new frame by the Domain Engine. A new frame is generated: (i) When the agent is in the midst of waiting for a perceivable f Sim observation, upon executing its domain action a*current, or, (ii) When the agent has used up (for the focusing actions or for being idle) all the time in-between the Domain Engine frames, that is, if $S_{counter} > S_{max}$. To this end, upon resetting the $S_{counter}$ and incrementing the $F_{counter}$ (lines 24-25), the algorithm asks the Domain Engine to generate a new frame (line 26), given the current value of $a^*_{current}$ (equal to 0 if the agent is idling). The Domain Engine then produces a new frame and sends it to the corresponding f Sim, who in turn informs the agent about the list of its modified oracle observations and the immediate reward from the simulator (line 26). If the immediate reward is non-zero, its discretized value is then optionally entered into all the f Nets (line 27). If, oracles on the other hand, $$\left| \begin{array}{c} \text{oracles} \\ \text{modified} \end{array} \right| > 0,$$

the agent can choose which of the modified oracles to command the f Sim to focus on next: To this end, the agent extracts (line 29) from the list of the modified oracle nodes the list of the corresponding actions (focusing head movements to reach the modified oracle nodes), as well as the list of the corresponding new oracle observations. It then again calls CalculateActionUtilities( ) (line 30) to calculate the utilities Q(a) of each of the focusing actions, to determine the optimal action, $a^*$. Finally, the focusing action $a^*$ is executed (in line 32), and the corresponding oracle observation obs is returned by the f Sim. To encode these events, the agent then ENTERS( ) into each of its f Nets both $a^*$ as well as obs (lines 33-34). The perceived change in the oracle observation(s) then also automatically interrupts the execution of the current domain action, so $a^*_{current}$ reset (in line 35).

This concludes the description of the CCE execution agents. The remainder of Section 5 outlines the auxiliary features of CCE execution agents that can help in its decision making.

5.4 Counterfactual Control.

One method to improve the performance of the CCE execution agent is to retrospectively imagine having executed different actions in the past (e.g., forget about the most recent execution of the random actions that led the agent to bad outcomes). The method starts by keeping track of the actions that the agent executed at its decision stages, as well as the f Net states at these decision stages. In light of the evidence (the observations that followed the execution of these actions), the agent then revisits the past decision stages, instantiates the f Net(s) to its corresponding past states, and recalculates the best policy from each such decision point. The first action of such computed policy is then entered into the f Net, to encode in the model that this action was the most recently executed action at the decision point. Such (imagined) retrospective execution of alternative (better) actions at policy decision points allows the agent to potentially reconsider executing the policies that led to these decision points.

Another method to improve the performance of the CCE execution agent is to counterfactually consider for execution the high-utility options that are currently deemed as infeasible. This can be accomplished by reexamining said options, to find the reason for their infeasibility: One or more switches $s[u]_{next}^{out}$ out of some units u that the option unrolls to. The agent can then temporarily assign an intrinsic reward (equal to the utility of the original option) for altering said switch to the desired value (that would make the original option feasible). A slave-level planning problem can then be solved, where the agent is looking for a best policy that collects the master-level intrinsic reward. If such policy can be found, then the agent first executes the slave-level policy, then resets the intrinsic reward, and finally executes the original option policy, that is now feasible. Notice, that a CCE agent equipped with such functionality would effectively be able to consider policies, that counter-factually assume an altered state of its perceived and upcoming observations. Such agent would be able to search for its master-slave-level option policies that imagine acting upon a hypothetical state of the world, and then encode in its model the actual result of the execution of such multi-level policy.

5.5 Multitasking and Daydreaming.

Finally, the Asynchronous Focusing Agent (from Section 5.3) could effectively use the time when it is idling towards better policy search. This could be accomplished by e.g., planning using options (versus actions), or using longer policy rollouts, or using master-slave-level counter-factual plans. Or, the agent can predict the continuation of its attended-to sequences into more distant futures (engage in daydreaming), and imagine actually being there, in the corresponding future states. In such future states, it could find options, that will have been infeasible, but could potentially be made feasible from the current state of the agent. As such, the agent could execute preemptive action policies, that will have made said future option policies feasible. Since this would all be occurring whilst the agent is idling (e.g., waiting for some observation in its currently executed plan), the agent will effectively be multitasking between the currently executed plan and some preemptive action plan. This striking agent capability would arguably manifest itself in a remarkable agent intelligence in its domain of expertise.

6.0 Hardware Acceleration
  6.1 Reserved: Implementation using CPUs.
  6.2 Reserved: Implementation using GPGPUs.
  6.3 Reserved: Implementation using Custom ASIC's.
  6.4 Supplemental.

As an alternative to the UNPACK ( . . . ) function (Algorithm 9, FIG. 24I), consider the REWARD ($\Phi_k^r$, A) Algorithm 16 (see FIG. 24P). The advantage of that algorithm is that its run-time is linear $O(R_{Max})$. To achieve that, the algorithm employs cached values reward[r, i, j] described herein. The algorithm directly computes the discounted residual reward for executing (a feasible) option $\Phi_k^r$ from f Net state A.

EXAMPLES

While various examples of the present disclosure have been shown and described herein, such examples are provided by way of example only. Numerous variations, changes, or substitutions may occur without departing from the present disclosure. It should be understood that various alternatives to the examples described herein may be employed.

Example 1—Reserved

Terms and Definitions

Unless otherwise defined, all technical terms used herein have the same meaning as commonly understood by one of ordinary skill in the art to which this present disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

While preferred embodiments of the present disclosure have been shown and described herein, such embodiments are provided by way of example only. It is not intended that the present disclosure be limited by the specific examples provided within the specification. While the present disclosure has been described with reference to the aforementioned specification, the descriptions and illustrations of the embodiments herein are not meant to be construed in a limiting sense. Numerous variations, changes, and substitutions may occur without departing from the present disclosure. Furthermore, it shall be understood that all aspects of the present disclosure are not limited to the specific depictions, configurations, or relative proportions set forth herein which depend upon a variety of conditions and variables. It should be understood that various alternatives to the embodiments of the present disclosure described herein may be employed in practicing the present disclosure. It is therefore contemplated that the present disclosure shall also cover any such alternatives, modifications, variations, or equivalents. It is intended that the following claims define the scope of the present disclosure and that systems, methods and structures within the scope of these claims and their equivalents be covered thereby.

What is claimed is:

1. A system for determining domain observations of an environment, comprising:
   a domain engine module configured to generate a first set of domain observations from the environment;
   an active sensing module configured to (i) receive the first set of domain observations, (ii) generate a second set of domain observations from the first set of domain observations, and (iii) generate a first set of sim actions;
   a fractal network module configured to (i) receive the second set of domain observations, (ii) receive the first set of sim actions, (iii) generate one or more fractal networks associated with the second set of domain observations and/or the first set of sim actions, (iv) generate an observation sequence from the one or more fractal networks, and (v) compare the observation sequence to the first set of domain observations; and
   an execution agent module configured to (i) generate a second set of sim actions based on the observation sequence and (ii) transmit the second set of sim actions to the active sensing module,
   wherein the second set of sim actions causes the active sensing module and/or the domain engine to generate another set of domain observations and/or another set of sim actions.

2. The system of claim 1, wherein the domain engine module generates the first set of domain observations at one or more rates or upon one or more events.

3. The system of claim 1, wherein the first set of domain observations comprises one or more temporal observations, spatial observations, or spatio-temporal observations.

4. The system of claim 1, wherein the first set of domain observations comprises one or more visual observations, textual observations, auditory observations, vector observations, or scalar observations.

5. The system of claim 1, wherein the second set of domain observations comprises a transformation of the first set of domain observations.

6. The system of claim 1, wherein the active sensing module includes one or more active sensing modules, each active sensing module comprising:
   a focusing head module configured to focus on or select a first part of each domain observation;
   a data architecture module configured to generate nodes associated with the first part of each domain observation; and
   a perception module configured to generate perceived observations associated with a second part of each domain observation, wherein the second part is nearby the first part of each domain observation.

7. The system of claim 6, wherein a number of the one or more active sensing modules dynamically changes in real-time based at least on receiving a new type of domain observation.

8. The system of claim 1, wherein the fractal network module includes one or more fractal networks, each fractal network comprising a compute unit configured to store one or more placeholder values associated with operations of each fractal network.

9. The system of claim 1, wherein a number of the one or more fractal networks dynamically changes in real-time based at least on receiving a new type of domain observation.

10. The system of claim 1, wherein each of the one or more fractal networks grows independently from another fractal network to optimize a capture of the observation sequence.

11. The system of claim 1, wherein each of the one more fractal networks iteratively learns using the first set of domain observations, the second set of domain observations, the first set of sim actions, or the second set of sim actions.

12. The system of claim 1, wherein each of the one or more fractal networks is iteratively trained to reach a confidence level associated with determining a relationship between each domain observation of the first set of domain observations and the observation sequence.

13. The system of claim 1, wherein each of the one or more fractal networks is configured as an elastic architecture with one or more regions arranged in a linear manner or a nonlinear manner.

14. The system of claim 13, wherein each of the one or more fractal networks is configured to change a position of the one or more regions in the elastic architecture to another position of the one more regions in the elastic architecture.

15. The system of claim 14, wherein a compute unit of one region is dynamically connected to compute units of other regions during operation of the fractal network module using one or more horizontal electrical connections or one or more vertical electrical connections.

16. The system of claim 15, wherein each compute unit of the one or more regions is configured with one or more placeholders associated with arithmetic operations or logic operations.

17. The system of claim 1, wherein the execution agent comprises a synchronous non-focusing agent.

18. The system of claim 1, wherein the execution agent comprises a synchronous focusing agent.

19. The system of claim 1, wherein the execution agent comprises an asynchronous focusing agent.

20. The system of claim 1, wherein the execution agent utilizes a counterfactual control to instruct the fractal network module to determine future sim actions or future observations.

21. The system of claim 1, wherein the environment comprises a computational domain or a cyber-physical domain.

22. The system of claim 5, wherein the transformation comprises a reduced resolution or an amplified resolution of the first set of domain observations.

23. The system of claim 5, wherein the second set of domain observations occurred at a same time as the first set of domain observations.

24. The system of claim 6, wherein the data architecture module comprises a quad-tree structure, an oct-tree structure, a kd-tree structure, or any combination thereof.

* * * * *